US012579198B2

(12) United States Patent
Wang et al.

(10) Patent No.: US 12,579,198 B2
(45) Date of Patent: Mar. 17, 2026

(54) TEXT STRING COMPARISON FOR DUPLICATE OR NEAR-DUPLICATE TEXT DOCUMENTS IDENTIFIED USING AUTOMATED NEAR-DUPLICATE DETECTION FOR TEXT DOCUMENTS

(71) Applicant: SAS Institute Inc., Cary, NC (US)

(72) Inventors: Fan Wang, Beijing (CN); Teresa S. Jade, Cary, NC (US); Xu Yang, Cary, NC (US)

(73) Assignee: SAS Institute, Inc., Cary, NC (US)

( * ) Notice: Subject to any disclaimer, the term of this patent is extended or adjusted under 35 U.S.C. 154(b) by 7 days.

(21) Appl. No.: 19/048,422

(22) Filed: Feb. 7, 2025

(65) Prior Publication Data

US 2025/0231993 A1    Jul. 17, 2025

Related U.S. Application Data

(63) Continuation of application No. 19/047,818, filed on Feb. 7, 2025, which is a continuation-in-part of
(Continued)

(51) Int. Cl.
*G06F 7/02* (2006.01)
*G06F 16/00* (2019.01)
(Continued)

(52) U.S. Cl.
CPC ............ *G06F 16/906* (2019.01); *G06F 16/93* (2019.01); *G06F 16/355* (2019.01)

(58) Field of Classification Search
CPC ....... G06F 16/906; G06F 16/93; G06F 16/355
See application file for complete search history.

(56) References Cited

U.S. PATENT DOCUMENTS 7,814,107 B1    10/2010   Thirumalai et al.
7,958,136 B1 *   6/2011   Curtis ................... G06F 16/313
                                                         707/758
(Continued)

FOREIGN PATENT DOCUMENTS

WO          2013079907          6/2013

OTHER PUBLICATIONS

"Axcelerate 5", Available Online at: http://axcelerate-docs.opentext. com/help/axcadmin/5.13/en_ us/content/a_features/near_ dupli- cate_ detection/c_near_ duplicate_detection.htm, 2018, 2 pages.
(Continued)

*Primary Examiner* — Bruce M Moser
(74) *Attorney, Agent, or Firm* — Kilpatrick Townsend & Stockton, LLP

(57)          ABSTRACT

Techniques described herein provide for text string com- parison for documents identified using automated near- duplicate detection. In one example, a system can receive a pair of documents. The system can extract text strings from the documents. The system can normalize the extracted text strings using a predefined normalization scheme. The sys- tem can identify boilerplate text segments in the normalized text strings. The system can remove the boilerplate text segments from the normalized text strings to generate fil- tered text strings. The system can divide the filtered text strings by identifying section indicators. The system can, for each section, generate groupings of text strings and deter- mine a similarity score between each pair of corresponding groupings to identify matching groupings of text strings. The system can generate an output for display showing the visual indications of the matched groupings of text strings.

30 Claims, 42 Drawing Sheets

Related U.S. Application Data application No. 18/896,244, filed on Sep. 25, 2024, which is a continuation of application No. 18/394,209, filed on Dec. 22, 2023, now Pat. No. 12,124,518.

(60) Provisional application No. 63/545,668, filed on Oct. 25, 2023, provisional application No. 63/534,168, filed on Aug. 23, 2023.

(51) Int. Cl.

| | |
|---|---|
| *G06F 16/906* | (2019.01) |
| *G06F 16/93* | (2019.01) |
| *G06F 16/355* | (2025.01) |

(56) References Cited

U.S. PATENT DOCUMENTS

| | | | |
|---|---|---|---|
| 8,296,309 | B2 | 10/2012 | Brassil et al. |
| 9,275,129 | B2 | 3/2016 | Desai et al. |
| 10,083,176 | B1 | 9/2018 | Desai et al. |
| 10,242,261 | B1 | 3/2019 | Price |
| 10,467,344 | B1 | 11/2019 | Jade et al. |
| 10,699,081 | B2 | 6/2020 | Jade et al. |
| 11,049,502 | B1 | 6/2021 | Cheng et al. |
| 11,138,979 | B1 | 10/2021 | Cheng et al. |
| 11,145,309 | B1 | 10/2021 | Yang |
| 11,335,350 | B2 | 5/2022 | Li et al. |
| 11,373,655 | B2 | 6/2022 | Li et al. |
| 11,404,053 | B1 | 8/2022 | Cheng et al. |
| 11,423,680 | B1 | 8/2022 | Jade et al. |
| 11,501,547 | B1 | 11/2022 | Jade et al. |
| 11,538,481 | B2 | 12/2022 | Li et al. |
| 12,124,518 | B1 | 10/2024 | Wang et al. |
| 2006/0095521 | A1 | 5/2006 | Patinkin |
| 2007/0185871 | A1 | 8/2007 | Canright et al. |
| 2011/0087668 | A1 | 4/2011 | Thomas et al. |
| 2011/0137900 | A1* | 6/2011 | Chang .................. G06F 40/186 707/E17.046 |
| 2012/0209853 | A1* | 8/2012 | Desai .................. G06F 16/3344 707/E17.014 |
| 2017/0337266 | A1 | 11/2017 | Bhatt et al. |
| 2018/0039620 | A1 | 2/2018 | Ciulla et al. |
| 2021/0004583 | A1 | 1/2021 | Evans et al. |
| 2021/0141841 | A1 | 5/2021 | Seimasa |
| 2022/0327310 | A1* | 10/2022 | Tzoref-Brill ......... G06V 30/418 |
| 2023/0376542 | A1 | 11/2023 | Avadhani et al. |

OTHER PUBLICATIONS

"Brainspace", Available Online at: https://brainspace.revealdata.com/, Accessed from Internet on Dec. 22, 2023, 5 pages.

"CYFOR Blog Forensics", Available Online at: https://cyfor.co.uk/relativity-analytics-part-three-textual-near-duplicates/, Accessed from Internet on Dec. 22, 2023, 7 pages.

"Microsoft Purview Compliance Documentation", Available Online at: https://learn.microsoft.com/en-us/microsoft-365/compliance/?view=o365-worldwide, Accessed from Internet on Dec. 22, 2023, 2 pages.

U.S. Appl. No. 18/394,209 , "Non-Final Office Action", Mar. 14, 2024, 8 pages.

U.S. Appl. No. 18/394,209 , "Notice of Allowance", Jun. 26, 2024, 9 pages.

U.S. Appl. No. 19/047,818 , "Non-Final Office Action", Mar. 31, 2025, 12 pages.

U.S. Appl. No. 19/048,170 , "Non-Final Office Action", May 2, 2025, 13 pages.

PCT/US2024/040901 , "International Search Report and Written Opinion", Oct. 22, 2024, 12 pages.

* cited by examiner

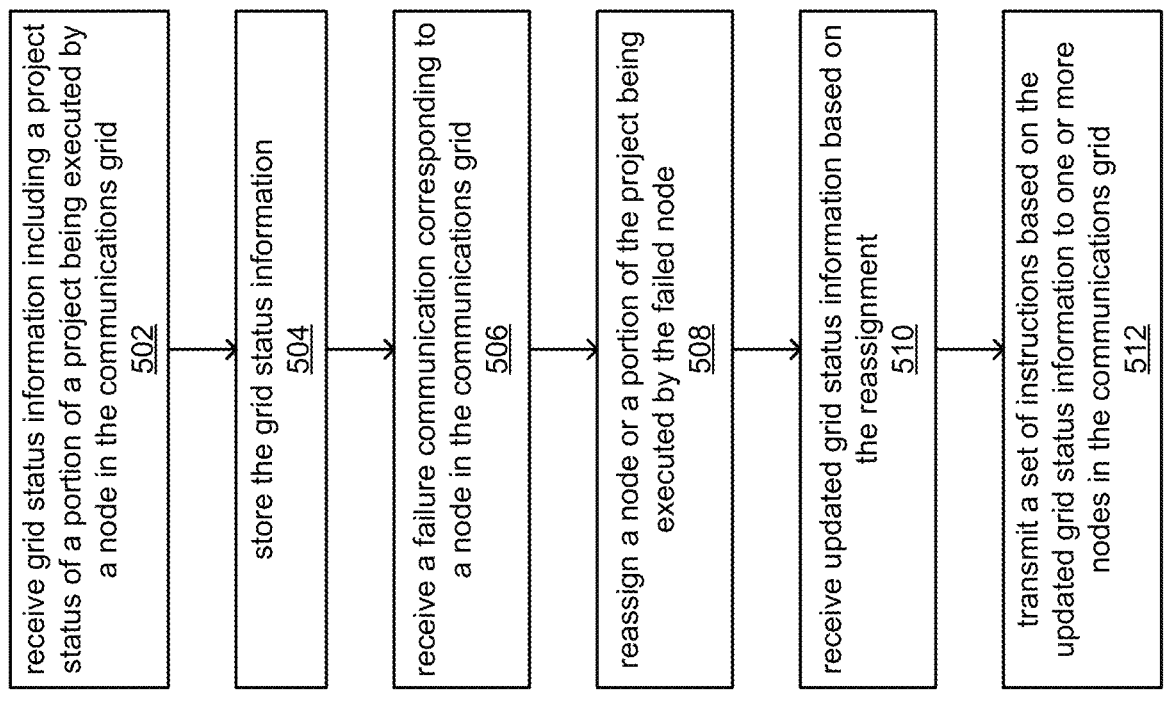

receive grid status information including a project status of a portion of a project being executed by a node in the communications grid
502 store the grid status information
504 receive a failure communication corresponding to a node in the communications grid
506 reassign a node or a portion of the project being executed by the failed node
508 receive updated grid status information based on the reassignment
510 transmit a set of instructions based on the updated grid status information to one or more nodes in the communications grid
512

500

FIG. 5 instantive event stream processing engine 900 create engine container 902 instantiate continuous queries 904 initialize publish/subscribe capability 906 start projects 908 receive event block 910 process event block 912 output processed event block 914 stop processing? 916 no yes stop projects 918 shutdown 920

1300

1500

| Step \ Language | English | Chinese | Japanese |
|---|---|---|---|
| Input | Hello | 你好 | こんにちは |
| Transliterate | N/A | ni hao | ko n ni chi ha |
| Convert to Unicode literal | N/A | b'\\\u4f60\\\\u597d' | b'\\\u3053\\\u3093\\\u306b\\\u3061\\\u306f' |
| Remove duplicate chars | N/A | 4f60 597d | 3053 3093 306b 3061 306f |
| Output | hello | ni4f60 hao597d | ko3053 3093 ni306b chi3061 ha306f |

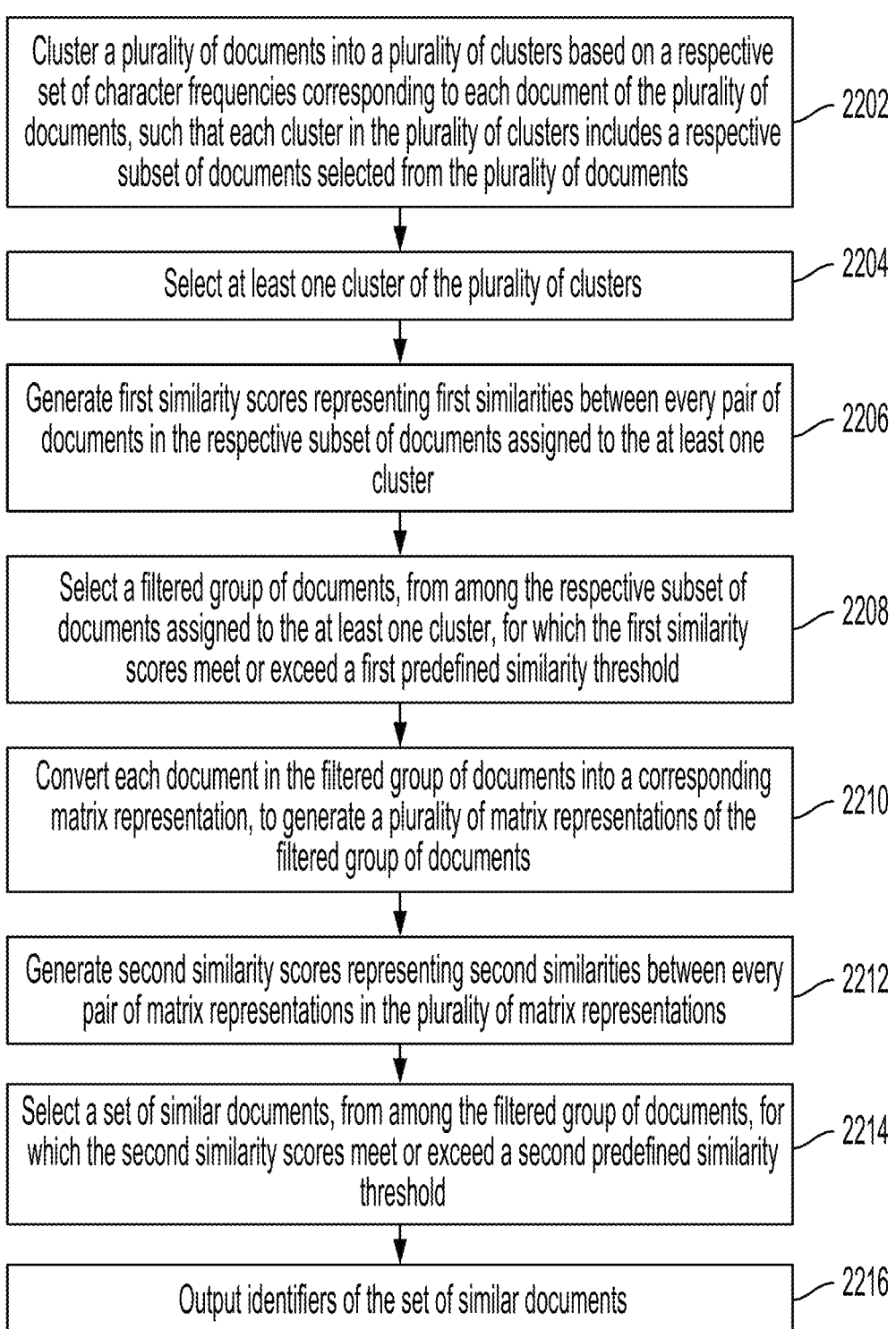

Cluster a plurality of documents into a plurality of clusters based on a respective set of character frequencies corresponding to each document of the plurality of documents, such that each cluster in the plurality of clusters includes a respective subset of documents selected from the plurality of documents — 2202

Select at least one cluster of the plurality of clusters — 2204

Generate first similarity scores representing first similarities between every pair of documents in the respective subset of documents assigned to the at least one cluster — 2206

Select a filtered group of documents, from among the respective subset of documents assigned to the at least one cluster, for which the first similarity scores meet or exceed a first predefined similarity threshold — 2208

Convert each document in the filtered group of documents into a corresponding matrix representation, to generate a plurality of matrix representations of the filtered group of documents — 2210

Generate second similarity scores representing second similarities between every pair of matrix representations in the plurality of matrix representations — 2212

Select a set of similar documents, from among the filtered group of documents, for which the second similarity scores meet or exceed a second predefined similarity threshold — 2214

Output identifiers of the set of similar documents — 2216

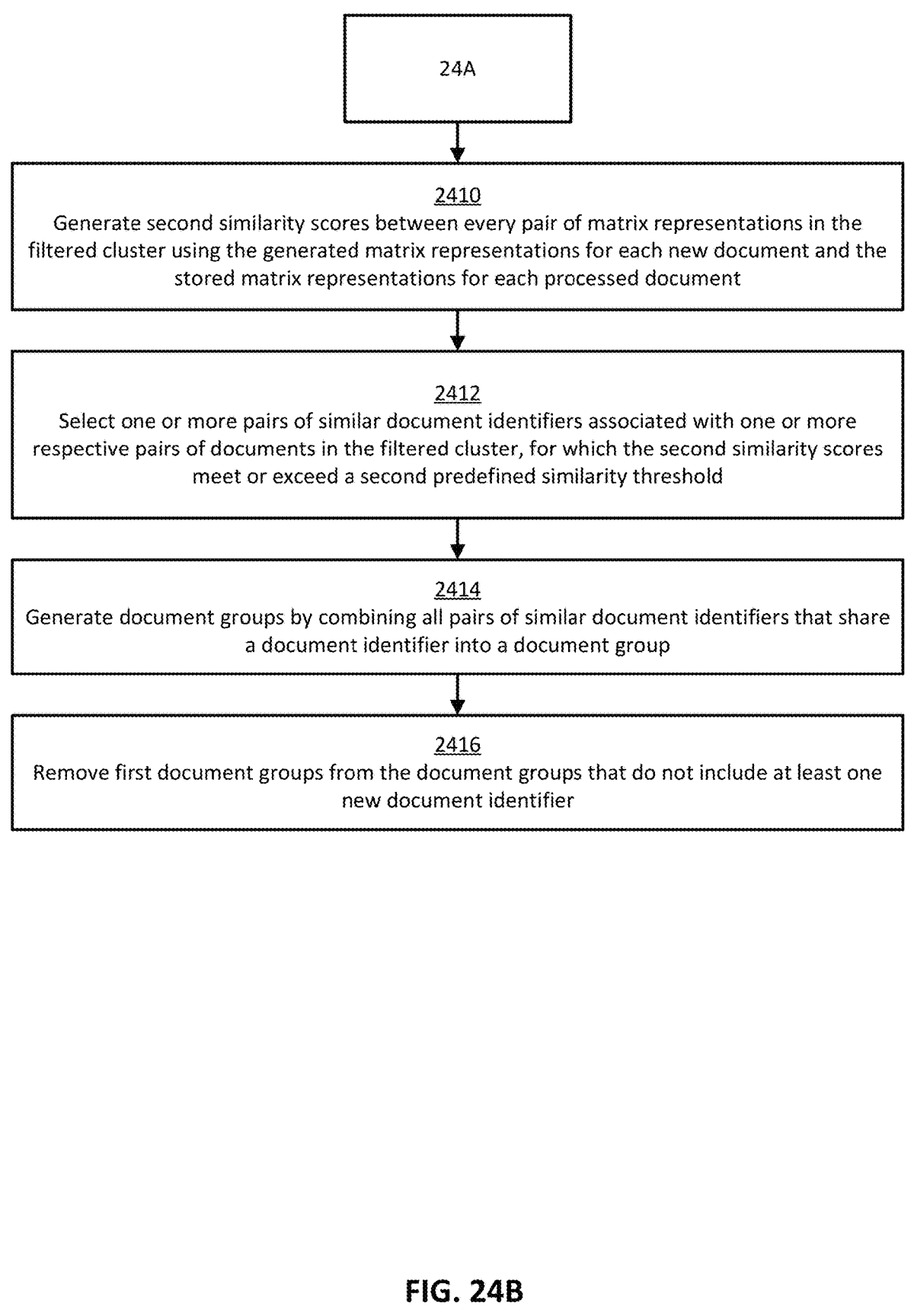

2410
Generate second similarity scores between every pair of matrix representations in the filtered cluster using the generated matrix representations for each new document and the stored matrix representations for each processed document 2412
Select one or more pairs of similar document identifiers associated with one or more respective pairs of documents in the filtered cluster, for which the second similarity scores meet or exceed a second predefined similarity threshold 2414
Generate document groups by combining all pairs of similar document identifiers that share a document identifier into a document group 2416
Remove first document groups from the document groups that do not include at least one new document identifier

FIG. 24B

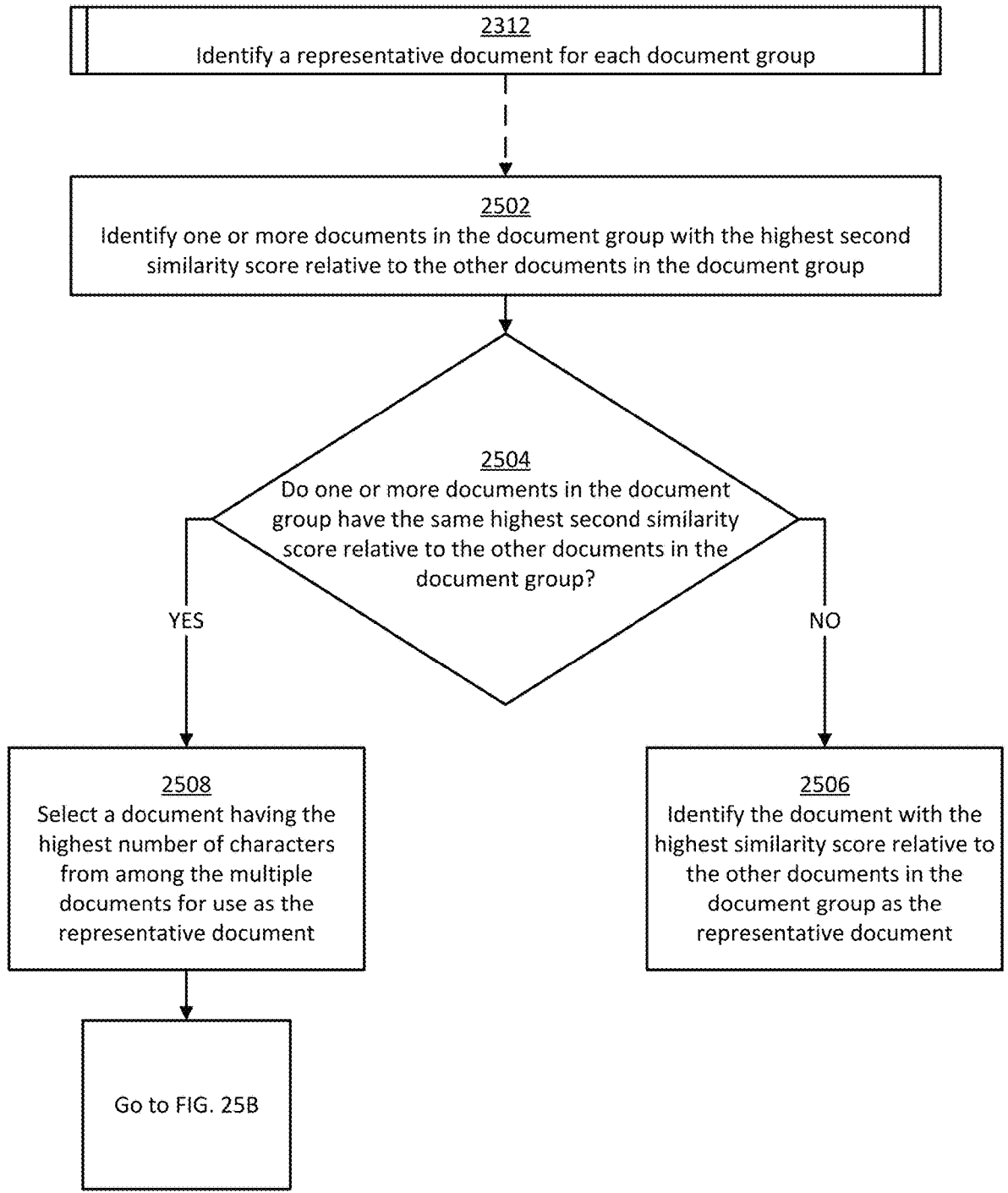

2312
Identify a representative document for each document group

2502
Identify one or more documents in the document group with the highest second similarity score relative to the other documents in the document group

2504
Do one or more documents in the document group have the same highest second similarity score relative to the other documents in the document group?

YES

NO

2508
Select a document having the highest number of characters from among the multiple documents for use as the representative document

2506
Identify the document with the highest similarity score relative to the other documents in the document group as the representative document Go to FIG. 25B

FIG. 25A

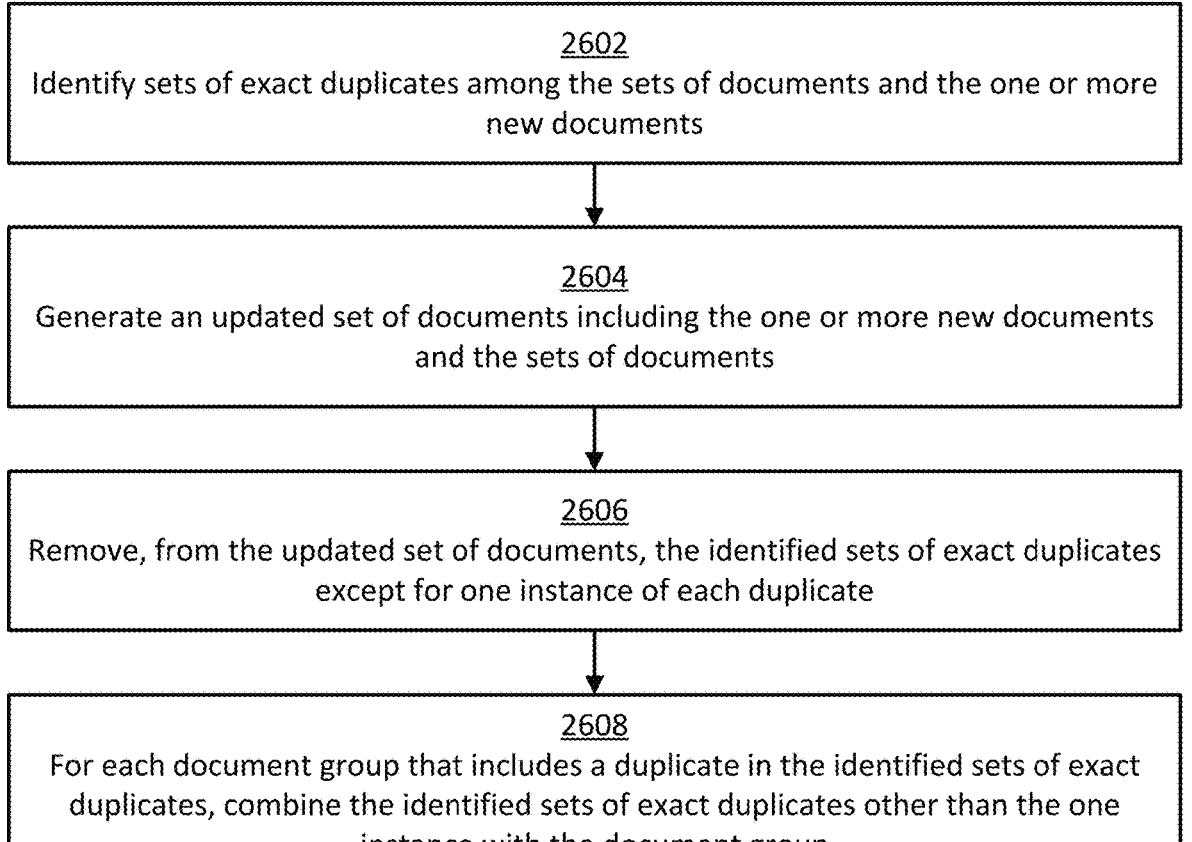

2602
Identify sets of exact duplicates among the sets of documents and the one or more new documents 2604
Generate an updated set of documents including the one or more new documents and the sets of documents 2606
Remove, from the updated set of documents, the identified sets of exact duplicates except for one instance of each duplicate 2608
For each document group that includes a duplicate in the identified sets of exact duplicates, combine the identified sets of exact duplicates other than the one instance with the document group

FIG. 26

<u>2702</u>
Receive sets of documents, wherein each set of documents includes at least one pair of documents determined to be similar to one another based on similarity scores generated using a predefined similarity scoring technique <u>2704</u>
Generate document groups by merging together one or more pairs of documents that share at least one document <u>2706</u>
For each of the document groups, identify a representative document for the document group <u>2708</u>
Generate an output for display including a section for each document group, each section including the representative document for the document group and, for each document in the document group, the similarity score relative to the representative document for the document group

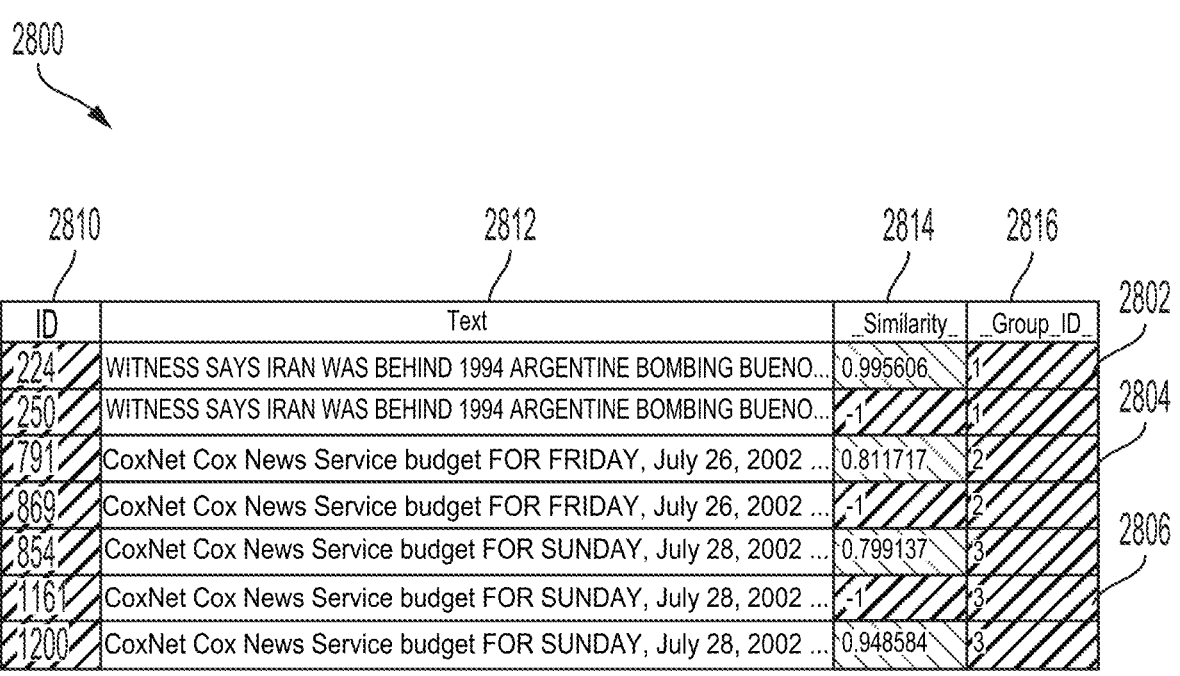

| ID | Text | Similarity | Group_ID |
|----|------|-----------|----------|
| 224 | WITNESS SAYS IRAN WAS BEHIND 1994 ARGENTINE BOMBING BUENO... | 0.995606 | 1 |
| 250 | WITNESS SAYS IRAN WAS BEHIND 1994 ARGENTINE BOMBING BUENO... | -1 | 1 |
| 791 | CoxNet Cox News Service budget FOR FRIDAY, July 26, 2002 ... | 0.811717 | 2 |
| 869 | CoxNet Cox News Service budget FOR FRIDAY, July 26, 2002 ... | -1 | 2 |
| 854 | CoxNet Cox News Service budget FOR SUNDAY, July 28, 2002 ... | 0.799137 | 3 |
| 1161 | CoxNet Cox News Service budget FOR SUNDAY, July 28, 2002 ... | -1 | 3 |
| 1200 | CoxNet Cox News Service budget FOR SUNDAY, July 28, 2002 ... | 0.948584 | 3 |

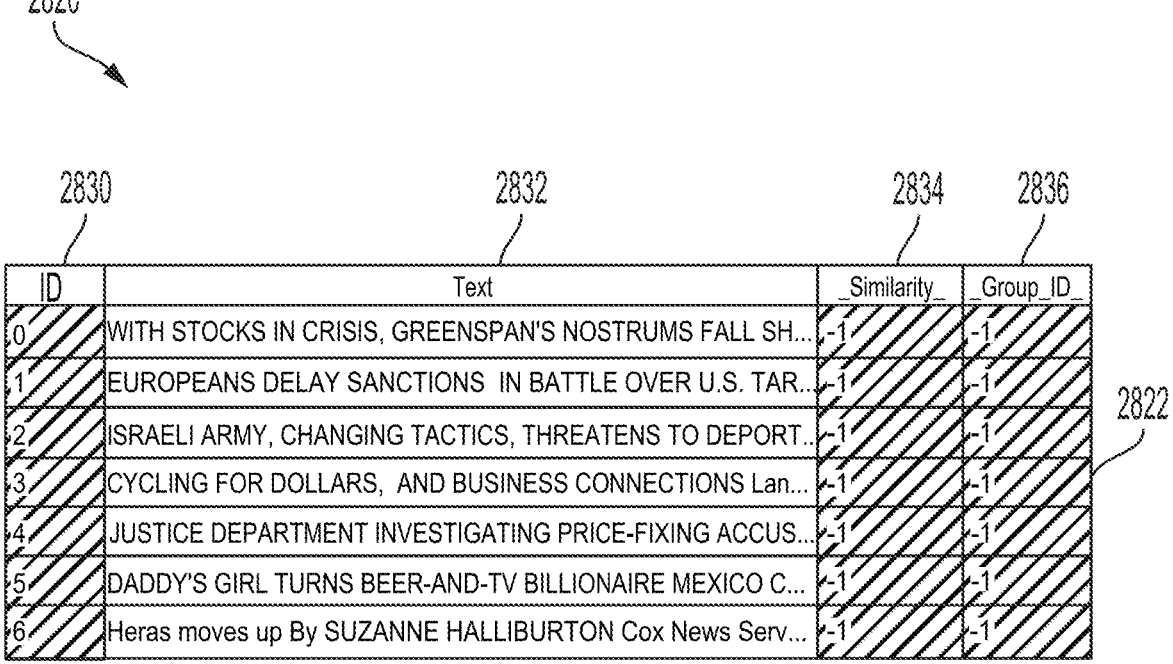

| ID | Text | Similarity | Group_ID |
|----|------|-----------|----------|
| 0 | WITH STOCKS IN CRISIS, GREENSPAN'S NOSTRUMS FALL SH... | -1 | -1 |
| 1 | EUROPEANS DELAY SANCTIONS  IN BATTLE OVER U.S. TAR... | -1 | -1 |
| 2 | ISRAELI ARMY, CHANGING TACTICS, THREATENS TO DEPORT... | -1 | -1 |
| 3 | CYCLING FOR DOLLARS,  AND BUSINESS CONNECTIONS Lan... | -1 | -1 |
| 4 | JUSTICE DEPARTMENT INVESTIGATING PRICE-FIXING ACCUS... | -1 | -1 |
| 5 | DADDY'S GIRL TURNS BEER-AND-TV BILLIONAIRE MEXICO C... | -1 | -1 |
| 6 | Heras moves up By SUZANNE HALLIBURTON Cox News Serv... | -1 | -1 |

| 3002 |
| :---: |
| Identify one or more documents in the document group with the highest similarity score, among the new similarity scores, relative to the other documents in the document group |

↓

| 3004 |
| :---: |
| Determine that the one or more documents includes multiple documents having the same highest similarity score relative to the other documents in the document group |

↓

| 3006 |
| :---: |
| In response to determining that the one or more documents includes multiple documents, select a document having the highest number of characters from among the multiple documents for use as the representative document |

FIG. 30

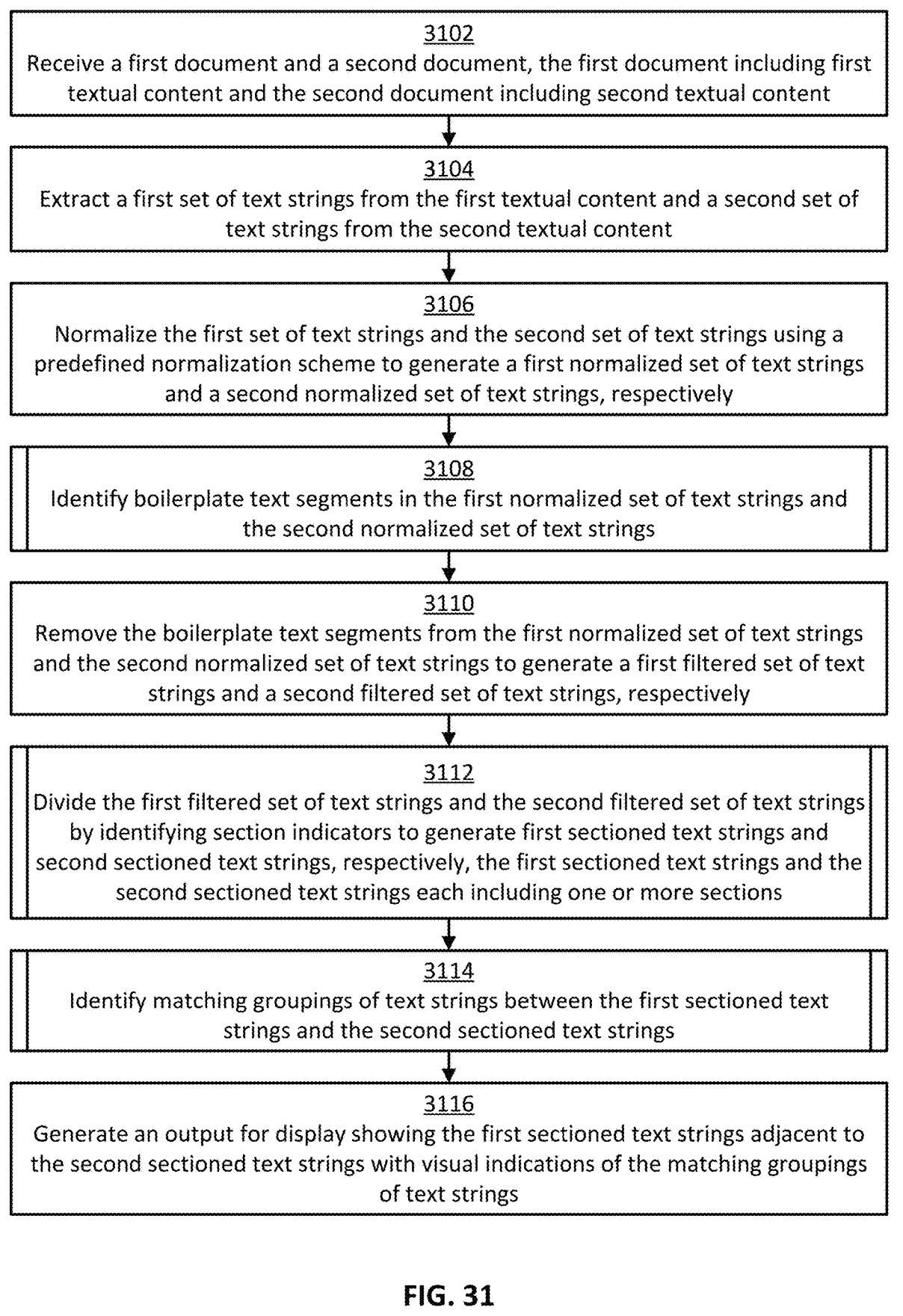

3102
Receive a first document and a second document, the first document including first textual content and the second document including second textual content

3104
Extract a first set of text strings from the first textual content and a second set of text strings from the second textual content

3106
Normalize the first set of text strings and the second set of text strings using a predefined normalization scheme to generate a first normalized set of text strings and a second normalized set of text strings, respectively

3108
Identify boilerplate text segments in the first normalized set of text strings and the second normalized set of text strings

3110
Remove the boilerplate text segments from the first normalized set of text strings and the second normalized set of text strings to generate a first filtered set of text strings and a second filtered set of text strings, respectively

3112
Divide the first filtered set of text strings and the second filtered set of text strings by identifying section indicators to generate first sectioned text strings and second sectioned text strings, respectively, the first sectioned text strings and the second sectioned text strings each including one or more sections

3114
Identify matching groupings of text strings between the first sectioned text strings and the second sectioned text strings

3116
Generate an output for display showing the first sectioned text strings adjacent to the second sectioned text strings with visual indications of the matching groupings of text strings

FIG. 31

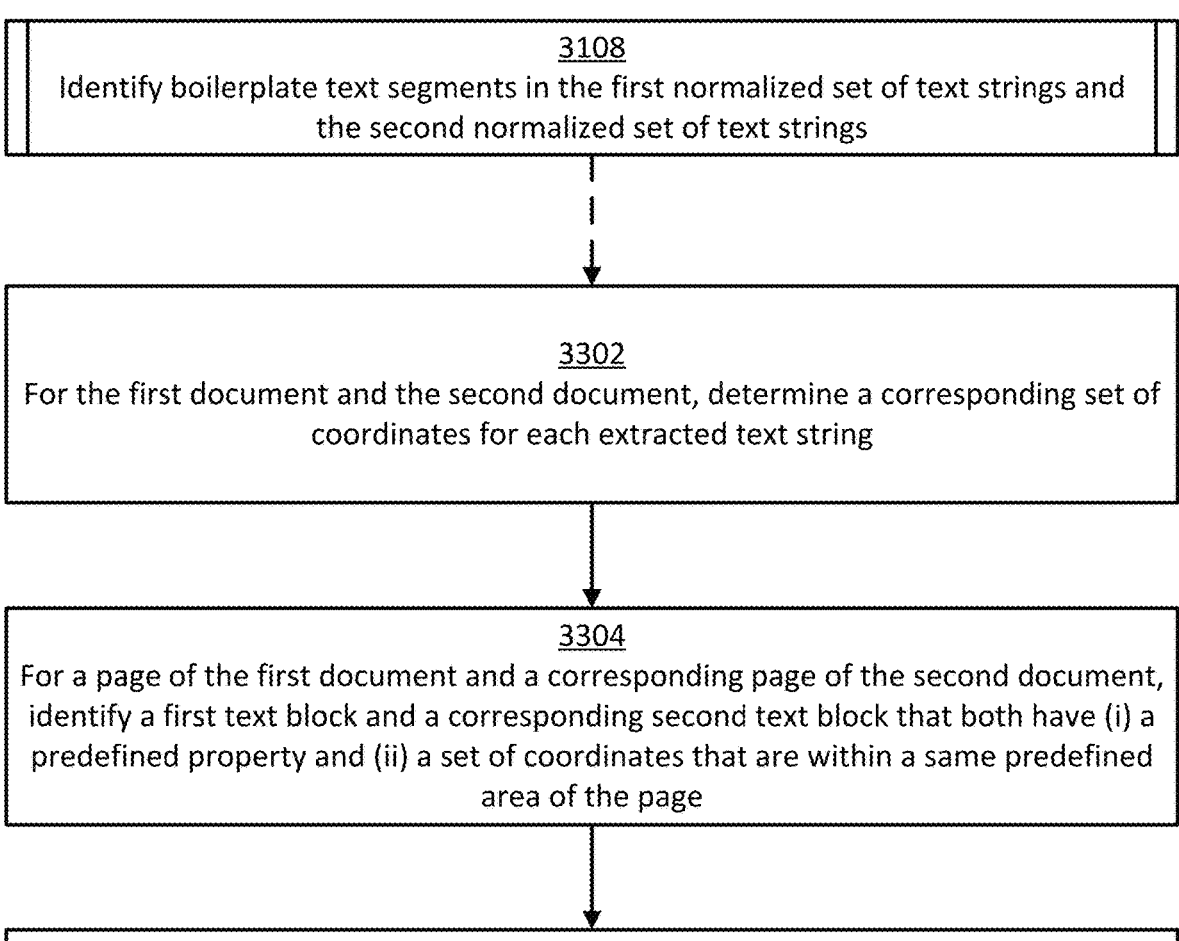

3108
Identify boilerplate text segments in the first normalized set of text strings and the second normalized set of text strings 3302
For the first document and the second document, determine a corresponding set of coordinates for each extracted text string 3304
For a page of the first document and a corresponding page of the second document, identify a first text block and a corresponding second text block that both have (i) a predefined property and (ii) a set of coordinates that are within a same predefined area of the page 3306
For the page of the first document and a corresponding page of the second document, determine that the first text block and the second text block correspond to the boilerplate text segment based on the first text block and the second text block having the predefined property and the set of coordinates

FIG. 33

<u>3112</u>
Identify section indicators to generate first sectioned text strings and second sectioned text strings by, for each first filtered text string of the first filtered set of text strings and the corresponding second filtered text string of the second filtered set of text strings <u>3502</u>
Determine a first satisfaction of a first criteria, comprising determining whether the first filtered text string and the second filtered text string only appears once in each of the first filtered set of text strings and the second filtered set of text strings <u>3504</u>
Determine a second satisfaction of a second criteria, wherein the first filtered text string and the second filtered text string each include one line and comprising determining that the first filtered text string and the second filtered text string are the only text on the line for both of the first filtered set of text strings and the second filtered set of text strings <u>3506</u>
Determine a third satisfaction of a third criteria, comprising, for the first filtered text string or the second filtered text string that is provisionally identified as a section header based on the first criteria and the second criteria, determining that a sequencing of the provisionally identified section header is valid using a section header index <u>3508</u>
Identify a section header by determining that the first criteria, the second criteria, and the third criteria have been satisfied.

FIG. 35

<u>3114</u>
Identify matching groupings of text strings between the first sectioned text strings and the second sectioned text strings <u>3702</u>
Generate groupings of text strings by grouping text strings that satisfy one or more merging criteria, such that each grouping of text strings in the first sectioned text strings has a corresponding grouping of text strings in the second sectioned text strings <u>3704</u>
Determine a similarity score between each pair of corresponding groupings of text strings between the first sectioned text strings and the second sectioned text strings in the section using a predefined similarity scoring technique <u>3706</u>
Identify matching groupings of text strings among the corresponding groupings of text strings between the first sectioned text strings and the second sectioned text strings based on the similarity scores

FIG. 37

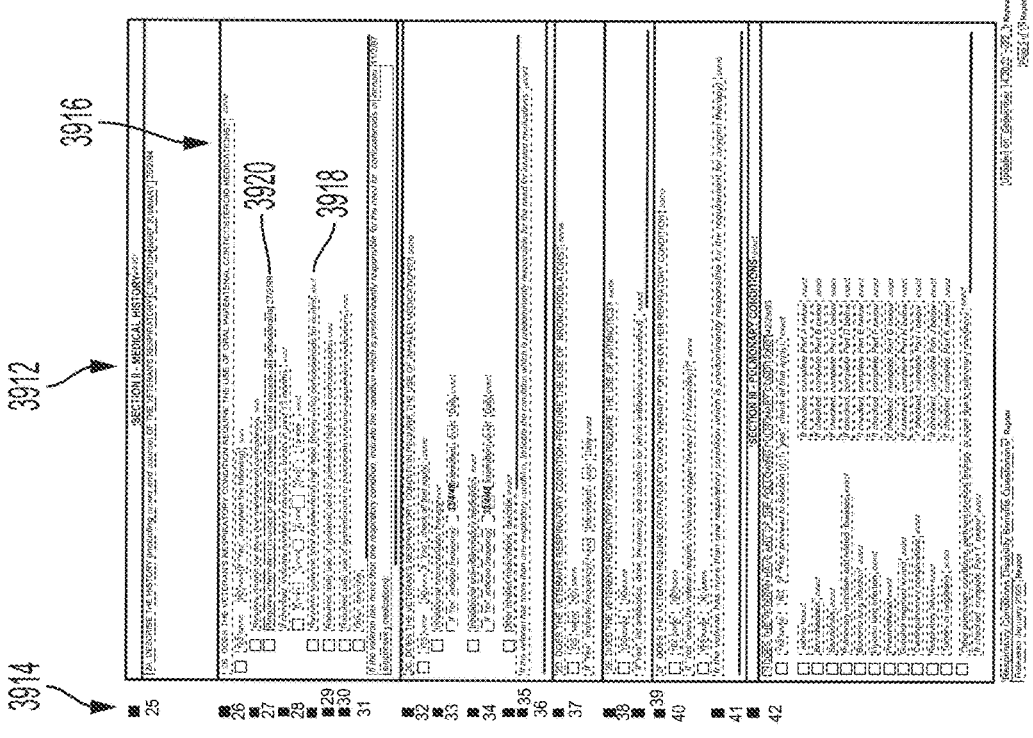
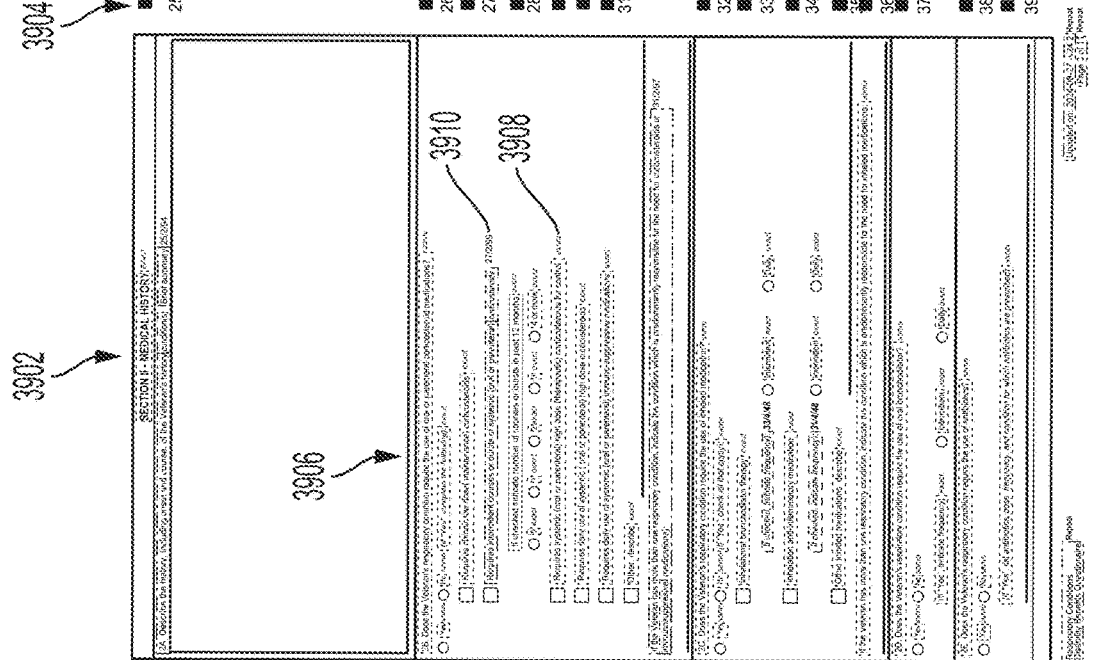
FIG. 39

TEXT STRING COMPARISON FOR DUPLICATE OR NEAR-DUPLICATE TEXT DOCUMENTS IDENTIFIED USING AUTOMATED NEAR-DUPLICATE DETECTION FOR TEXT DOCUMENTS

REFERENCE TO RELATED APPLICATIONS

This is a continuation under 35 U.S.C. § 120 of co-pending application U.S. Ser. No. 19/047,818 filed Feb. 7, 2025, which is a continuation-in-part under 35 U.S.C. § 120 of co-pending application U.S. Ser. No. 18/896,244 filed on Sep. 25, 2024, which is a continuation under 35 U.S.C. § 120 of U.S. Ser. No. 18/394,209 filed Dec. 22, 2023 and issued on Oct. 22, 2024 as U.S. Pat. No. 12,124,518, which claims the benefit of priority under 35 U.S.C. § 119 (e) to U.S. Provisional Patent Application No. 63/534,168 filed Aug. 23, 2023, and to U.S. Provisional Patent Application No. 63/545,668 filed Oct. 25, 2023, the entirety of each of which is hereby incorporated by reference herein.

TECHNICAL FIELD

The present disclosure relates generally to natural language processing on a computer. More specifically, but not by way of limitation, this disclosure relates to a computer system that can automatically identify text documents that are duplicates, or near duplicates, of one another.

BACKGROUND

Unstructured text is now one of the most common types of data generated by humans and is growing at an exponential rate. Unstructured text refers to natural language text that includes written human language, such as the free-form text humans type on their keyboards or touch screens. Examples of unstructured text can include social media posts (e.g., tweets), product or service reviews, blog posts, books, e-mails, word processing documents, etc. Unstructured text is different from structured data, which is organized in a pre-defined format from which well-defined semantics can be inferred.

Unstructured text is used in a variety of industries for various purposes. This process normally begins with an entity obtaining a huge library of text documents containing unstructured text for analysis and processing. Although commonly referred to as "text documents," the term "document" is not limited to a document format and may be any type of textual dataset in any suitable format for storing unstructured text. These libraries may include millions or billions of text documents, which can be used for any number of downstream processes such as training machine-learning models (e.g., neural networks).

SUMMARY

One example of the present disclosure includes a system including one or more processors and one or more memories. The one or more memories include program code that is executable by the one or more processors for causing the one or more processors to perform operations. The operations can include one or more memories including program code that is executable by the one or more processors for causing the one or more processors to receive a first document and a second document, the first document including first textual content and the second document including second textual content. The operations can include extracting a first set of text strings from the first textual content and a second set of text strings from the second textual content. The operations can include normalizing the first set of text strings and the second set of text strings using a predefined normalization scheme to generate a first normalized set of text strings and a second normalized set of text strings, respectively. The operations can include identifying boiler-plate text segments in the first normalized set of text strings and the second normalized set of text strings. The operations can include removing the boilerplate text segments from the first normalized set of text strings and the second normalized set of text strings to generate a first filtered set of text strings and a second filtered set of text strings, respectively. The operations can include dividing the first filtered set of text strings and the second filtered set of text strings by identifying section indicators to generate first sectioned text strings and second sectioned text strings, respectively, the first sectioned text strings and the second sectioned text strings each including one or more sections. The operations can include, for each section of the first sectioned text strings and the second sectioned text strings, respectively, generating groupings of text strings by grouping text strings that satisfy one or more merging criteria, such that each grouping of text strings in the first sectioned text strings has a corresponding grouping of text strings in the second sectioned text strings; determining a similarity score between each pair of corresponding groupings of text strings between the first sectioned text strings and the second sectioned text strings in the section using a predefined similarity scoring technique; and identifying matching groupings of text strings among the corresponding groupings of text strings between the first sectioned text strings and the second sectioned text strings based on the similarity scores. The operations can include generating an output for display showing the first sectioned text strings adjacent to the second sectioned text strings with visual indications of the matching groupings of text strings.

Another example of the present disclosure includes a non-transitory computer-readable medium comprising program code that is executable by the one or more processors for causing the one or more processors to perform operations. The operations can include receiving a first document and a second document, the first document including first textual content and the second document including second textual content. The operations can include extracting a first set of text strings from the first textual content and a second set of text strings from the second textual content. The operations can include normalizing the first set of text strings and the second set of text strings using a predefined normalization scheme to generate a first normalized set of text strings and a second normalized set of text strings, respectively. The operations can include identifying boiler-plate text segments in the first normalized set of text strings and the second normalized set of text strings. The operations can include removing the boilerplate text segments from the first normalized set of text strings and the second normalized set of text strings to generate a first filtered set of text strings and a second filtered set of text strings, respectively. The operations can include dividing the first filtered set of text strings and the second filtered set of text strings by identi-fying section indicators to generate first sectioned text strings and second sectioned text strings, respectively, the first sectioned text strings and the second sectioned text strings each including one or more sections. The operations can include, for each section of the first sectioned text strings and the second sectioned text strings, respectively, generating groupings of text strings by grouping text strings that satisfy one or more merging criteria, such that each grouping of text strings in the first sectioned text strings has a corresponding grouping of text strings in the second sectioned text strings; determining a similarity score between each pair of corresponding groupings of text strings between the first sectioned text strings and the second sectioned text strings in the section using a predefined similarity scoring technique; and identifying matching groupings of text strings among the corresponding groupings of text strings between the first sectioned text strings and the second sectioned text strings based on the similarity scores. The operations can include generating an output for display showing the first sectioned text strings adjacent to the second sectioned text strings with visual indications of the matching groupings of text strings.

Yet another example of the present disclosure includes a method of operations, which can be implemented by one or more processors. The operations can include receiving one or more new documents. The operations can include receiving a first document and a second document, the first document including first textual content and the second document including second textual content. The operations can include extracting a first set of text strings from the first textual content and a second set of text strings from the second textual content. The operations can include normalizing the first set of text strings and the second set of text strings using a predefined normalization scheme to generate a first normalized set of text strings and a second normalized set of text strings, respectively. The operations can include identifying boilerplate text segments in the first normalized set of text strings and the second normalized set of text strings. The operations can include removing the boilerplate text segments from the first normalized set of text strings and the second normalized set of text strings to generate a first filtered set of text strings and a second filtered set of text strings, respectively. The operations can include dividing the first filtered set of text strings and the second filtered set of text strings by identifying section indicators to generate first sectioned text strings and second sectioned text strings, respectively, the first sectioned text strings and the second sectioned text strings each including one or more sections. The operations can include, for each section of the first sectioned text strings and the second sectioned text strings, respectively, generating groupings of text strings by grouping text strings that satisfy one or more merging criteria, such that each grouping of text strings in the first sectioned text strings has a corresponding grouping of text strings in the second sectioned text strings; determining a similarity score between each pair of corresponding groupings of text strings between the first sectioned text strings and the second sectioned text strings in the section using a predefined similarity scoring technique; and identifying matching groupings of text strings among the corresponding groupings of text strings between the first sectioned text strings and the second sectioned text strings based on the similarity scores. The operations can include generating an output for display showing the first sectioned text strings adjacent to the second sectioned text strings with visual indications of the matching groupings of text strings.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 5 shows a flow chart showing an example process for adjusting a communications grid or a work project in a communications grid after a failure of a node according to some aspects of the present disclosure.

FIG. 15 shows examples of a transformation process for transforming text documents according to some aspects of the present disclosure.

5

Figure 19:
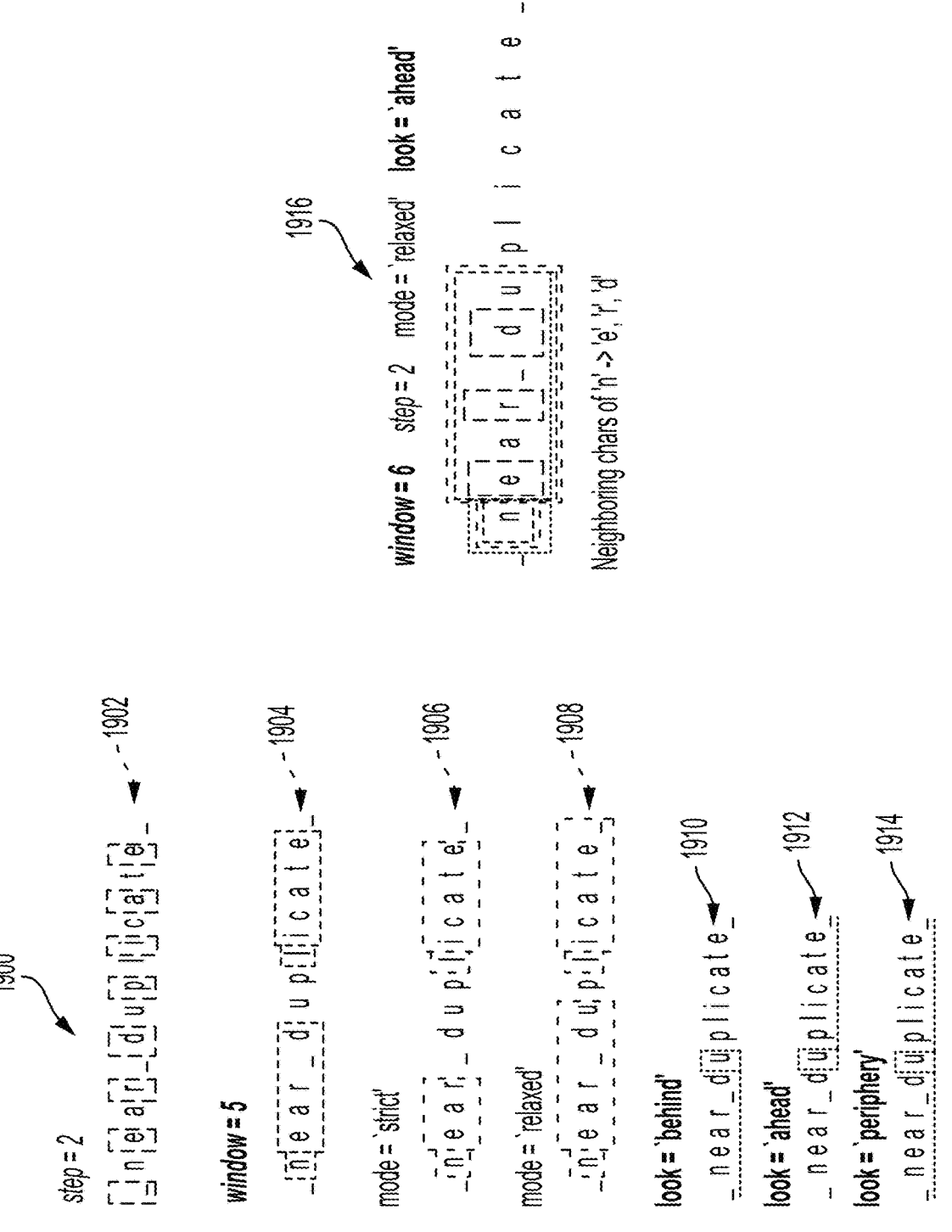

FIG. 19 shows examples of properties for a conversion process according to some aspects of the present disclosure.

Figure 20:
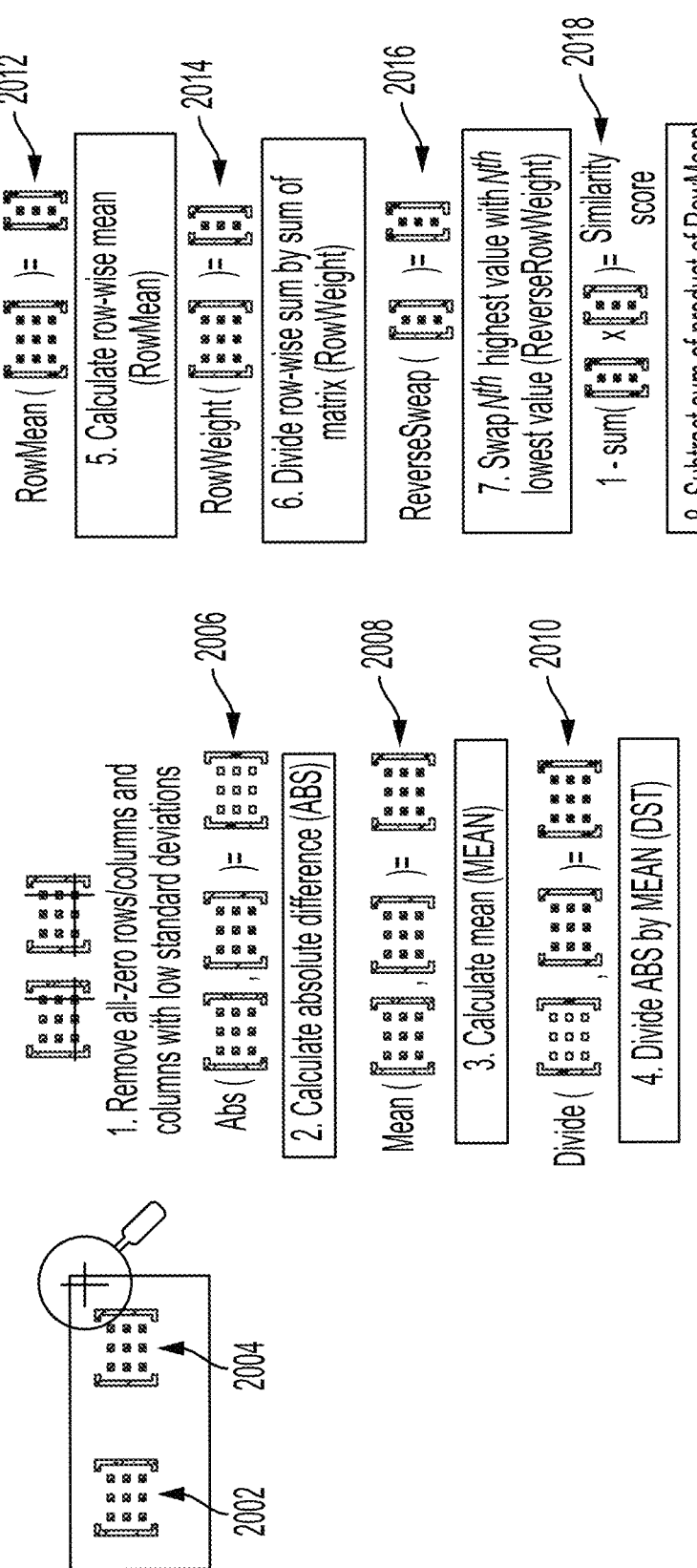

FIG. 20 shows an example of a process for generating similarity scores for text documents according to some aspects of the present disclosure.

Figure 21:
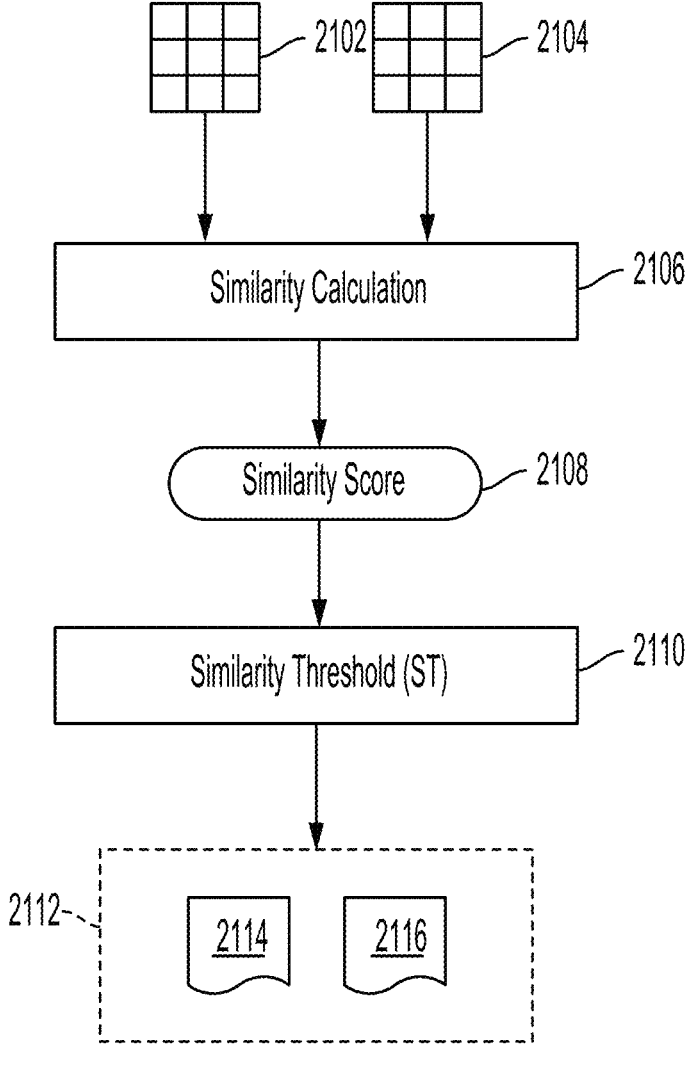

FIG. 21 shows an example of a process for identifying duplicate or near-duplicate documents based on similarity scores according to some aspects of the present disclosure.

FIG. 22 shows a flowchart of an example of a process for identifying duplicate and near-duplicate text documents according to some aspects of the present disclosure.

Figure 23:
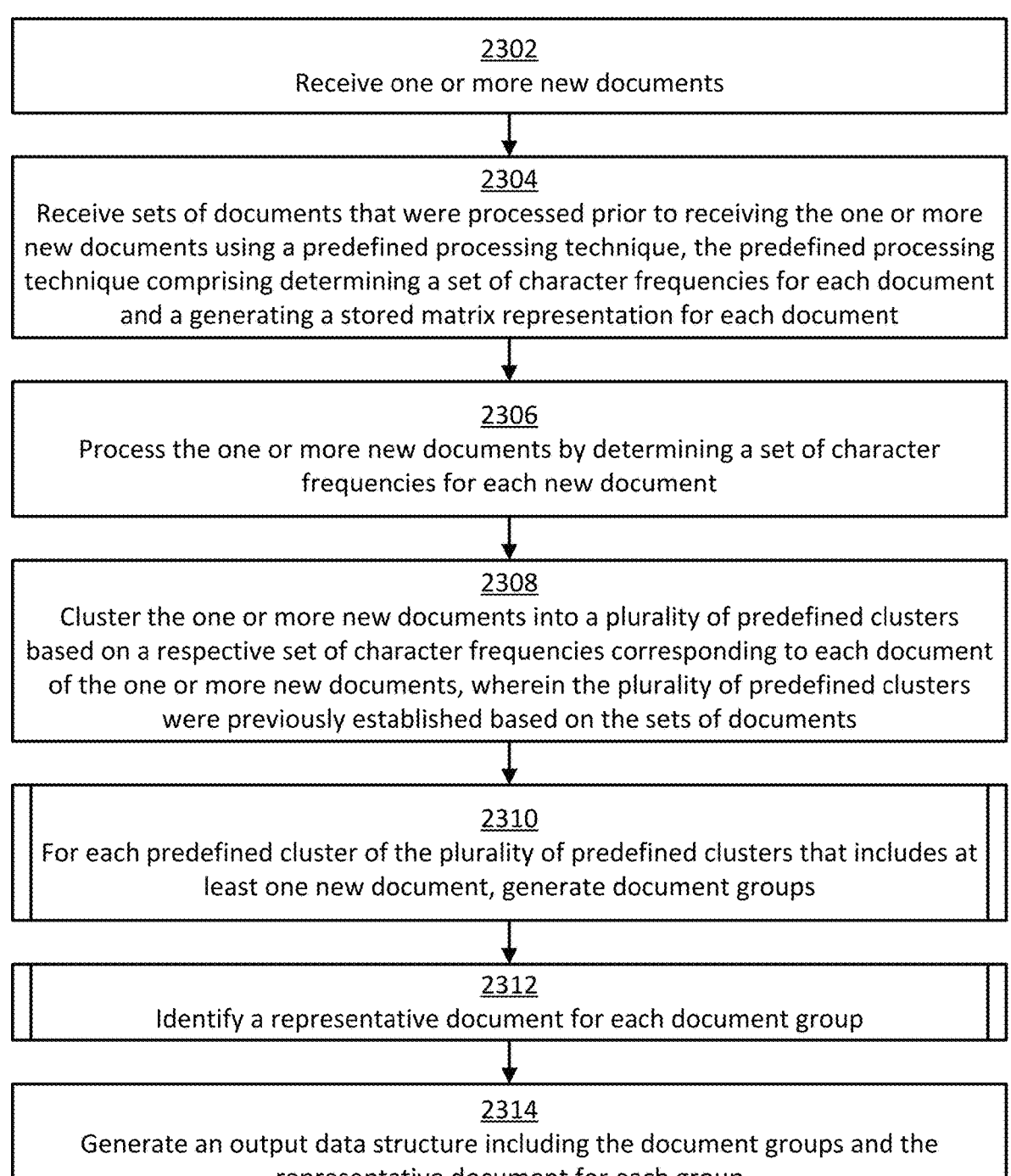

FIG. 23 shows a flowchart of an example of a process for expediting processing of new documents according to some aspects of the present disclosure.

Figure 24A:
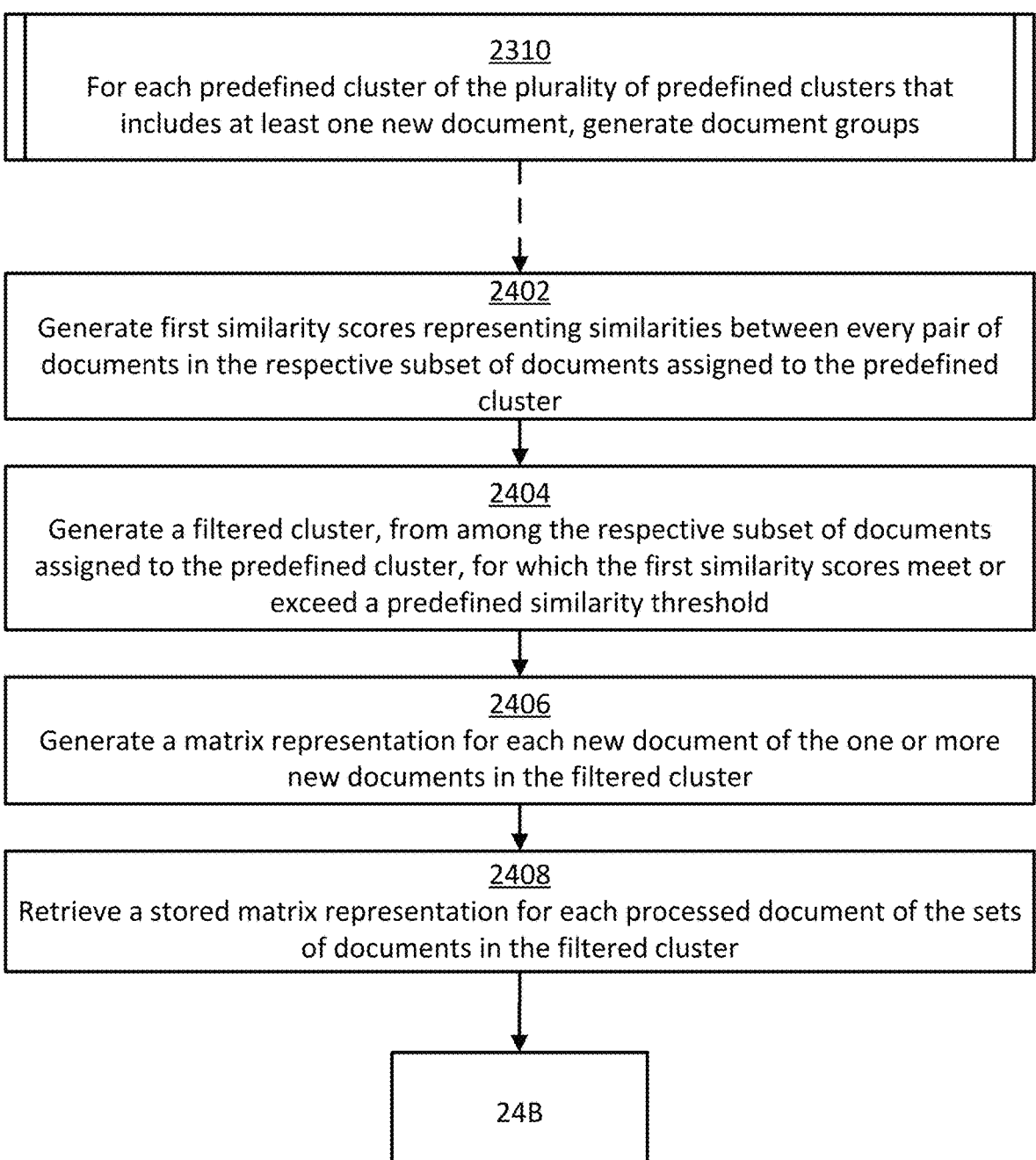

FIGS. 24A-B show a flowchart of an example of a process for generating document groups for each predefined cluster of a plurality of predefined clusters that includes at least one new document according to some aspects of the present disclosure.

Figure 25B:
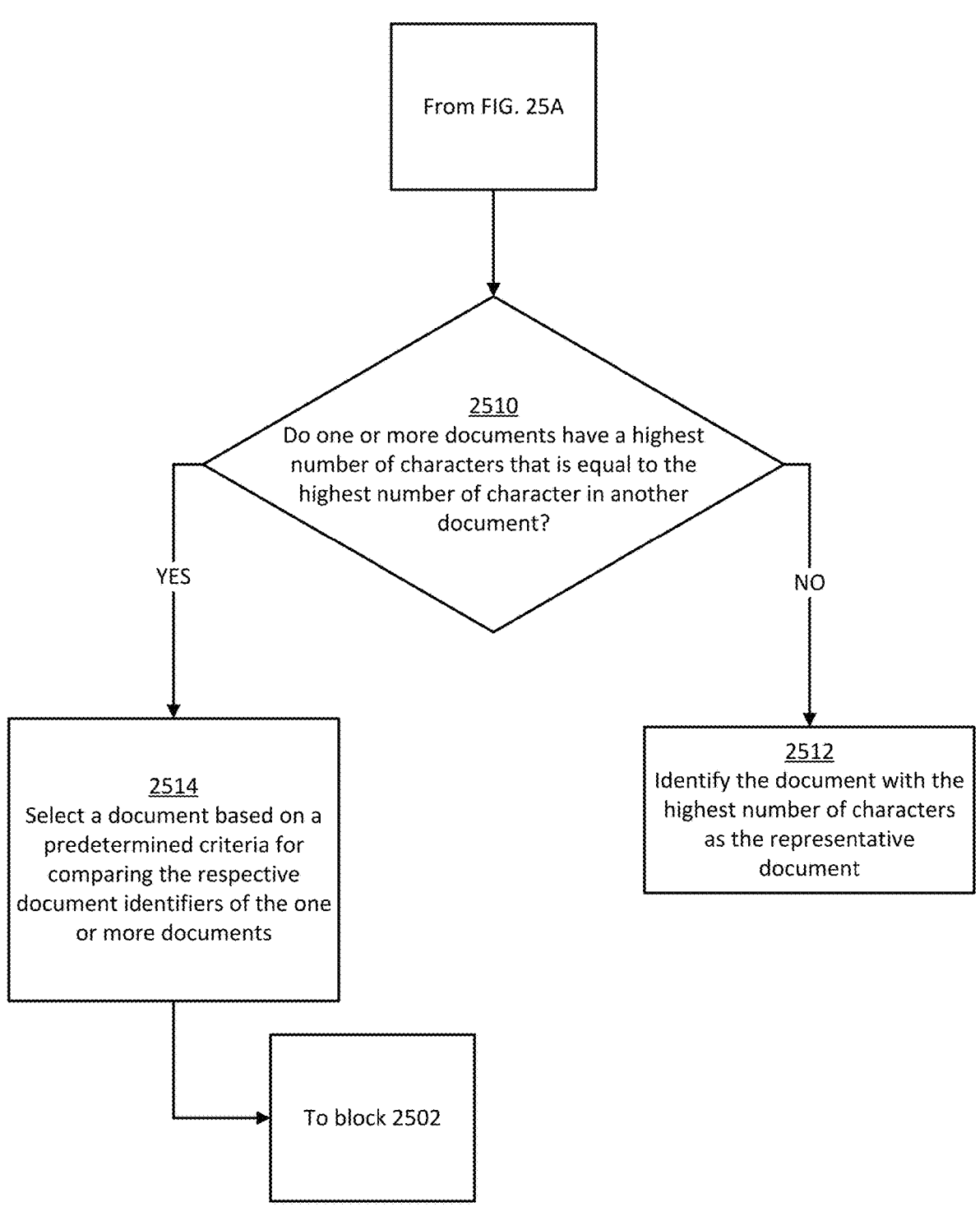

FIGS. 25A-B show a flowchart of an example of a process for identifying a representative document for a set of document groups according to some aspects of the present disclosure.

FIG. 26 shows a flowchart of an example of a process for identifying and removing sets of exact duplicates from a set of documents according to some aspects of the present disclosure.

FIG. 27 shows a flowchart of an example of a process for generating an output for reviewing documents in a document group according to some aspects of the present disclosure.

FIGS. 28A and 28B show examples of the output shown in a tabular format according to some examples of the present disclosure.

Figure 29:
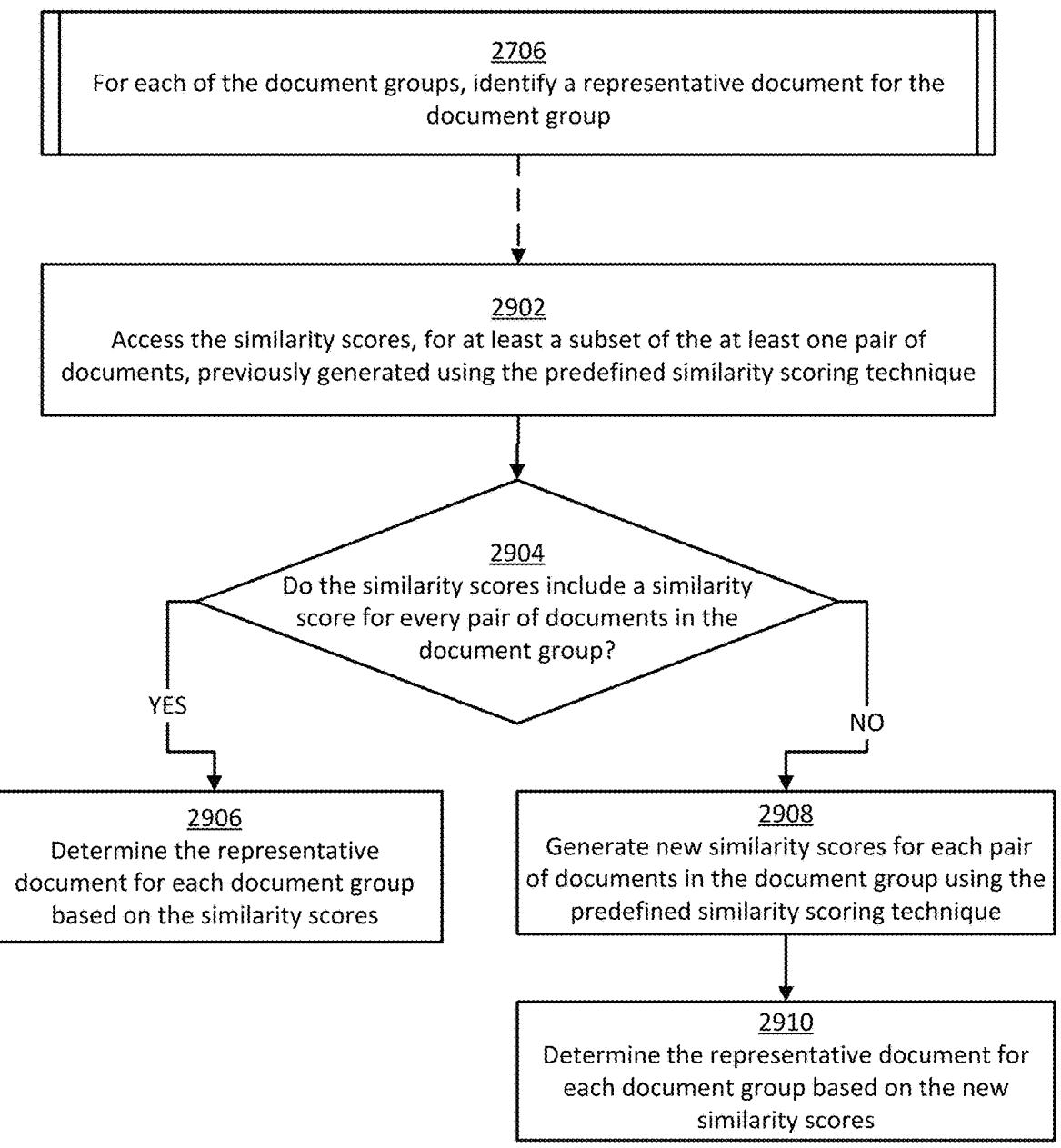

FIG. 29 shows a flowchart of an example of a process implementing the operation including identifying a representative document for the document group according to some aspects of the present disclosure.

FIG. 30 shows a flowchart of an example of a process implementing the operation of determining the representative document for each document group based on similarity scores according to some aspects of the present disclosure.

FIG. 31 shows a flowchart of an example of a process for generating an output for comparing documents including visual indications of the matching groupings of text strings determined using a similarity scoring technique according to some aspects of the present disclosure.

Figure 32:
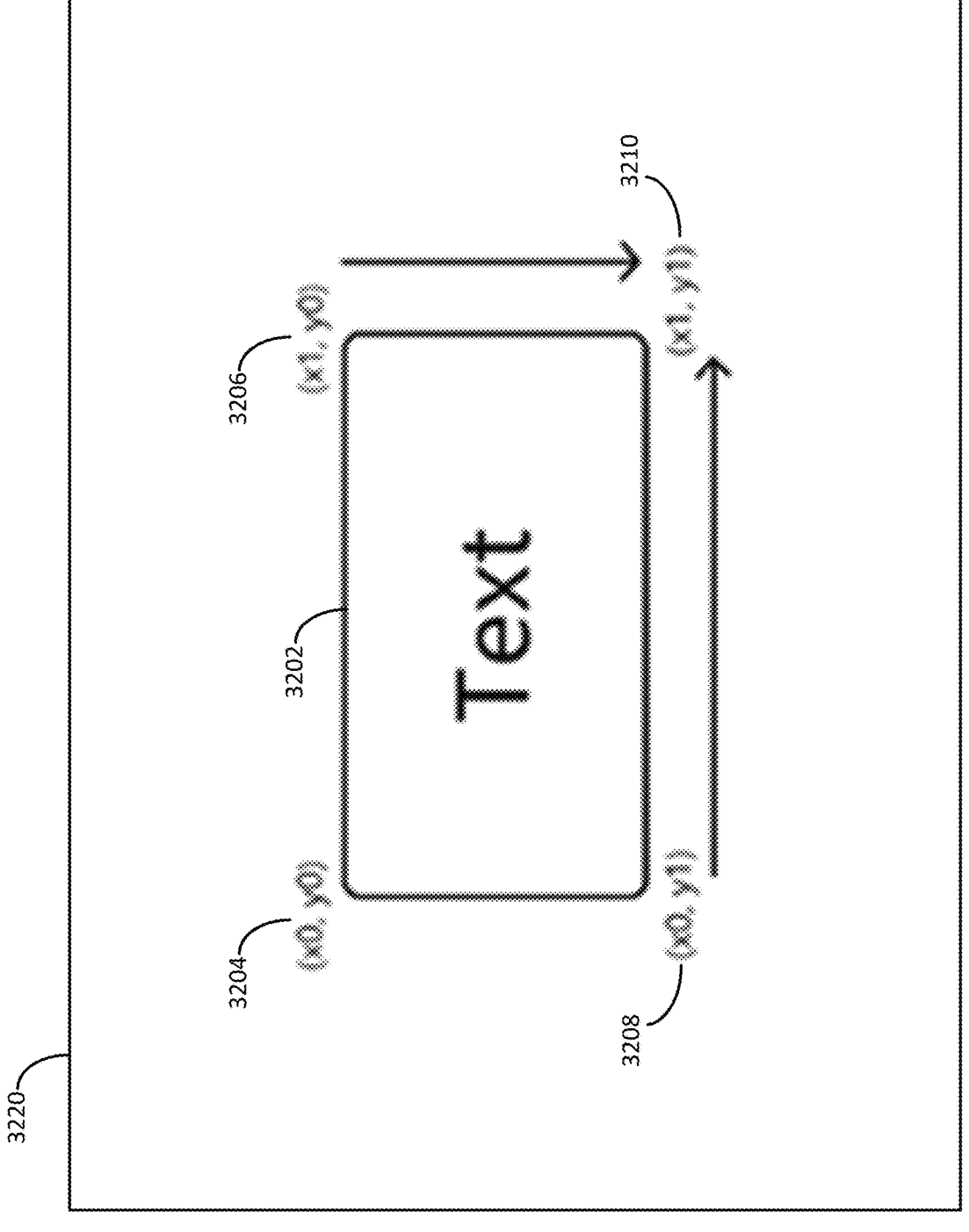

FIG. 32 shows an example of an extracted text string and corresponding set of coordinates according to some aspects of the present disclosure.

FIG. 33 shows a flowchart of an example of a process for identifying boilerplate text segments in the first normalized set of text strings and the second normalized set of text strings according to some aspects of the present disclosure.

Figure 34:
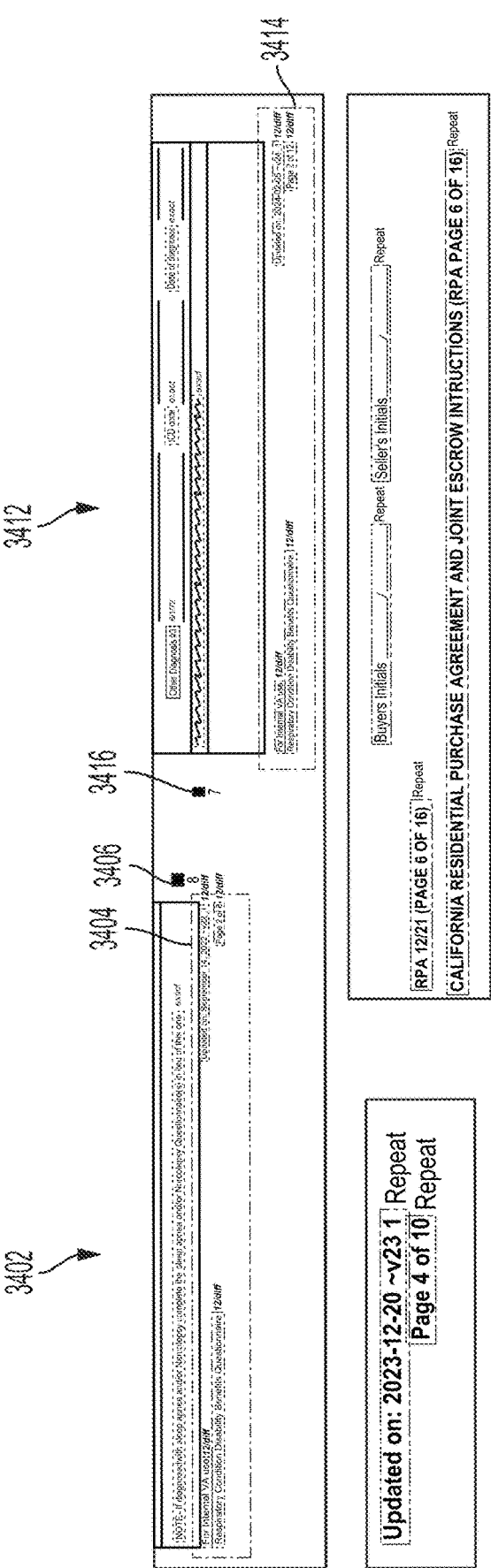

FIG. 34 shows an example of identified boilerplate content according to some aspects of the present disclosure.

FIG. 35 shows a flowchart of an example of a process for identifying section indicators to generate first sectioned text strings and second sectioned text strings according to some aspects of the present disclosure.

Figures 36A, 36B:
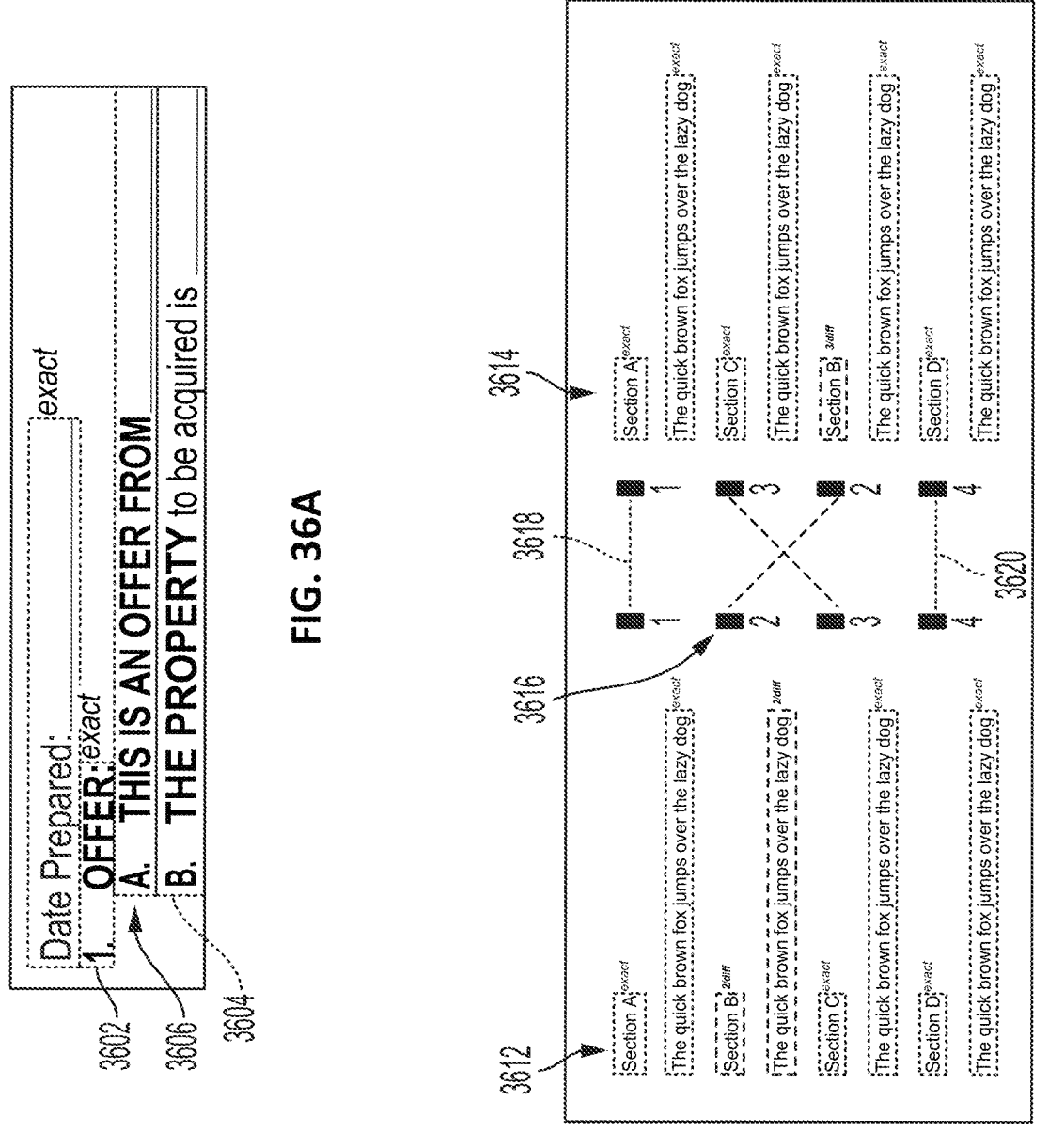

FIG. 36A shows an illustration of a method for distinguishing vertically adjacent text strings according to some aspects of the present disclosure.

FIG. 36B shows an illustration of out-of-sequence section identifiers according to some aspects of the present disclosure.

FIG. 37 shows a flowchart of an example of a process for identifying matching groupings of text strings between the first sectioned text strings and the second sectioned text strings according to some aspects of the present disclosure.

Figures 38A, 38B:
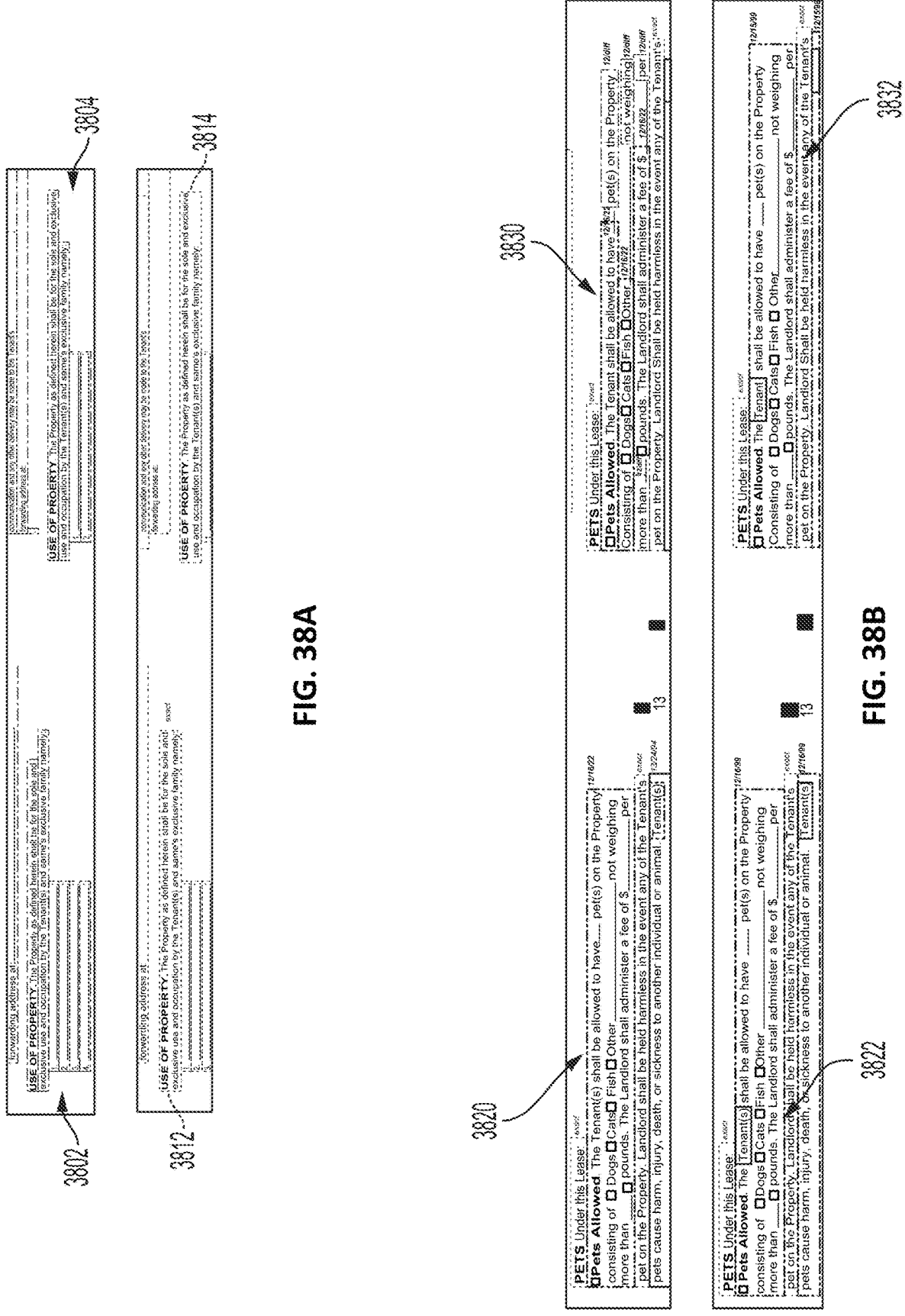

FIG. 38A shows an example application of one or more merging criteria according to some aspects of the present disclosure.

FIG. 38B shows an illustration of merging groupings of text strings using similarity scores according to some aspects of the present disclosure.

FIG. 39 shows an example of a graphical user interface generated for display showing the first sectioned text strings adjacent to the second sectioned text strings, with visual indications of the matching groupings of text strings, according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Various industries may use huge libraries of millions or billions of text documents to perform downstream processes. Given the size of these libraries, it is common for them to contain duplicate or near-duplicate documents. Duplicate documents are text documents that are identical to one another. Near-duplicate documents are text documents that are very similar to one another, for example at the string level rather than the semantic level. One example of near-duplicate documents may be different versions of the same text document with only minor character-level differences, such as a replaced word or a spelling correction. Because the presence of these duplicate and near-duplicate documents in the library consume storage space, require processing power to process, and can negatively affect downstream processes, it may be desirable to remove them or at least identify them prior to the start of a downstream process. While there are some accurate and fast approaches to identifying duplicate documents, it is challenging for a computer system to automatically and accurately identify near-duplicate documents in these large libraries.

Some examples of the present disclosure can overcome one or more of the abovementioned problems by providing an accurate, automated process through which a computer system can identify duplicate and near-duplicate documents in a library of text documents. In general, the process can allow the computer system to automatically detect text documents that exhibit complete or partial duplication at the string level by analyzing the difference in character frequencies between text documents, among other things. More specifically, the process can involve transforming the text documents using a combination of transliteration and Unicode encoding. The transformed text documents can then be clustered based on their unique character frequencies. In each cluster, document pairs can be filtered based on the cosine similarity of their Term Frequency Inverse Document Frequency (TF-IDF) values. The documents that remain in a cluster after applying the filtering can be transformed into neighbor-character frequency matrices. These matrices can then be used to generate similarity scores associated with pairs of documents. If the similarity score associated with a pair of documents meets or exceeds a similarity threshold, the pair of documents can be identified as duplicate and near-duplicate documents to one another. This process can be automatically performed on some or all of the documents in the library, so that the computer system can rapidly and accurately identify duplicate and near-duplicate pairs or sets of documents. This may allow for the duplicate and near-duplicate documents to be deleted, moved, grouped into sets of related documents, or otherwise addressed to prevent any unwanted downstream effects.

As alluded to above, the automated process can generally involve five steps—transformation, clustering, filtering, feature extraction, and matrix similarity scoring. Though, in some examples, more or fewer steps may be employed. Each of these steps will now be briefly described in turn.

Starting with the transformation step, the transformation step can be designed to help in situations where the language in which the text document is written has a very large alphabet, such as Chinese which has hundreds of characters. For a given character in the text document, the computer system can generate a transliterated string of the character in Latin script. The computer system can then concatenate the transliterated string with a byte string (e.g., Unicode encoded representation) of the character to serve as a new representation for the character. This process can be repeated for each character in the text document, to thereby transform the text document. The transformed text document may contain information that facilitates the clustering step and the feature extraction step, thereby enabling the process to be applied uniformly across different languages. For languages with a smaller alphabet, such as English, the alphabetic characters can simply be transformed into all lowercase form or all uppercase form. Any special characters that appear in the text document but that are not standard alphabet characters (e.g., $, @, *, or &) can be assessed by the user to decide whether they are important to distinguish text documents. If so, such characters can be added to the standard alphabet for use in subsequent steps.

After the transformation step, the computer system can perform the clustering step using the transformed text documents. During the clustering process, the computer system can determine the unique character frequencies associated with each text document. A unique character frequency is a frequency of a unique alphabet character in the text document—e.g., the number of times in which a particular character occurs in the text document. The unique character frequencies for a given text document can be incorporated as a row in a unique character matrix. The rows of the unique character matrix can correspond to the text documents, the columns of the unique character matrix can correspond to the unique characters, and the values of the unique character matrix can correspond to the frequencies of the unique characters in each text document. The computer system can then selectively refine the unique character matrix by retaining only the characters (e.g., columns) with frequencies that exhibit higher variability. This can be achieved by comparing the standard deviation of each column with the average standard deviation across all columns. The refined matrix can be utilized as input for a clustering algorithm, such as a K-means or Gaussian mixture algorithm. The clustering algorithm can process the input to generate clusters of text documents that exhibit a certain level of similarity based on their unique character frequencies.

After the clustering step, the computer system can perform the filtering step based on the clusters. The filtering step can involve vectorizing the text documents in a given cluster into TF-IDF values, computing the pairwise cosine similarity of the TF-IDF values, and retaining pairs of documents in the cluster that have pairwise cosine similarity scores that meet or exceed a predefined similarity threshold. Pairs of documents that have pairwise cosine similarity scores below the predefined similarity threshold can be removed from the cluster. This can allow for rapid identification of high-quality near-duplicate candidate pairs once many documents have been clustered into distinct groups.

The next step can involve a feature extraction process in which the remaining text documents in each cluster are converted into neighbor-character frequency matrices. These matrices can serve as compact and informative representations of the original text documents. The neighbor-character frequency matrix can function as a distinctive fingerprint for comparing text similarity. This character-level fingerprint also offers the flexibility to customize the level of precision for detection, going beyond the constraints of word-level analysis. To generate a neighbor-character frequency matrix for a text document in a cluster, the computer system can use spaces in the text document as a word delimiter or a character delimiter. The computer system can look for a space before or after a target character in a text document, select neighboring characters adjacent to the target character based on predefined options (e.g., window size, mode, and look direction), count the frequencies of the neighboring characters, and use the frequency counts as values in the neighbor-character frequency matrix. This can be repeated, for example until all unique characters in the text document are used as the target character to identify their neighboring characters, to construct the neighbor-character frequency matrix for the text document.

After generating the neighbor-character frequency matrices for the text documents in a given cluster, the computer system can compute a respective similarity score for each pair of neighbor-character frequency matrices in the cluster. The computer system can then compare the similarity scores to a predefined similarity threshold. If the similarity score for a pair of the neighbor-character frequency matrices meets or exceeds the predefined similarity threshold, the computer system can identify the corresponding pair of text documents as duplicate or near-duplicate documents. Through this sequence of steps, the computer system can rapidly and accurately identify duplicate and near-duplicate text documents, for example in a library of millions or billions of text documents.

Following identifications of duplicate and near-duplicate text documents, multiple possible follow-on applications may be pursued. For example, new documents may be later added to the library of text documents following the identification of duplicate and near-duplicate text documents in the original library. To avoid re-running the identification processes again on the entire corpus, re-use of certain outputs and derivative data generated as a by-product of the identification processes can be incorporated into an abbreviated process disclosed herein, which can avoid duplication of certain operations, resulting in a more streamlined approach that saves time and computing resources.

In another example, a cleaner version of the output with improved data quality and reduced noise can be generated. This may lead to an improved user experience when, for example, the identification of duplicate and near-duplicate text documents outputs a raw collection of document identifiers. Such a collection of identifiers may be difficult to understand by themselves as a raw output. Moreover, the identifiers may require additional grouping or processing to be useful for certain follow-on processes. A process for generating an output including a representative document for each of multiple similar document groups, along with the other documents in the group, and the similarity score relative to the representative document is disclosed.

In yet another example, even given the cleaner output described in the previous paragraph, it may still be desirable to further view the differences and similarities between these the duplicate and near-duplicate documents with higher granularity, resolution, or precise means for comparison between two documents. For example, it may be desirable to examine, visually, how certain text segments in the duplicate and near-duplicate documents overlap or relate to one another. Existing approaches may be inaccurate or overwhelm users with a flood of irrelevant differences, resulting in a poor user experience. The present disclosure describes a text-string comparison technique that can be used to generate a user-friendly output for viewing and analyzing the differences and similarities between two documents.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
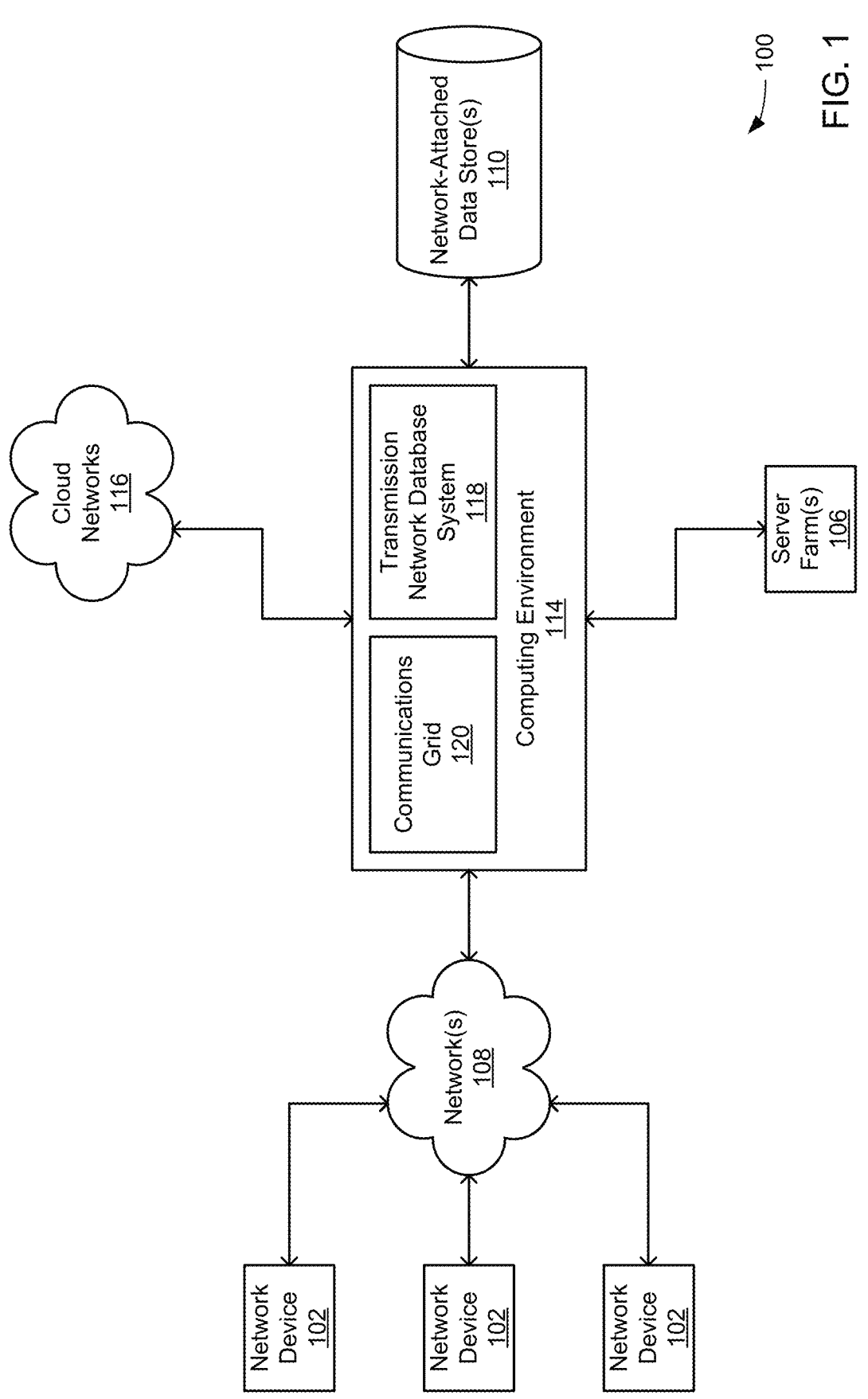
FIG. 1 shows an example of the hardware components of a data transmission network according to some aspects of the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
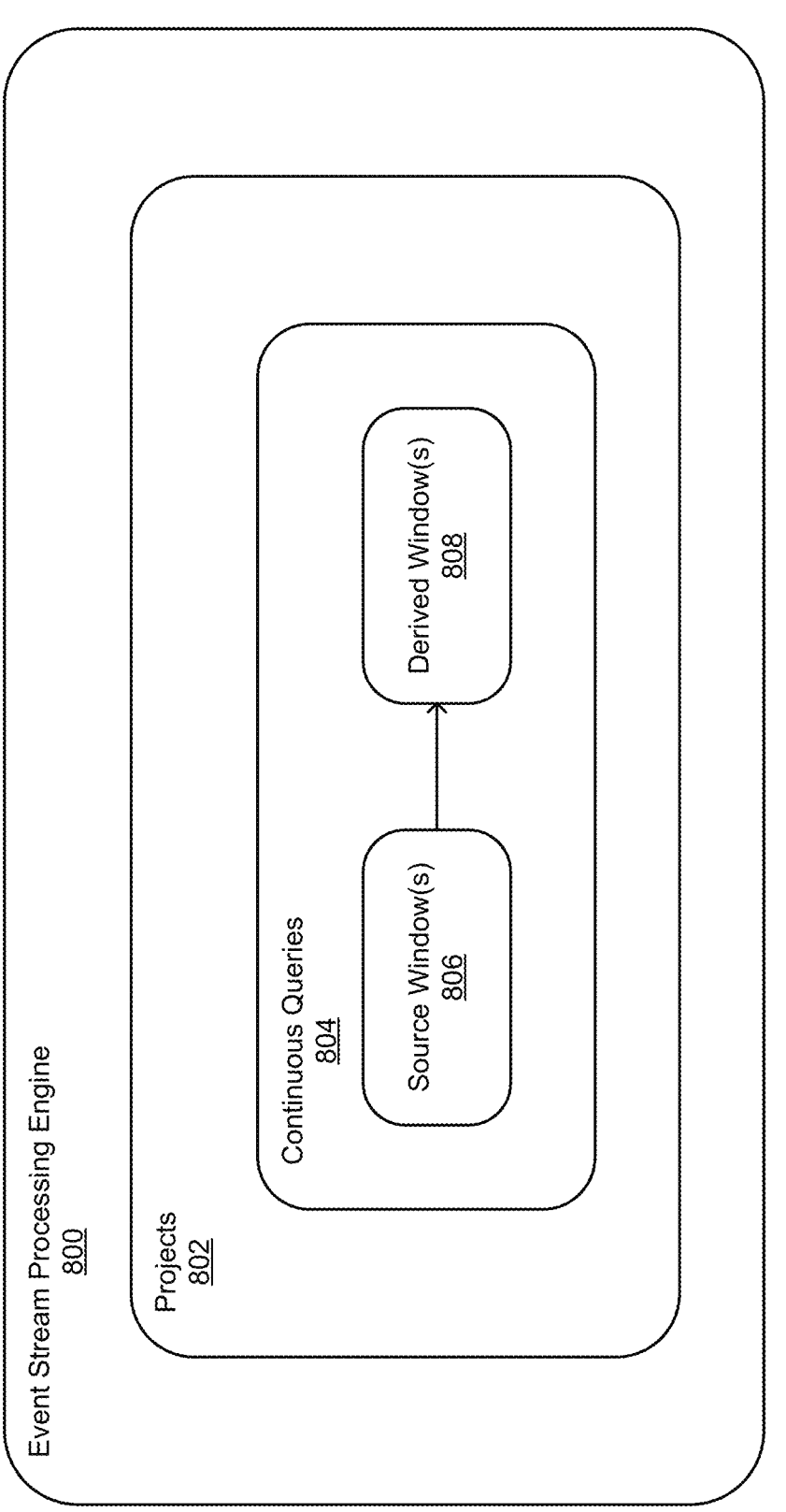
FIG. 8 shows a block diagram including components of an Event Stream Processing Engine (ESPE) according to some aspects of the present disclosure.
Figure 9:
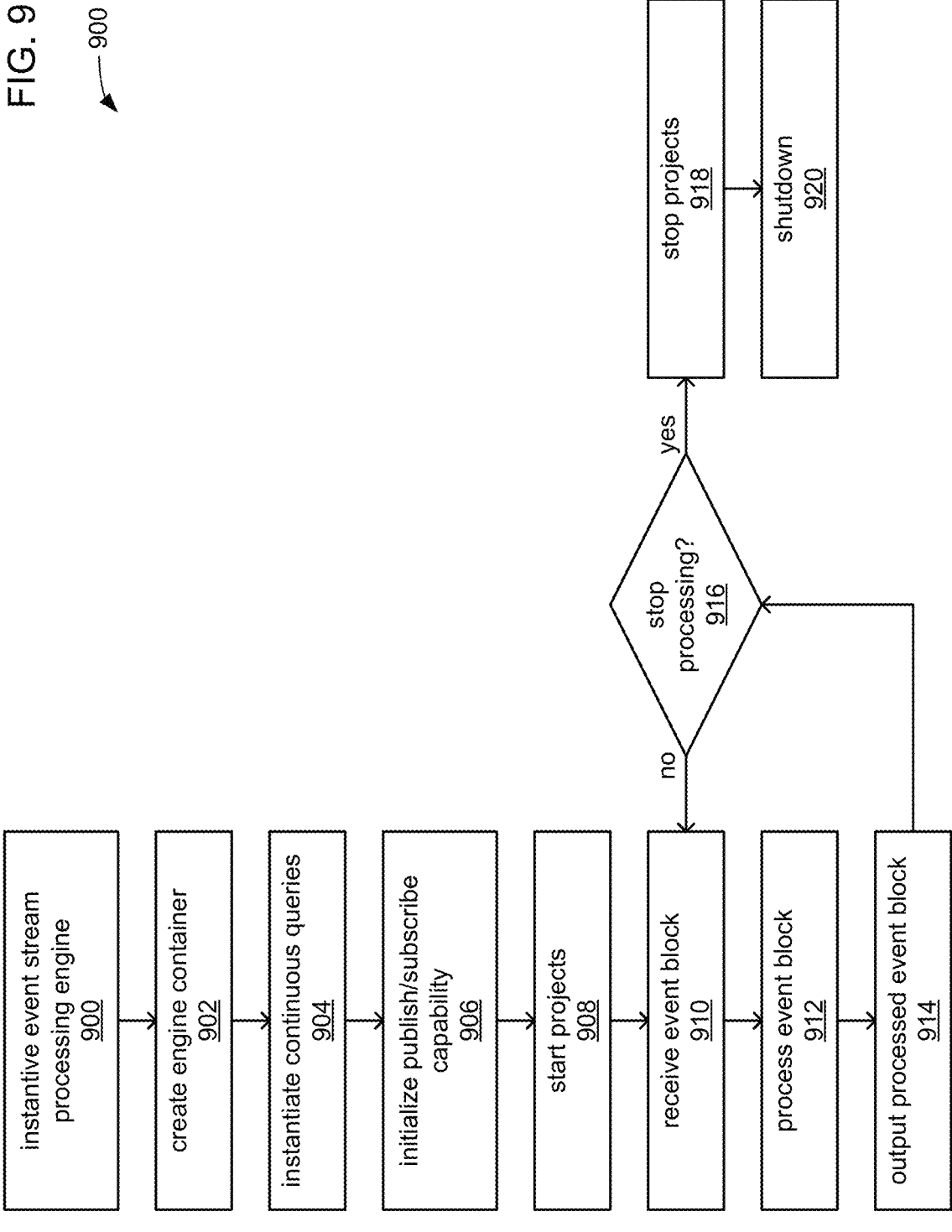
FIG. 9 shows a flow chart of an example process including operations performed by an event stream processing engine according to some aspects of the present disclosure.
Figure 10:
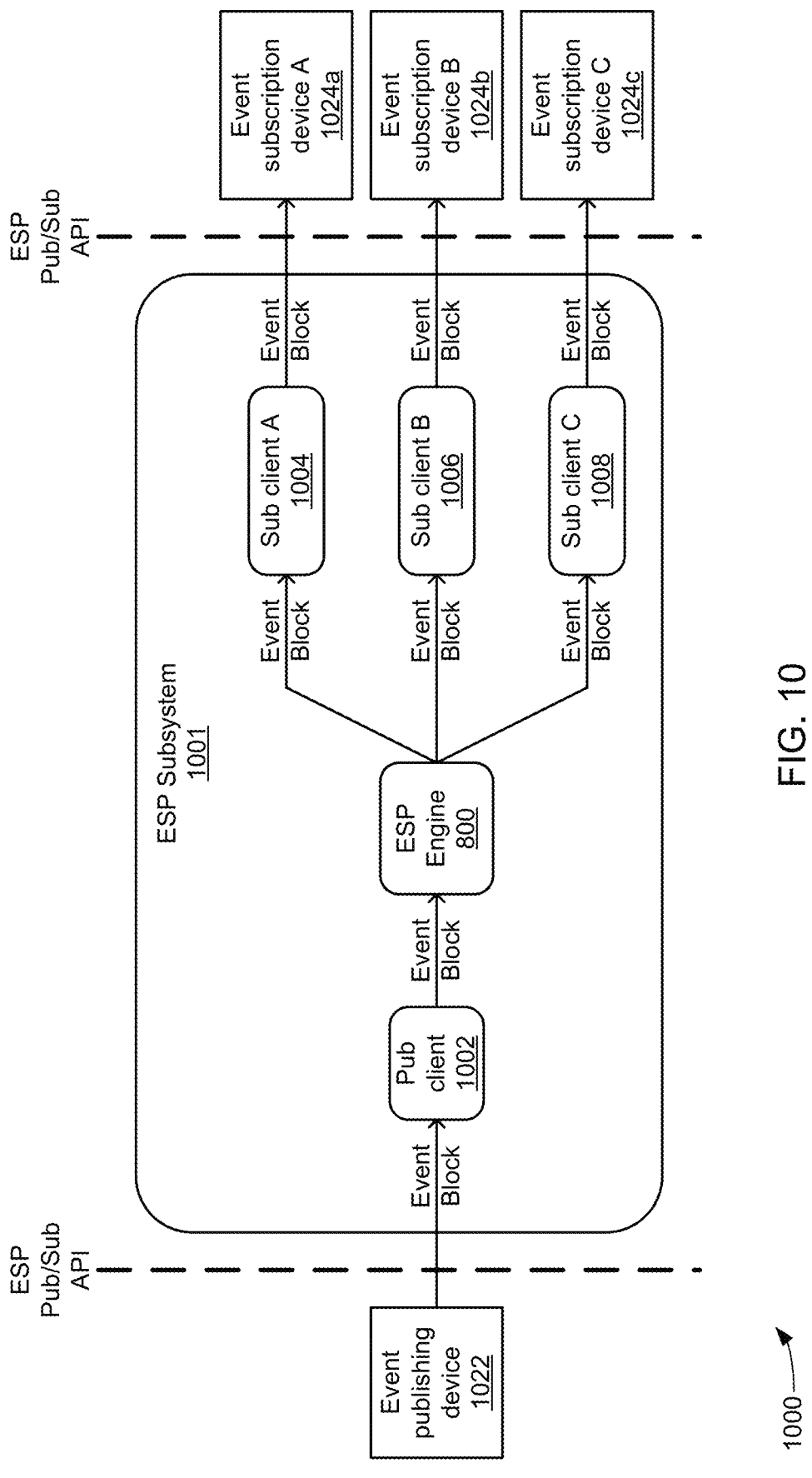
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
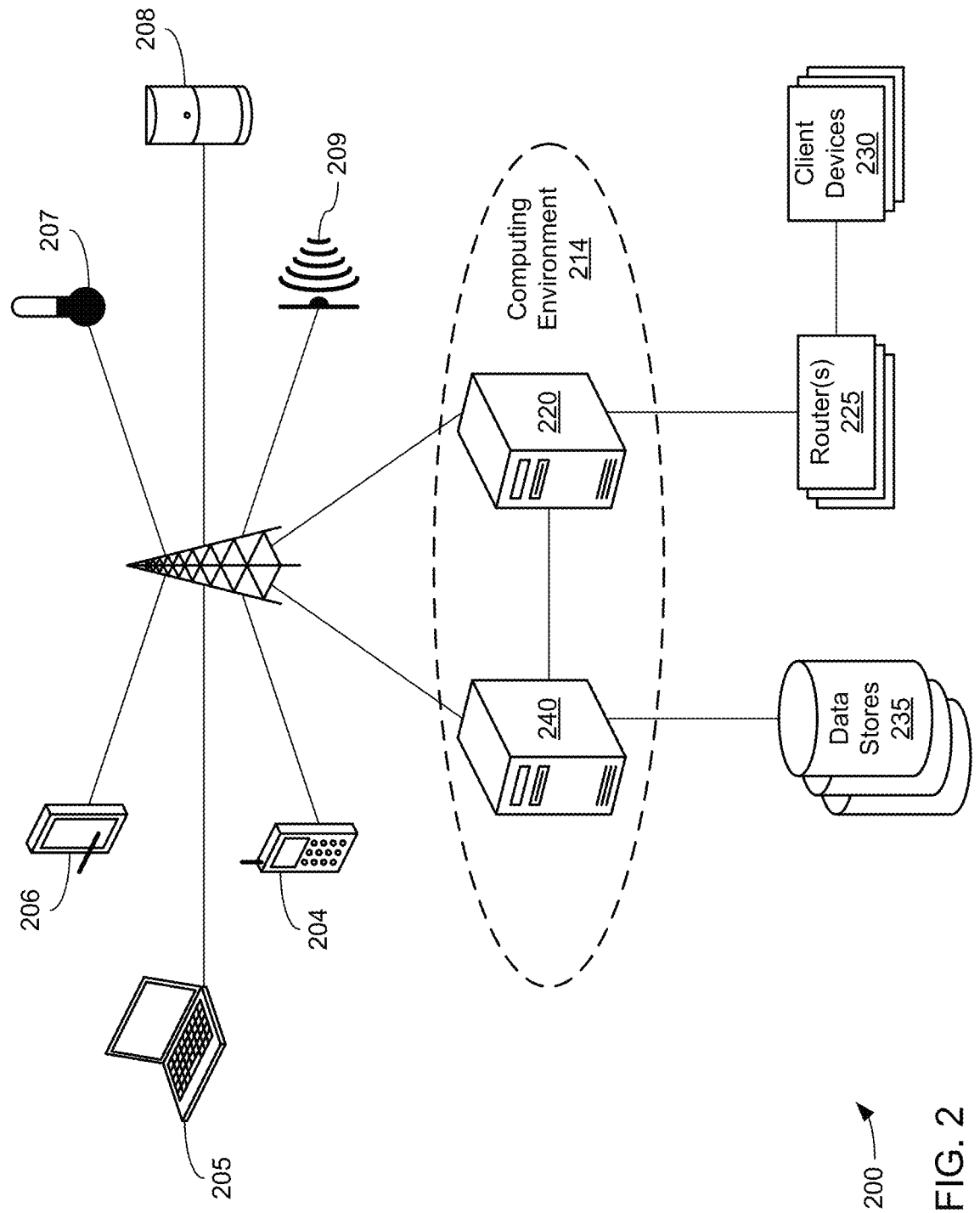
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
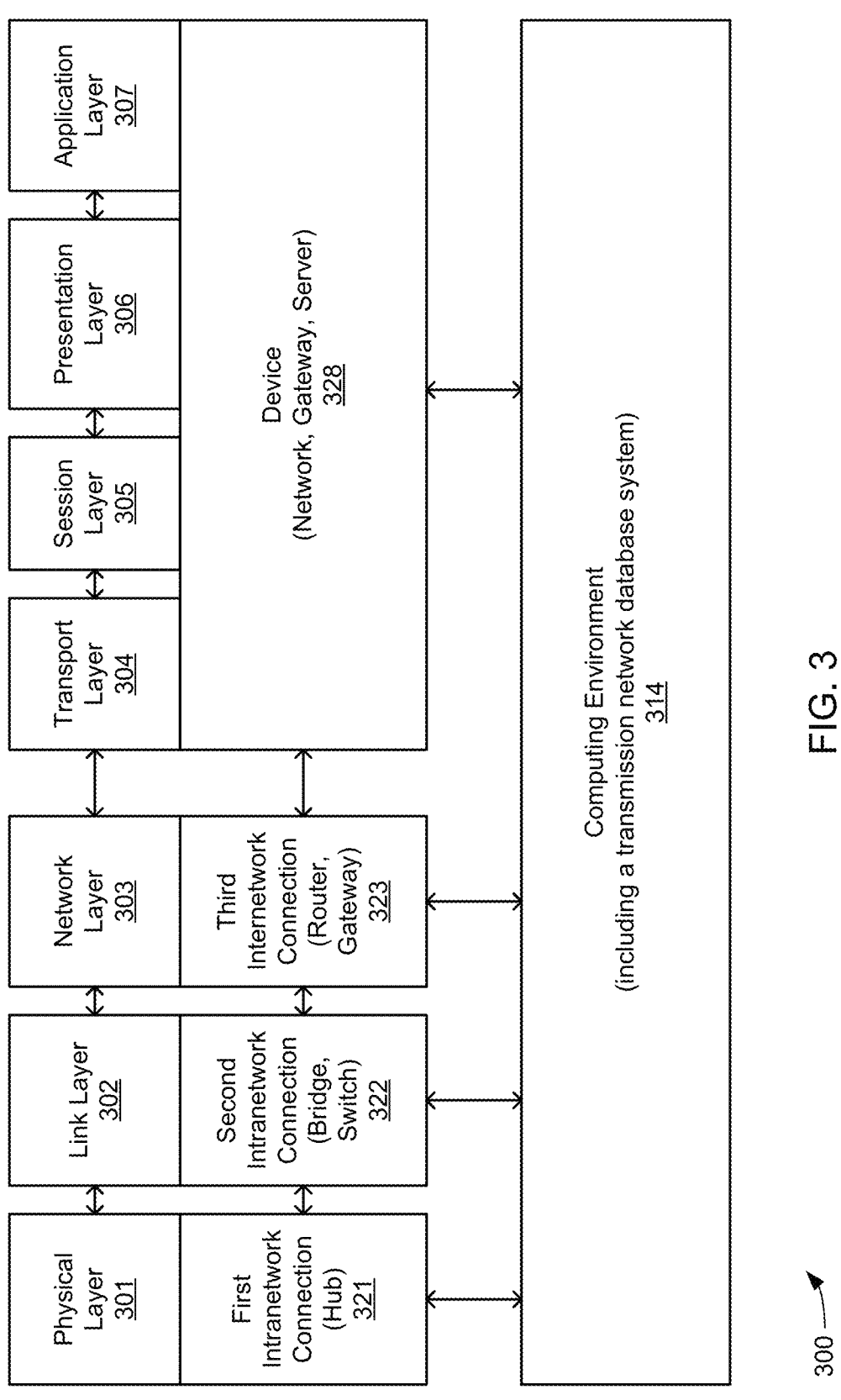
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
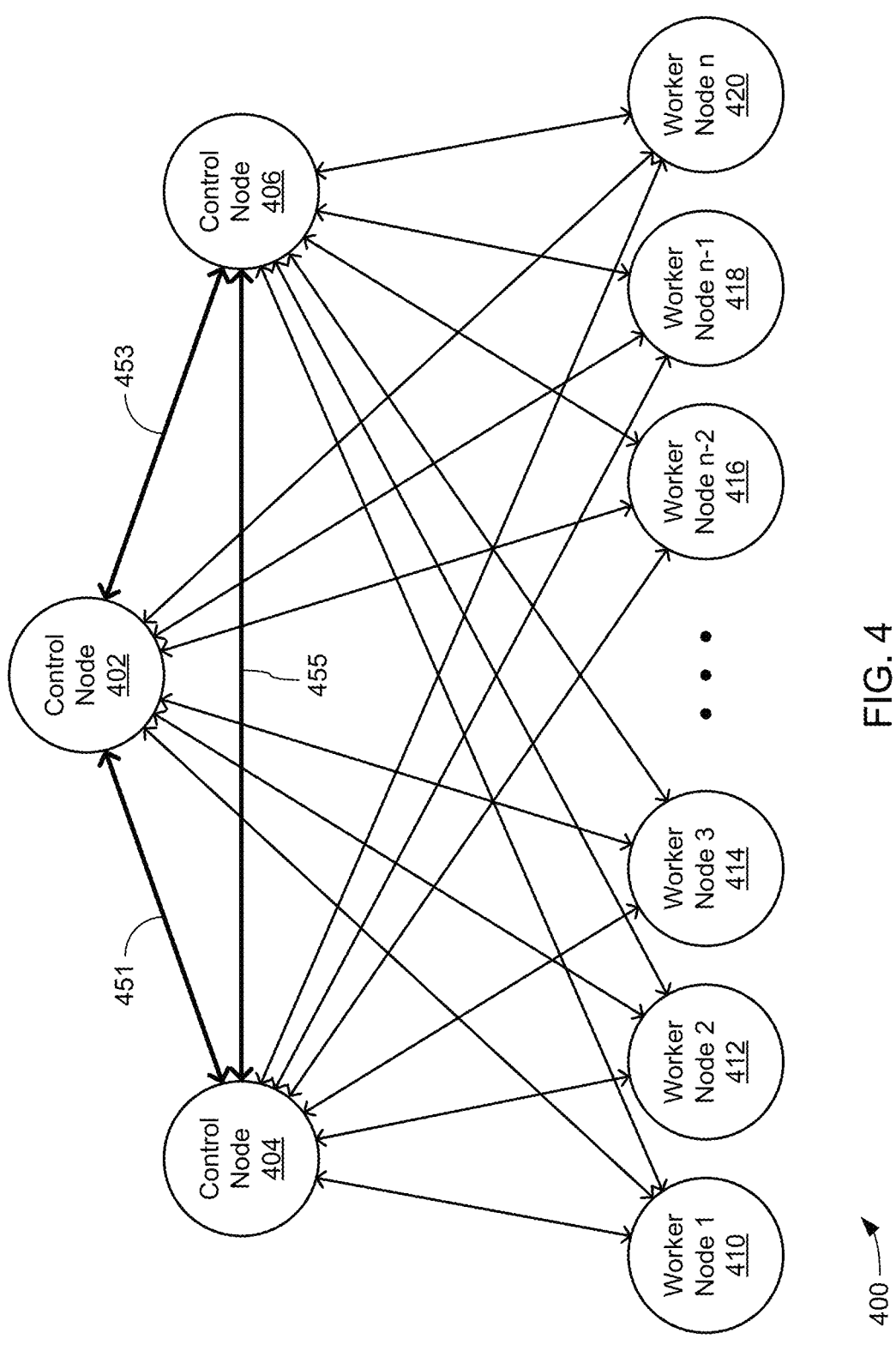
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
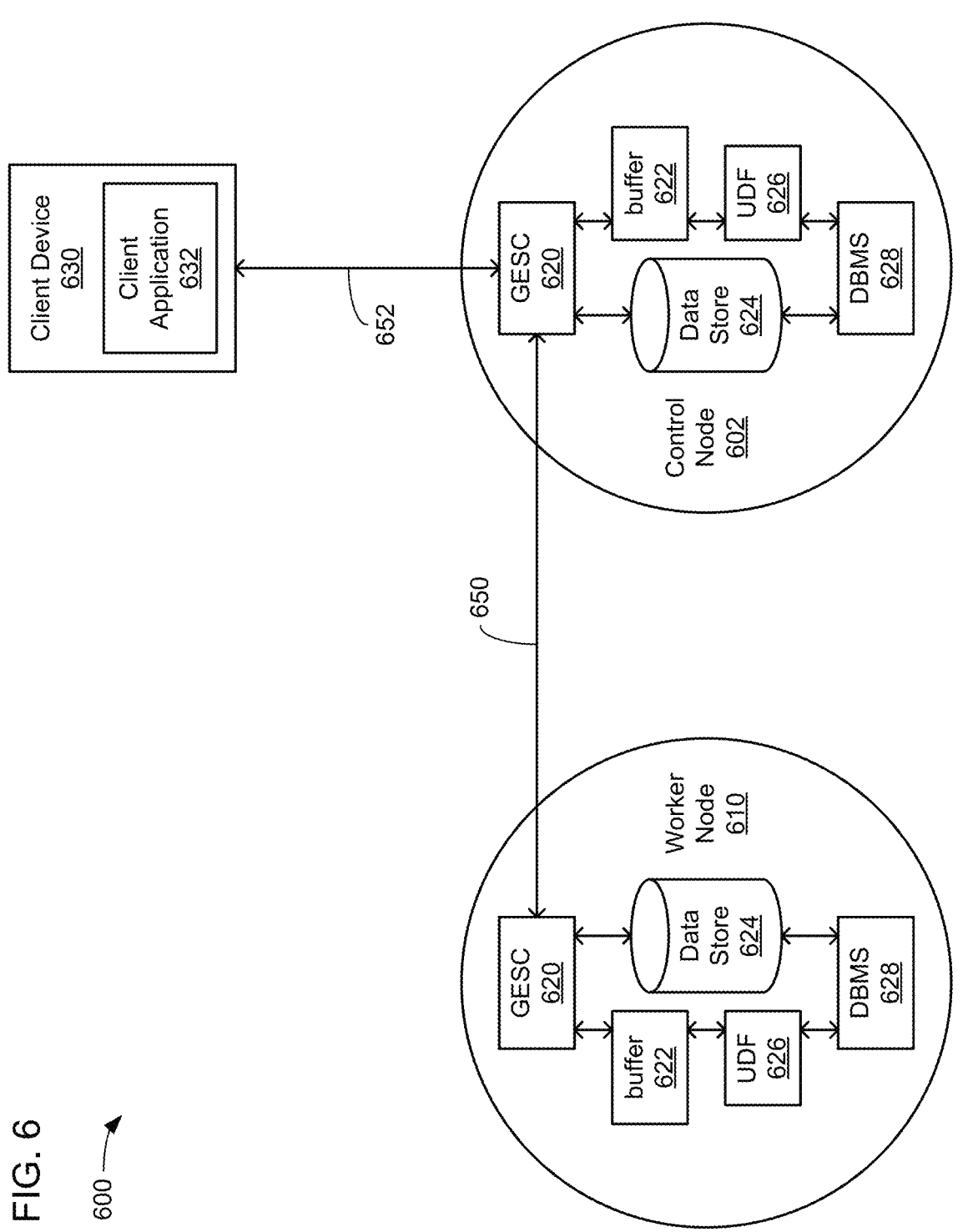
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
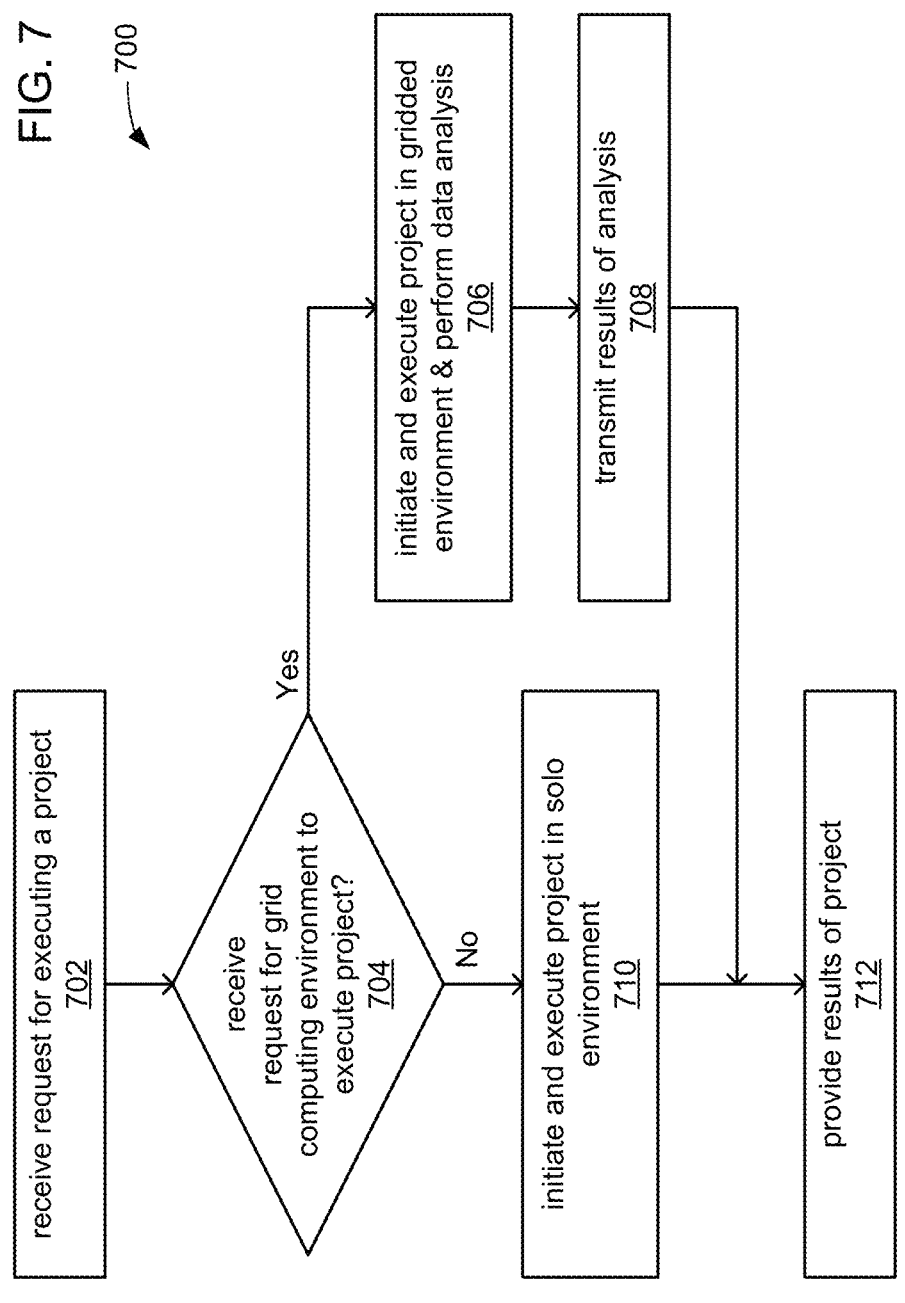
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
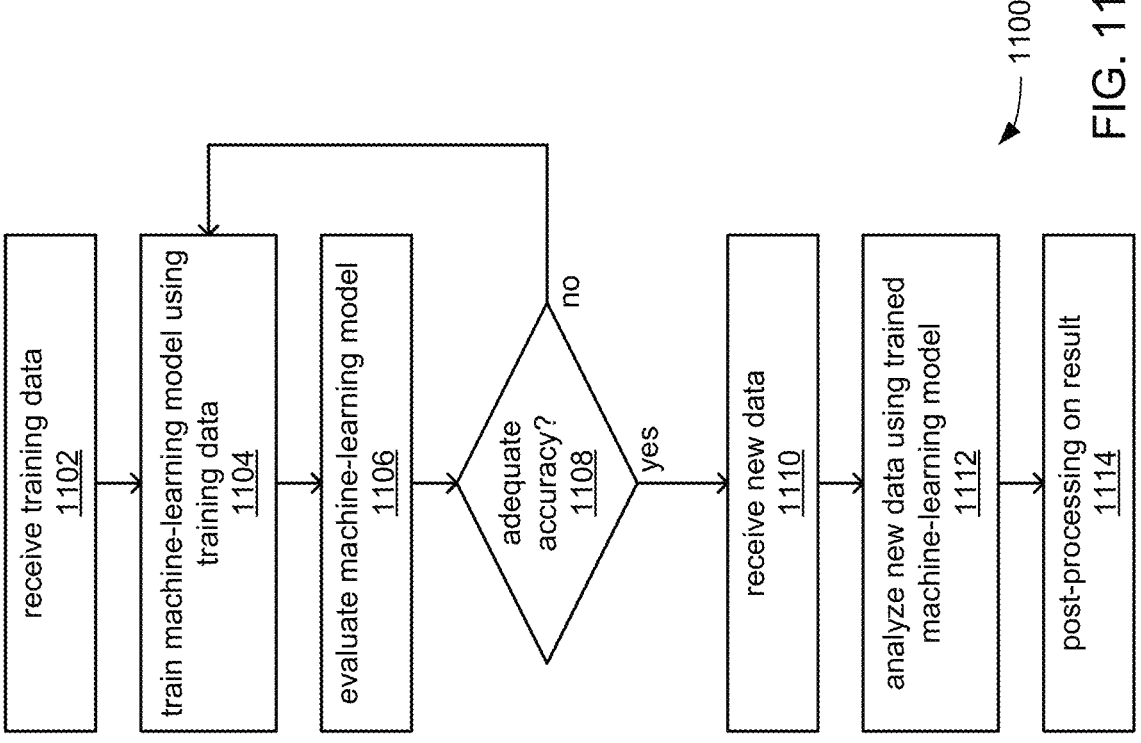
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
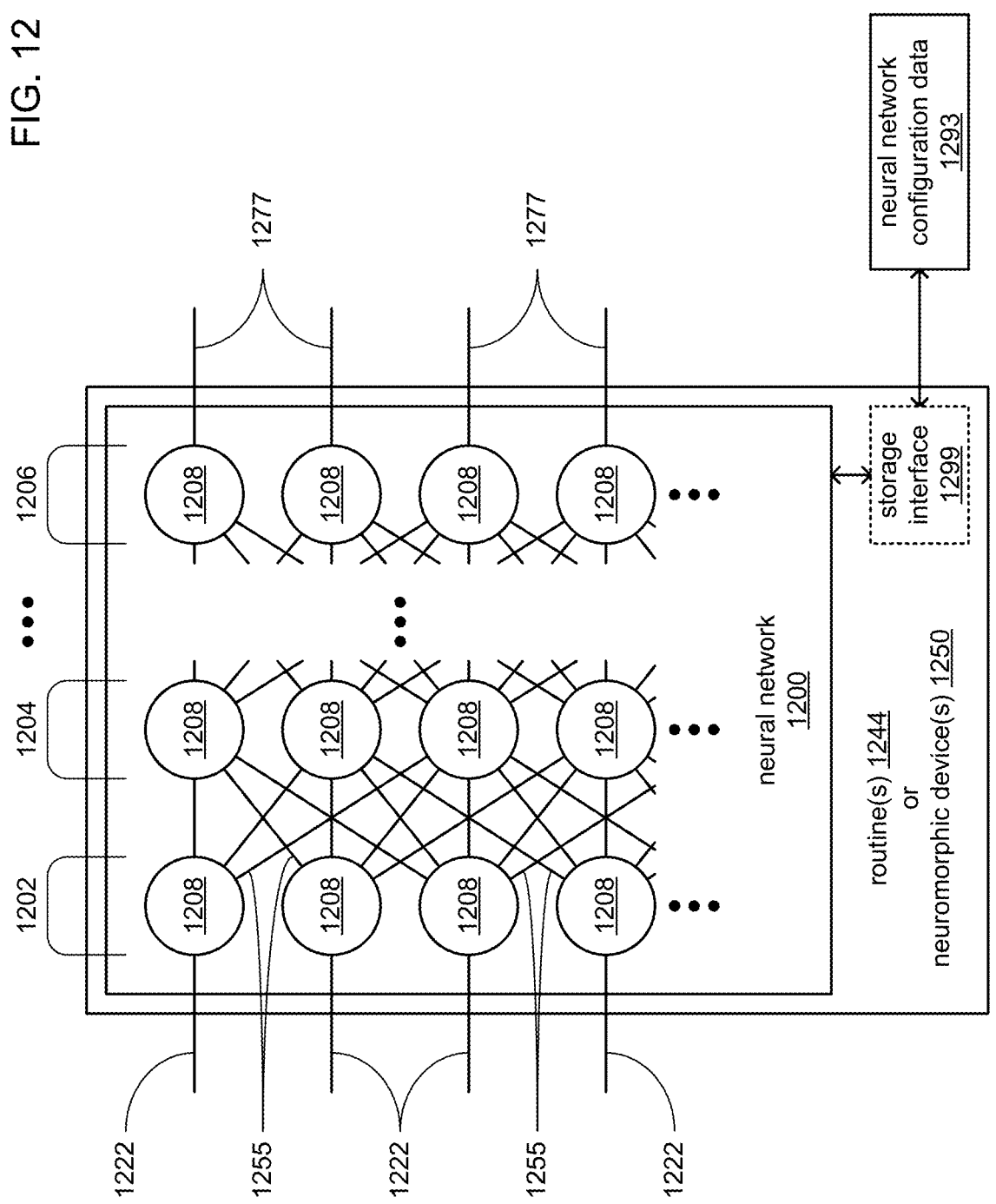
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max (x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
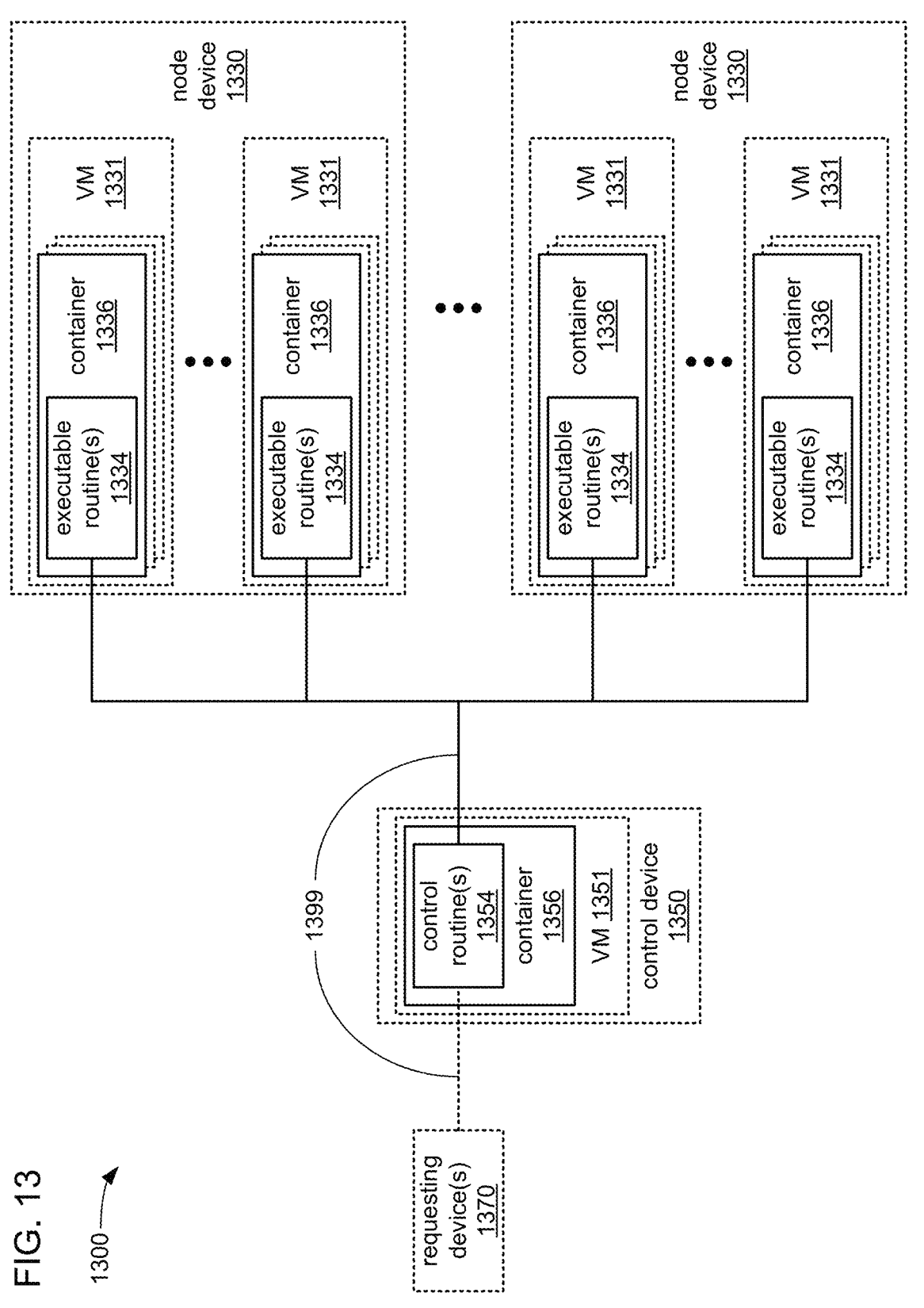
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions.

By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
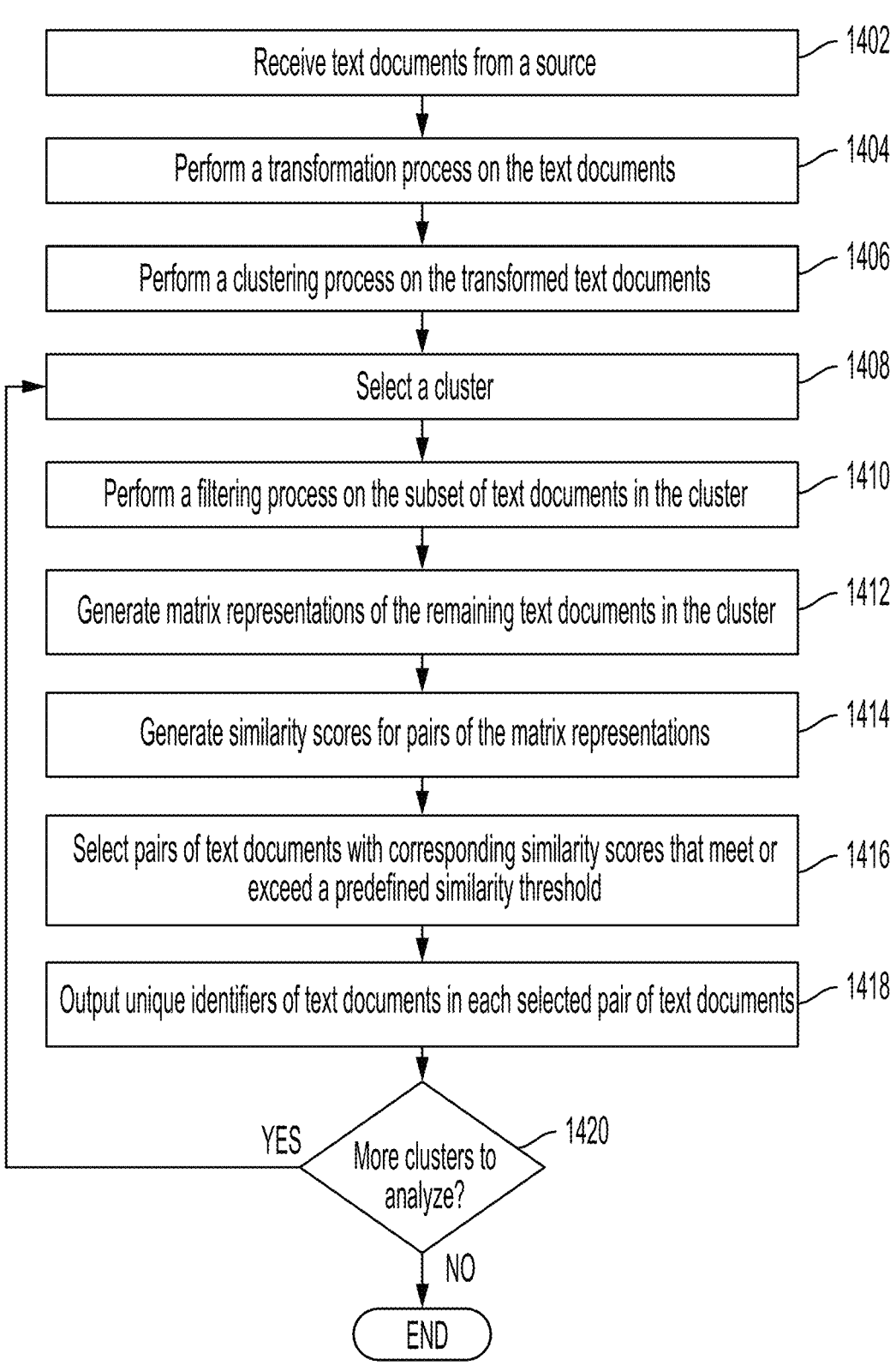
FIG. 14 shows a flowchart of an example of a process for identifying duplicate and near-duplicate text documents according to some aspects of the present disclosure.

FIG. 14 shows a flowchart of an example of a process for identifying duplicate and near-duplicate text documents according to some aspects of the present disclosure. The process can be implemented using any of the systems and processes described above. It will be appreciated that other examples may involve more operations, fewer operations, different operations, or a different sequence of operations than is shown in FIG. 14.

In block 1402, a processor receives text documents from a source. The source may include one or more repositories, one or more websites, one or more databases, etc. Examples of the text documents can include social media posts, product reviews, service reviews, blog posts, books or book snippets, e-mails, word processing documents, etc. The text documents are not limited to texts in document format, and may include any unstructured text in any suitable format.

In block 1404, the processor executes a transformation process on each of the text documents. The transformation process can involve first determining whether a language in which a text document is written is one of a predefined set of languages with relatively small alphabets (e.g., a relatively small number of characters in the standard alphabet). Examples of such languages may include English, Spanish, French, and Hebrew, which all have less than 30 characters in their standard alphabet. Examples of languages with relatively large alphabets may include Chinese, Japanese, and Hindi. Some such languages have hundreds or thousands of characters.

The processor may determine the language in which a text document is written using any suitable approach. For example, each text document may be tagged with its language, in which case the processor can use the tags to determine the language of each respective document. As another example, the processor may execute a language detector that can detect the language of a text document by analyzing the contents of the text document. The language detector may be able to perform language recognition on an input text document to identify a language in which the text document is written. In some examples, the language detector may include a trained machine-learning model, such as a deep neural network that is trained to perform language recognition. The processor can apply the language detector to a text document to automatically determine the language in which the text document is written.

If a text document is written in one of the predefined set of languages, then the processor can convert all of its tokens (e.g., words or phrases) to the same format, such as all uppercase or all lowercase. If the text document is not written in one of the predefined set of languages, then the processor can transform each token in the text document into a combined representation of the token. To generate the combined representation for a token, the processor can transliterate the token from a first language in which it is currently written to a second language, which can be one of the languages in the predefined set of languages (e.g., English), to thereby generate a transliterated representation of the respective token. The processor can also generate a preliminary encoded representation (e.g., Unicode representation) of the token. The processor may then remove duplicate characters from the preliminary encoded representation of the token to generate a final encoded representation of the token. The processor can then generated a combined representation for the token by combining (e.g., concatenating)

the transliterated representation of the respective token with the final encoded representation of the token. The processor can repeat this process for each token in the text document to transform the text document into a modified text document.

The processor can repeat the above process for some or all of the text documents, to thereby generate modified text documents for use as input to subsequent steps.

Some specific examples of the transformation process are shown in table 1500 of FIG. 15. As shown in FIG. 15, the table 1500 indicates the inputs and outputs of the transformation process for the word "hello" in English, Chinese, and Japanese. The first column 1502 of the table 1500 corresponds to the transformation process performed for the word "hello" in English. The second column 1504 of the table 1500 corresponds to the transformation process performed for the word "hello" in Chinese. The third column 1506 of the table 1500 corresponds to the transformation process performed for the word "hello" in Japanese. Because the first column 1502 corresponds to English, which has a smaller alphabet, it goes through the simpler transformation process in which the input text is converted to all lowercase. And because the second and third columns 1506, 1508 correspond to Chinese and Japanese, which have relatively large alphabets, they go through the more complex transformation process involving transliteration (row 2), encoding (row 3), deduplication (row 4), and concatenation (row 5).

Continuing with FIG. 14, in block 1406, the processor next executes a clustering process on the transformed text documents. This may involve executing a clustering algorithm to group the transformed text documents into a set of clusters. Examples of the clustering algorithm can include a K-means clustering algorithm or a Gaussian mixture algorithm. Text documents in the same cluster may have at least a threshold level of similarity to one another.

In some examples, the processor can perform the clustering process by first generating a respective vector representation of each transformed text document. The vector can include numerical data indicating characteristics of the text document. The vector can serve as a unique fingerprint of the text document. The processor can then perform the clustering based on the vector representations of the transformed text documents.

In some examples, the vector representation for a given text document may include the number of times each respective unique character in the corresponding language occurred in the text document. For example, if a text document is written in English, the processor can count the number of times the letter "a" is present in the text document, the number of times the letter "b" is present in the text document, the number of times the letter "c" is present in the text document, and so on through the letter "z." The processor can then generate a vector for the text document that indicates these unique character frequencies. The processor may repeat this process for some or all of the transformed text documents to generate a respective vector for each text document indicating the unique character frequencies associated with the text document. In some examples, the processor may store these vectors in a matrix, such as a unique character matrix. In the unique character matrix, the rows can correspond to the text documents, the columns of the unique character matrix can correspond to the unique characters, and the values of the unique character matrix can correspond to the frequencies of the unique characters in each text document. Alternatively, the rows and columns can be switched. After generating the vectors and optionally the unique character matrix, the vectors (e.g., individually or together in the unique character matrix) can be supplied as input to the clustering algorithm, which can sort the transformed text documents into respective clusters based on similarities and differences between the vectors. In this way, the clustering may be performed based on the unique character frequencies associated with the text documents.

Figure 16:
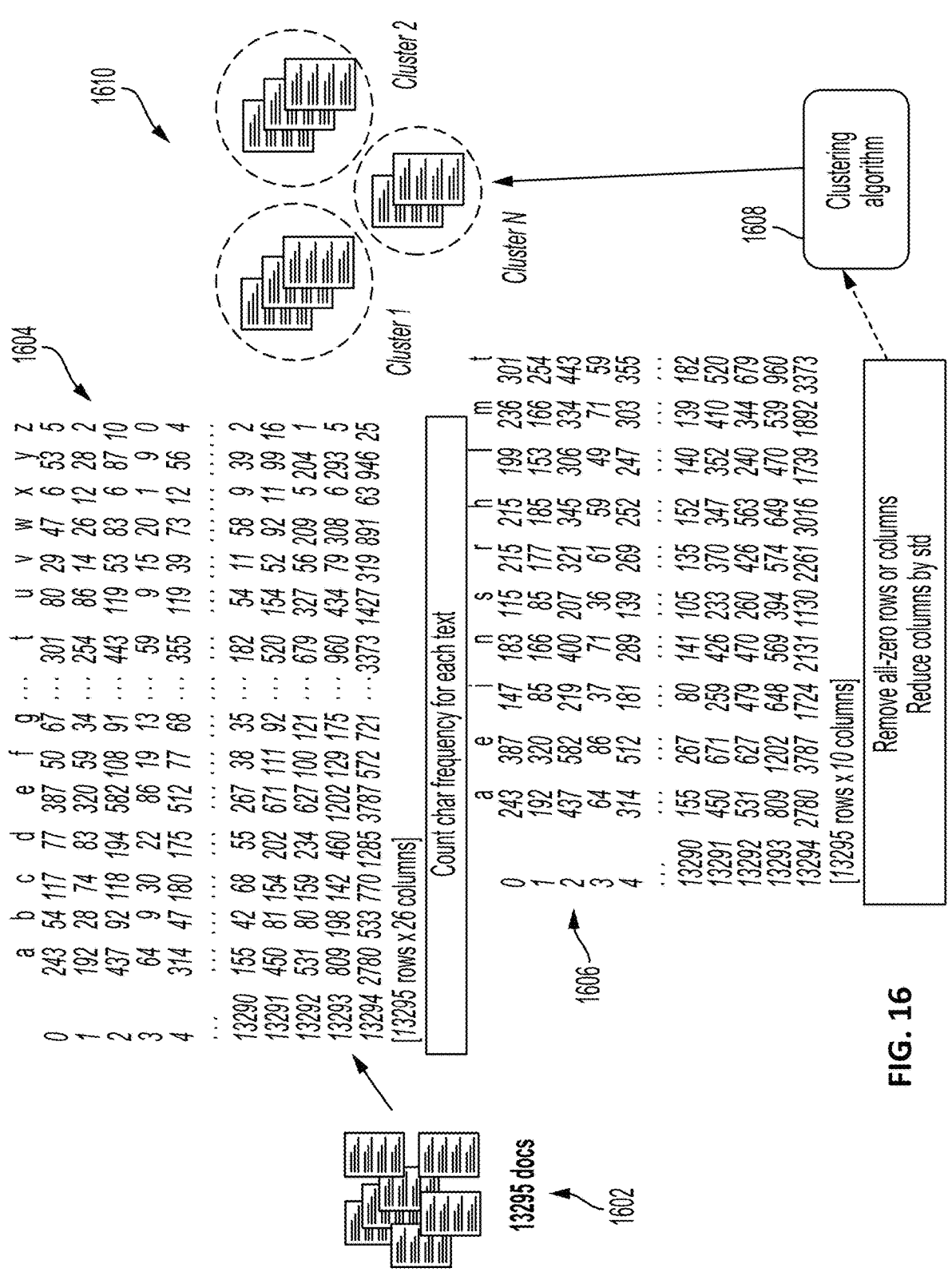
FIG. 16 shows an example of a clustering process for grouping text documents into a set of clusters according to some aspects of the present disclosure.

One example of the clustering process is shown in FIG. 16. As shown, the processor can receive a set of text documents 1602 which, in this example, includes 13295 text documents. From the set of text documents 1602, the processor can generate a unique character matrix 1604, which in this example has 13295 rows and 26 columns. Each row of the unique character matrix 1604 corresponds to one of the text documents in the set 1602. Since the text documents 1602 are written in English, each column of the unique character matrix 1604 corresponds to a unique character in the English alphabet. The values in the unique character matrix 1604 are the unique character frequencies for the characters in each text document. After generating the unique character matrix 1604, the processor can remove any rows and columns that have all zero values (e.g., every value in the row or column is zero). Additionally or alternatively, any column with a standard deviation value that is lower than an average standard deviation across some or all columns can be removed. This can reduce the size of the unique character matrix 1604 to thereby generate a reduced unique character matrix 1606. In this example, the reduced unique character matrix 1606 has 13295 rows and 10 columns. Thus, 16 columns have been removed. The reduced unique character matrix 1606 can then be fed as input to a clustering algorithm 1608, which can cluster the text documents into a set of clusters 1610 based on the reduced unique character matrix 1606. Using these techniques, the text documents can be clustered based on their unique character frequencies, such that text documents with similar unique character frequencies are clustered together and text documents with dissimilar unique character frequencies are assigned to different clusters.

While the above examples involve vectors and matrices, any other suitable type of data structure may be used. For example, the processor can determine the frequency of each character in a text document and store the respective frequencies in another type of data structure. After generating the data structure, the processor can remove rows and columns (e.g., that have all zero values and/or standard deviations that are less than an average standard deviation) from the data structure to generate a reduced data structure. The reduced data structure can then be fed as input to a clustering algorithm 1608, which can cluster the text documents into the set of clusters 1610 based on the reduced data structure.

Continuing with FIG. 14, in block 1408, the processor next selects a cluster to analyze from among the set of clusters. In some examples, the processor may select the cluster randomly or follow a sequential order.

In block 1410, the processor performs a filtering process on the subset of text documents assigned to the selected cluster. This may involve generating a set of similarity scores representing similarities between each pair of text documents assigned to the cluster. The similarity scores can then be compared to a predefined similarity threshold. If a pair of text documents has a similarity score that meets or exceeds the predefined similarity threshold, the pair of text documents can be maintained in the cluster. If a text document is not part of any pair of text documents that meets or exceed the predefined similarity threshold, the text document can be discarded from the cluster as insufficiently similar to the rest of the cluster.

In some examples, the similarity scores can be generated based on Term Frequency Inverse Document Frequency (TF-IDF) vectors associated with the text documents in the cluster. For example, the processor can generate a respective TF-IDF vector for each text document in the cluster by applying a TF-IDF algorithm to the text document. The TF-IDF vector can serve as a vector representation of the text document. The cosine similarity can then be computed for each pair of TF-IDF vectors, where the pairwise cosine similarity can serve as the similarity score for the corresponding pair of text documents. If the pairwise cosine similarity (e.g., the cosine similarity associated with a pair of text documents) meets or exceeds the predefined similarity threshold, the pair of text documents can be maintained in the cluster. Otherwise, one or both text documents in the pair of text documents may be removed from the cluster.

Figure 17A:
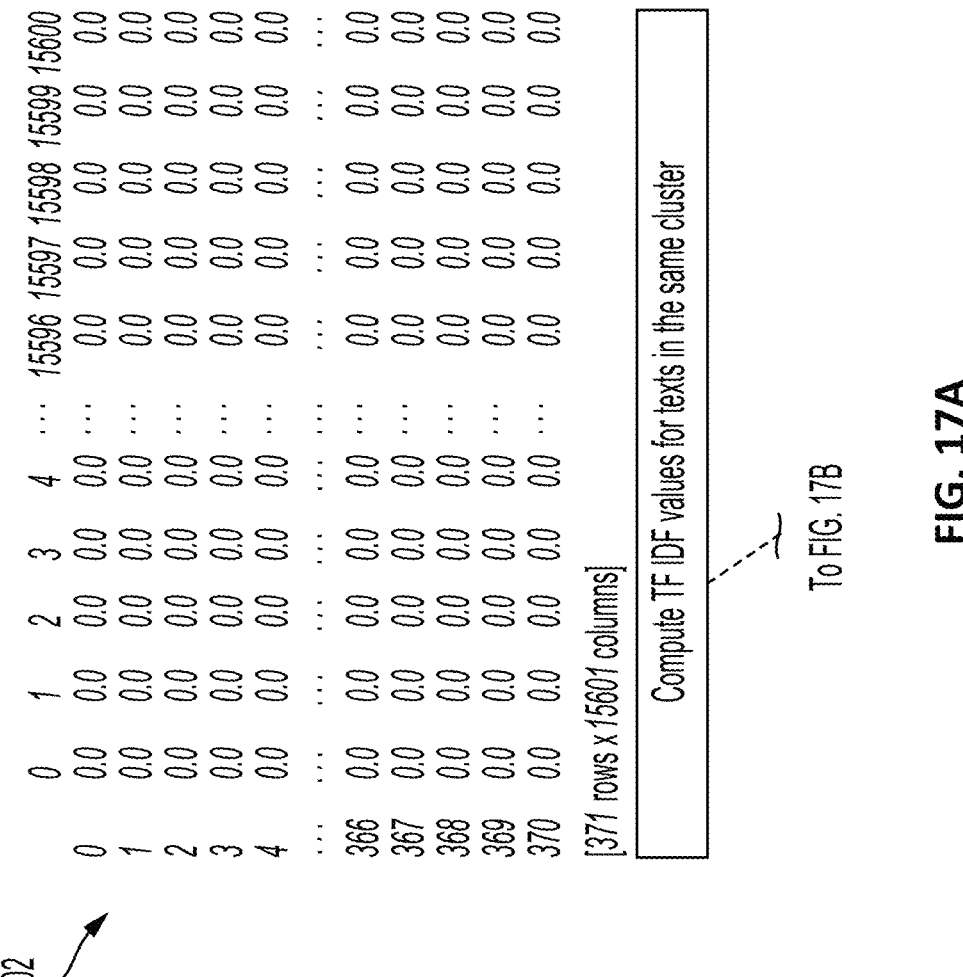
FIGS. 17A-B show an example of a filtering process for filtering text documents from a cluster according to some aspects of the present disclosure.
Figure 17B:
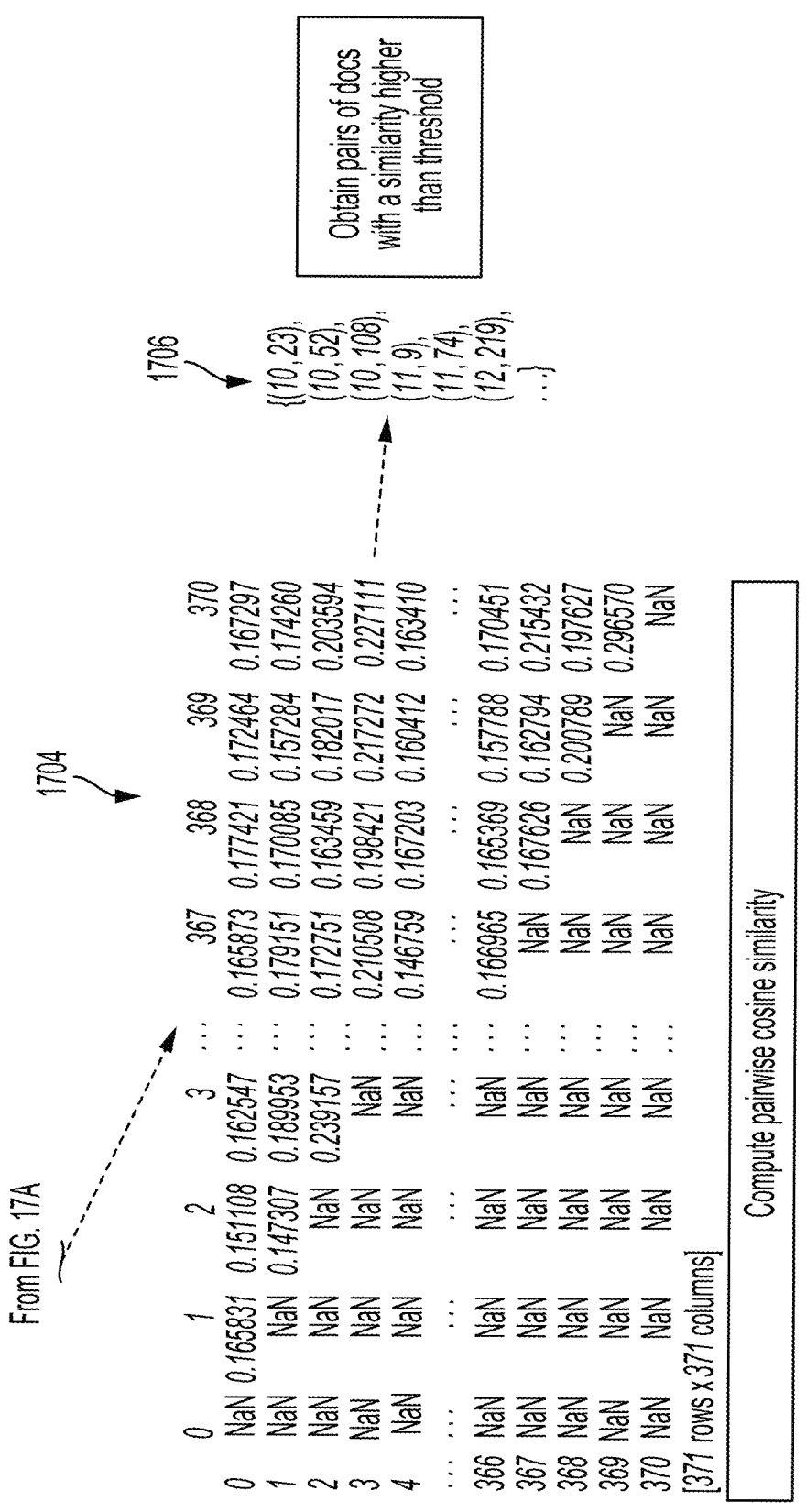

One example of the filtering process is shown in FIGS. 17A-B. As shown, the processor can compute the TF-IDF values 1702 for the text documents in a cluster. The processor can then compute the pairwise cosine similarities 1704 between the TF-IDF values 1702 associated with the text documents. Finally, the processor can compare the pairwise cosine similarities to a predefined similarity threshold to obtain pairs of text documents 1706 having an associated pairwise cosine similarity that meets or exceeds the predefined similarity threshold. From the pairs of text documents 1706, the processor can determine which text documents to remove from the cluster.

Continuing with FIG. 14, in block 1412, the processor generates matrix representations of the remaining text documents in the cluster (e.g., the text documents that passed the filtering process of block 1410). In some examples, the processor can convert a text document into a corresponding matrix that includes frequency vectors for unique characters in the text document. Each frequency vector can be associated with a corresponding unique character in the text document. And each frequency vector can indicate the respective frequencies of neighboring characters within a predefined window adjacent to the corresponding unique character in the text document. The processor can store the frequency vectors in the matrix, to thereby generate the matrix representation of the text document.

Figure 18:
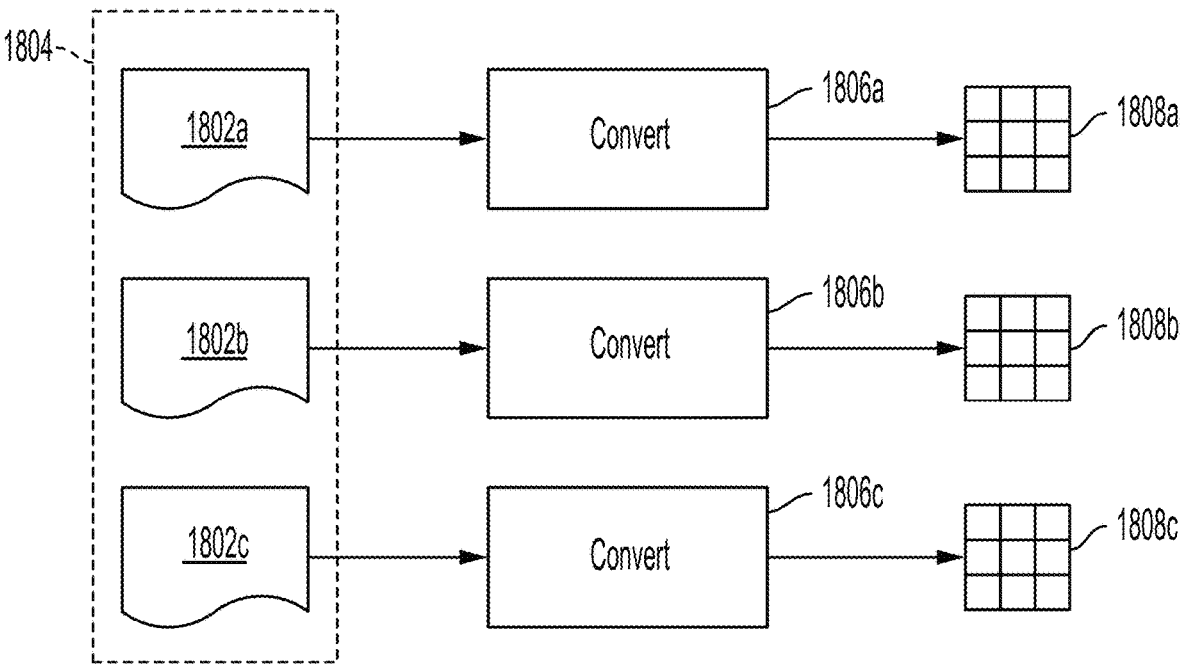
FIG. 18 shows an example of a conversion process for converting text documents into matrices according to some aspects of the present disclosure.

Some examples of this conversion process are shown in FIGS. 18-19. As shown in FIG. 18, the processor can convert 1806*a-c* the text documents 1802*a-c* in the cluster 1804 into matrices 1808*a-c*. This may involve generating the matrices 1808*a-c* based on the text documents 1802*a-c*. In some examples, the matrices 1808*a-c* can be neighbor-character frequency matrices. A neighbor-character frequency matrix for a given text document 1802 can include a set of frequency vectors. Each frequency vector can correspond to a single unique character in the text document 1802. And, each frequency vector can indicate the respective frequencies of neighboring characters, where the neighboring characters are within a predefined window adjacent of the unique character in the text document 1802.

To generate a matrix 1808 for a text document 1802 in the cluster 1804, the processor can use spaces in the text document 1802 as a word delimiter or a character delimiter. The processor can look for a space before or after a target character in a text document 1802, select neighboring characters adjacent to the target character based on predefined options (e.g., window size, mode, and look direction), count the frequencies of the neighboring characters, and use the frequency counts as values in the matrix 1808. This can be repeated, for example until all unique characters in the text document 1802 are used as the target character to identify their neighboring characters, to construct the matrix 1808 for the text document 1802.

For purposes of generating the matrix 1808 (e.g., a neighbor-character frequency matrix), a user may customize various parameters to control which letters are considered neighbors to one another, as further shown in FIG. 19. In particular, FIG. 19 shows user-selectable parameters 1900, such as step size 1902, window size 1904, mode (e.g., strict mode 1906 or relaxed mode 1908), and look direction (e.g., behind 1910, ahead 1912, or periphery 1914). A user can customize these parameters to influence how neighboring characters are identified to create the matrix 1808. The step size 1902 can control the number of intermediary characters between neighboring characters. The window size 1904 can control the total number of characters, adjacent to the target character (e.g., the letter "n" in FIG. 19), to search for neighboring characters. The mode can control whether the window should end at a space or continue past a space. For example, a strict mode 1906 may require the window to end at, and exclude, the first space it reaches. A relaxed mode 1908 may allow the window to extend past, and include, one or more spaces. The look direction can control the direction in which the window extends. A look direction of behind 1910 may indicate that the window should encompass characters to the left of the target character. A look direction of ahead 1912 may indicate that the window should encompass characters to the right of the target character. A look direction of periphery 1914 may indicate that the window should encompass characters in both directions, for example centered around the target character. Other parameters may additionally or alternatively be used to control the search for neighboring characters.

The processor can apply the parameters as shown in example 1916. In this example 1916, the target character is "n," the window size is 6 characters, the steps size is 2 characters, the mode is "relaxed," and the look direction is "ahead." Using these parameters, the neighbors for the letter "n" in the phrase "near duplicate" can be identified as 'e,' 'r,' and 'd.' The processor can then shift the window to the next instance of the target character in the text document and repeat this process. Each time the processor shifts the window, it can search the characters in the window for new characters that it has not previously seen as neighbors to the target character and existing characters that it has previously seen as neighbors to the target character. If the processor identifies a new character as a neighbor to the target character, the processor can add the new character to a frequency vector associated with the target character. If the processor identifies an existing character that is already in the frequency vector, it can increase a count for that existing character in the frequency vector. At the end of this process, the frequency vector for the target character can include a series of elements, where each element in the frequency vector indicates a number of times that a corresponding character served as a neighbor to the target character in the text document. The processor can then select the next target character and repeat this process to generate a frequency vector for that target character. This process can iterate until a respective frequency vector has been generated for each target character by the processor. The respective frequency vectors may be stored together in a matrix (e.g., matrix 1808, which can be a neighbor-character frequency matrix).

Continuing with FIG. 14, in block 1414, the processor next generates similarity scores for pairs of matrix representations. For example, the processor can select a pair of matrix representations (e.g., matrices 1808*a-b*) and determine a similarity score for the pair of matrix representations. The processor can repeat this process, selecting different combinations of matrix representations each time and computing the corresponding similarity score. Any suitable type of similarity score may be used, though in some examples the processor may generate the similarity scores according to the process shown in FIG. 20.

Turning now to FIG. 20, the process can begin by selecting a pair of matrix representations to assess. The pair of matrix representations can include a first matrix 2002 corresponding to a first text document and a second matrix 2004 corresponding to a second text document.

The processor can next remove rows and columns that have all zero values from the first matrix 2002 and the second matrix 2004, which can reduce the sizes of the two matrices (step 1). The processor can also remove columns (e.g., from the first matrix 2002 and the second matrix 2004) having standard deviation values that are less than an average standard deviation of two or more of the columns in the matrix, which can further reduce the sizes of the two matrices. For instance, the processor can determine a standard deviation value for the third column in the first matrix 2002, determine an average standard deviation across all of the columns in the first matrix 2002, compare the standard deviation value for the third column to the average standard deviation, and remove the third column if its standard deviation value is less than the average standard deviation.

The processor can next generate an absolute difference matrix 2006 by computing the absolute difference between the first matrix 2002 and the second matrix 2004 (step 2). This may involve computing the absolute values of differences between each row in the first matrix 2002 and the second matrix 2004.

The processor can next compute a mean matrix 2008 having the means of each row of the first matrix 2002 and the second matrix 2004 (step 3). The processor can then divide the absolute difference matrix 2006 by the mean matrix 2008 to generate a resulting matrix 2010 (step 4). The processor can next generate a row-mean vector 2012 by determining a respective mean of each row of the resulting matrix 2010 (step 5). The processor can also generate a row-sum vector by determining a respective sum of each row of the resulting matrix 2010. The processor can next generate a row-weight vector 2014 by dividing the row-sum vector by a sum of the resulting matrix 2010 (step 6). The processor can also generate a swapped-weight vector 2016 by swapping an $N^{th}$ highest value in the row-weight vector 2014 with the $N^{th}$ lowest value of the row-weight vector 2014 (step 7).

Finally, the processor can determine the similarity score 2018 for the first matrix 2002 and the second matrix 2004 based on the row-mean vector 2012 and the swapped-weight vector 2016 (step 8). For example, the processor can determine the similarity score 2018 by determining a cross-product of the row-mean vector 2012 and the swapped-weight vector 2016, determining a summation of the cross product, and subtracting the summation from the number 1. Of course, the process shown in FIG. 20 is not intended to be limiting. Other examples may involve more steps, fewer steps, different steps, or a different order of the steps shown in FIG. 20 to compute the similarity score for a pair of matrix representations.

Continuing with FIG. 14, in block 1416, the processor selects pairs of text documents with corresponding similarity scores that meet or exceed a predefined similarity threshold and flags them as duplicate or near-duplicate text documents. For example, the processor can compare the similarity scores generated in block 1414 to a predefined similarity threshold, which may be different from the predefined similarity threshold used to perform the filtering process in block 1410. If a pair of text documents is associated with similarity scores that meet or exceed the predefined similarity threshold, the pair of text documents can be flagged as duplicate or near-duplicate text documents to one another. Such text documents can be referred to herein as similar documents, since they have similarity scores that meet or exceed the predefined similarity threshold.

One example of this process is shown in FIG. 21. As shown, a first matrix 2102 corresponding to a first text document 2114 and a second matrix 2104 corresponding to a second text document 2116 can undergo a similarity calculation process 2106 to generate a similarity score 2108. The similarity score 2108 can indicate a similarity between the first matrix 2102 and the second matrix 2104 and, by proxy, the first text document 2114 and the second text document 2116. In some examples, the similarity score 2108 may be generated using the process shown in FIG. 20. The similarity score 2108 can then be compared to a similarity threshold 2110. If the similarity score 2108 meets or exceeds the similarity threshold 2110, the pair of text documents 2114, 2116 can be flagged 2112 as duplicates or near-duplicates of one another.

Continuing with FIG. 14, in block 1418, the processor can output unique identifiers of the text documents in each selected pair of text documents. For example, the processor can output the unique identifiers on a display device, provide the unique identifiers to software executing on the processor, or transmit the unique identifiers to a remote computing device.

In block 1420, the processor can determine whether there are any more clusters in the set of clusters to analyze. If so, the process can return to block 1408 and repeat with the next cluster. Otherwise, the process can end. Using these techniques, the processor can automatically and accurately identify duplicate and near-duplicate text documents from a large library of text documents relatively quickly.

Turning now to FIG. 22, FIG. 22 shows a flowchart of an example of a process for identifying duplicate and near-duplicate text documents according to some aspects of the present disclosure. The process can be implemented using any of the systems and processes described above. It will be appreciated that other examples may involve more operations, fewer operations, different operations, or a different sequence of operations than is shown in FIG. 22.

In block 2202, a processor clusters a plurality of documents (e.g., text documents) into a plurality of clusters based on a respective set of character frequencies corresponding to each document of the plurality of documents, such that each cluster in the plurality of clusters includes a respective subset of documents selected from the plurality of documents. For instance, the processor can perform the transformation and clustering processes described above with respect to FIGS. 14-16 to cluster the documents into the plurality of clusters.

As shown in FIG. 16, the clustering process can depend on the respective set of character frequencies associated with each document in the plurality of documents. For example, the processor can determine a respective frequency of each character of a language in each document of the plurality of documents. The processor can then store (e.g., in a data structure in memory) the frequency of each character in each document each document of the plurality of documents. The processor can also remove, from the data structure, rows or columns for which all values are zero, to thereby generate a reduced data structure. The processor can then provide the reduced data structure as input to a clustering algorithm, the clustering algorithm being configured to classify the plurality of documents into the plurality of clusters based on the reduced data structure.

In block 2204, the processor selects at least one cluster of the plurality of clusters for further evaluation.

In block 2206, the processor generates first similarity scores representing first similarities between every pair of documents in the respective subset of documents assigned to a selected cluster. For instance, the processor can compute TF-IDF values for respective pairs of documents in the cluster, as described above with respect to FIGS. 14 and 17. More specifically, the processor can generate TF-IDF values for the respective subset of documents assigned to the cluster. The processor can then determine pairwise cosine similarities between the TF-IDF values, where the pairwise cosine similarities serve as the first similarity scores.

In block 2208, the processor selects a filtered group of documents, from among the respective subset of documents assign to the cluster, for which the first similarity scores meet or exceed a first predefined similarity threshold. For instance, the processor can compare TF-IDF values for respective pairs of documents to a first predefined similarity threshold, as described above with respect to FIGS. 14 and 17. More specifically, the processor can select the filtered group of documents, from among the respective subset of documents assigned to the cluster, based on their pairwise cosine similarities meeting or exceeding the first predefined similarity threshold.

In block 2210, the processor converts each document in the filtered group of documents into a corresponding matrix representation, to generate a plurality of matrix representations of the filtered group of documents. For instance, the processor can perform the processes described above with respect to FIGS. 14 and 18-19, to generate the corresponding matrix representation for each document in the filtered group of documents. More specifically, for each document in the filtered group of documents, the processor can determine frequency vectors for unique characters in the document. Each of the frequency vectors can be associated with a corresponding unique character in the document. Each of the frequency vectors can also indicate respective frequencies of neighboring characters within a predefined window adjacent to the corresponding unique character in the document. The processor can then generate a matrix representation of the document based on the frequency vectors.

In block 2212, the processor generates second similarity scores representing second similarities between every pair of matrix representations in the plurality of matrix representations. For instance, the processor can perform the processes described above with respect to FIGS. 14 and 20, to generate the second similarity scores for every pair of matrix representations. More specifically, for each pair of matrix representations in the plurality of matrix representations, the processor can remove, from a first matrix and a second matrix in the pair of matrix representations, rows or columns for which all values are zero. The processor can determine an absolute difference matrix having absolute values of differences between each row of the first matrix and the second matrix. The processor can determine a mean matrix having means of each row of the first matrix and the second matrix. The processor can divide the absolute difference matrix by the mean matrix to determine a resulting matrix. The processor can generate a row-mean vector by determining a respective mean of each row of the resulting matrix. And the processor can determine a second similarity score, among the second similarity scores, based on at least the row-mean vector.

In some examples, for each pair of matrix representations in the plurality of matrix representations, the processor can generate a row-sum vector by determining a respective sum of each row of the resulting matrix. The processor can generate a row-weight vector by dividing the row-sum vector by a sum of the resulting matrix. The processor can generate a swapped-weight vector by swapping an $N^{th}$ highest value in the row-weight vector with the $N^{th}$ lowest value of the row-weight vector. And processor can determine the second similarity score based on the row-mean vector and the swapped-weight vector. For example, the processor can determine a cross product of the row-mean vector and the swapped-weight vector, determining a summation of the cross product, and subtract the summation from the number 1.

In block 2214, the processor selects a set of similar documents, from among the filtered group of documents, for which the second similarity scores meet or exceed a second predefined similarity threshold. For instance, the processor can perform the processes described above with respect to FIGS. 14 and 21, to select the set of similar documents.

In block 2216, the processor outputs identifiers (e.g., unique identifiers) of the set of similar documents. For example, the processor can output the identifiers on a display device, provide the identifiers to software executing on the processor, or transmit the identifiers to a remote computing device.

The above process may be repeated for some or all of the clusters selected in block 2204, such that each cluster is individually evaluated to determine a respective set of similar documents associated with the cluster. The sets of similar documents associated with the clusters can then be stored or output.

The process described in FIGS. 14 and 22 can be used to automatically identify text documents that are duplicates, or near duplicates, of one another. When new documents are added to the corpus, it may be necessary to re-run the processes described in FIGS. 14 and 22 again on the entire corpus, due to the added documents, which can consume considerable time and computing resources. It may be desirable to use certain outputs and derivative data generated as a by-product of the processes described in FIGS. 14 and 22 to avoid duplication of certain operations, resulting in a more streamlined approach that saves time and computing resources.

For example, the process of FIG. 22 above can result in output including a set of clusters, each cluster having multiple document identifiers for a set of filtered, similar documents. These clusters can be reused, rather than being recomputed given one or more new documents, as will be described below. In addition to these clusters, data generated during the execution of the processes described in FIGS. 14 and 22 may be likewise reused to more efficiently process new documents. For instance, a mapping of characters to their transformed equivalents, as described in block 1404 above, can be reused to similarly transform new documents. Likewise, a mapping of document identifiers to document matrix representations (e.g., neighbor-character frequency matrices) can be reused when generating similarity scores for pairs of matrix representations when processing an updated set of documents including the new documents. Other derivative information generated and persisted as a by-product of the processes described in FIGS. 14 and 22 may be similarly used during processing of new documents or an updated set of documents including the new documents.

In effect, a computing system can identify document groups of similar documents based on a combined collection of new documents and sets of documents that were previously processed by, after the new documents are received, only processing the one or more new documents, clustering the one or more new documents into the plurality of predefined clusters, and generating the document groups based on generated second similarity scores. The sets of documents that were previously processed may be, for example, similar documents, and each set of similar documents may include at least one pair of documents determined to be similar to one another based on similarity scores generated using a predefined similarity scoring technique, such as the processes described in FIGS. 14 and 22.

In one illustrative example, consider a set of documents that includes one or more new documents as well as existing documents that were previously processed using the processes described in FIGS. 14 and 22. An updated dataset that includes documents from the original dataset and new documents can be generated which excludes exact duplicates (e.g., retaining only one copy of duplicated documents). Any documents found to be exact duplicates can be tracked using lists of document IDs to track the duplicate relationships. Each new document in the updated dataset can be transformed using the transformation process described in block 1404 above. Each new document in the updated dataset can be assigned to a cluster generated during the processing of the existing documents as described with respect to blocks 1406 and 2202 above. For example, the clustering model can be used to predict clusters for the transformed new documents based on each respective documents' character counts. Then, for each cluster containing at least one new document, the filtering process of blocks 1410 and 2206 can be applied to determine document pairs that exceed a predefined filter threshold. Similarity scores can then be computed for each respective document pair using matrix representations of the documents, as described with respect to blocks 1414 and 2212, which can again be filtered using a predefined similarity threshold. The remaining pairs can be merged into groups, some of which may include one or more new documents.

The above techniques for expediting processing of new documents are further described below with respect to FIG. 23. The process can be implemented using any of the systems and processes described above. It will be appreciated that other examples may involve more operations, fewer operations, different operations, or a different sequence of operations than is shown in FIG. 23.

In block 2302, a processor receives one or more new documents. For example, consider an existing set of documents that were previously processed to identify duplicates or near-duplicates using a predefined processing technique such as the one described in FIGS. 14 and 22. Following the previous processing, an output of the predefined processing technique may be multiple groups of document identifiers in which each group corresponds to a set of duplicates and/or near-duplicates. Additionally, various derivative data may be output and persisted. The one or more new documents may be, like the existing documents, received from a source such as a repository, website, database, and so on. The receipt of the new documents may occur following execution of a command to identify duplicates or near-duplicates of the combined set of documents including both the existing sets of documents and the one or more new documents.

In block 2304, the processor receives the sets of documents that were processed prior to receiving the one or more new documents using a predefined processing technique. An example of the predefined processing technique is described by the processes described above in FIGS. 14 and 22 for detecting duplicates or near-duplicates. The predefined processing technique may involve determining a set of character frequencies for each document and generating a stored matrix representation for each document, and/or other operations.

As part of the prior processing of the set of existing documents, a set of character frequencies for each document in the set of existing documents may have been determined as described above with respect to blocks 1404 and 1406. Also, a stored matrix representation for each document in the set of existing documents may have been generated as described above with respect to blocks 1410 and 2210. In both cases, the generated data may be ephemerally or permanently persisted for subsequent use in processing new documents. Other derivative data generated as a by-product of the prior processing may likewise be stored and used to process the new documents.

In block 2306, the processor processes the one or more new documents by determining a set of character frequencies for each new document. Generating the set of character frequencies can proceed substantially as described above with respect to blocks 1404 and 1406, except that the operation is only performed for the one or more new documents. For example, the processor can first determine the language of each new document. Then a series of pre-processing steps based on the determined language can be performed to generate a tokenized representation of the new documents. The processor may then generate a vector for each new document indicating the unique character frequencies associated with the new document.

In block 2308, the processor clusters the one or more new documents into a plurality of predefined clusters based on a respective set of character frequencies corresponding to each document of the one or more new documents, wherein the plurality of predefined clusters were previously established during the prior processing of the set of existing documents. For instance, the processor can perform the transformation and clustering processes described above with respect to FIGS. 14-16 to cluster the documents into the plurality of clusters. In some examples, the one or more new documents can be clustered into the predefined clusters using an incremental clustering approach, in which each new transformed document (e.g., a vector representation of the new document) is compared to existing cluster properties or feature representations such as the cluster centroid or other characteristic. Each new document can then be assigned to the predefined cluster that is most congruent, according to a predefined criteria. Once a new document is added to a predefined cluster, the cluster properties or feature representations can be recomputed to account for the added new document.

In block 2310, the processor, for each predefined cluster of the plurality of predefined clusters that includes at least one new document, generates document groups. For example, the document groups can be generated using a sequence of operations similar to those described above with respect to blocks 1408-1420 and blocks 2204-2216. Generation of the document groups may involve computing similarity scores among the documents in each document group. Importantly, derivative data generated during the processing of the existing set of documents can be re-used during this block. For example, the matrix representations for each existing document that was generated during processing on the existing documents can be accessed and used during this block rather than re-generating it. A detailed example of one implementation of this block is described below with respect to FIGS. 24A-B.

In block 2312, the processor identifies a representative document for each document group. Identification of a representative document may involve choosing the document in each document group having the highest mean similarity score to the other documents in the document group, using the similarity scores computed in block 2310. The identified representative document may be, for example, the document with the highest similarity score relative to the other documents in the document group. Various predefined approaches can be used in the event that two or more documents have the same similarity score. A detailed example of one implementation of this block is described below with respect to FIGS. 25A-B.

In block 2314, the processor generates an output data structure including the document groups and the representative document for each group. For example, an associative array implementation such as a dictionary or hashmap can be generated in which the identifiers of the representative documents are the keys and the collection of document identifiers for each respective group, although with their associated similarity scores, are the values. Many other representations are likewise possible.

In some examples, the output data structure can be used to generate a graphical user interface that can be displayed on a suitable client device. For example, the processor and an associated web application can be used to generate a visualization including a table with a section for each document group. Each section of the table can include the identifier of the representative document for the document group and, for each document in the document group, the similarity score computed in block 2310 relative to the representative document for the document group.

FIGS. 24A-B shows a flowchart of an example of a process for generating document groups for each predefined cluster of a plurality of predefined clusters that includes at least one new document according to some aspects of the present disclosure. This process illustrates an example implementation of block 2310 described above. The process can be implemented using any of the systems and processes described above. It will be appreciated that other examples may involve more operations, fewer operations, different operations, or a different sequence of operations than is shown in FIGS. 24A-B.

In block 2402, a processor generates first similarity scores representing similarities between every pair of documents in the respective subset of documents assigned to the predefined cluster. This block can proceed substantially as described above with respect to block 2206.

In block 2404, the processor generates a filtered cluster, from among the respective subset of documents assigned to the predefined cluster, for which the first similarity scores meet or exceed a predefined similarity threshold. This block can proceed substantially as described above with respect to block 2208.

In block 2406, the processor generates a matrix representation for each new document of the one or more new documents in the filtered cluster. This block can proceed substantially as described above with respect to block 2210, however matrix representations may only be generated for the new documents.

In block 2408, the processor retrieves a stored matrix representation for each processed document of the sets of documents in the filtered cluster. For example, the stored matrix representations may be accessed using an associative array or other suitable data structure, keyed using document identifiers of the processed documents. The data structure can be populated using information from the previous execution of the predefined processing technique. Use of the already-generated stored matrix representations is an important source of improving the efficiency of the grouping process.

In block 2410, the processor generates second similarity scores between every pair of matrix representations in the filtered cluster using the generated matrix representations for each new document and the stored matrix representations for each processed document. This block can proceed substantially as described above with respect to block 2212.

In block 2412, the processor selects one or more pairs of similar document identifiers associated with one or more respective pairs of documents in the filtered cluster, for which the second similarity scores meet or exceed a second predefined similarity threshold. This block can proceed substantially as described above with respect to block 2214.

In block 2414, the processor generates document groups by combining all pairs of similar document identifiers that share a document identifier into a document group. In other words, the one or more pairs of similar document identifiers selected in block 2412 are merged into a smaller number of document groups by merging pairs that share at least one document. In a simple example, if the selected document identifier pairs include the pairs (1,2), (2,3), and (4,5), the document groups would be (1, 2, 3) and (4, 5).

In block 2416, the processor removes first document groups from the document groups that do not include at least one new document identifier. The operation of this block can help improve efficiency of the process by ensuring that additional processing is only performed on document groups that include a new document, since document groups that do not include a new document are unchanged from the previous execution of the predefined processing technique.

FIGS. 25A-B shows a flowchart of an example of a process for identifying a representative document for a set of document groups according to some aspects of the present disclosure. This process illustrates an example implementation of block 2312 described above. The process can be implemented using any of the systems and processes described above. It will be appreciated that other examples may involve more operations, fewer operations, different operations, or a different sequence of operations than is shown in FIGS. 25A-B. The following operations may be performed for each document group of the document groups (e.g., the document groups identified in block 2310).

In block 2502, a processor identifies one or more documents in the document group with the highest second similarity score relative to the other documents in the document group. For example, in block 2410 above, second similarity scores are determined for the documents in filtered clusters to determine the document groupings. A by-product of that operation is the second similarity scores for the documents in the document group, relative to one another. These can be used to determine a "representative document" for the documents in the group. In this context, the term representative document can refer generally to a document in the document group that shares a maximized amount of similarity with the other documents in the group, according to one or more criteria. The representative document can be used, for example, to efficiently identify or represent the document group during output operations.

In some examples, it may be desirable to identify a new document as the representative document. In this case, the one or more documents in the document group identified above are selected from the one or more new documents. Within each document group, the identified new document can serve as the representative document and be assigned an artificial similarity score (e.g., −1) to distinguish it from the other documents in the group. The other documents in the document group, which can be either new or old, can be associated with a similarity score relative to the representative document.

In block 2504, the processor determines whether one or more documents in the document group have the same highest second similarity score relative to the other documents in the document group. If each document has a distinct highest second similarity score relative to the other documents in the document group, then the process can proceed to block 2506. At block 2506 the processor identifies the document with the highest similarity score relative to the other documents in the document group as the representative document.

If one or more documents in the document group has the same highest second similarity score relative to the other documents in the document group, then some procedure is needed to determine which of the two documents with the same similarity score relative to the third document will be selected as the representative document. Thus, in this scenario, the process can proceed to block 2508. For example, consider a document group that includes at least 3 documents, two of which have the same similarity score relative to the third document, a score which is also higher than the similarity score of the third document relative to the other two (i.e., a "tie").

In block 2508, the processor selects a document having the highest number of characters from among the multiple documents for use as the representative document. For example, continuing with the example described in block 2506, for the two documents with the same similarity score relative to the third document, the tie can be deconflicted by counting the number of characters in each of the two documents and selecting the one with a higher character count. However, this may still result in a tie in some rare circumstances, requiring another procedure to determine which of the two documents will be selected as the representative document.

In block 2510, the processor determines whether one or more documents have a highest number of characters that is equal to the highest number of character in another document. If one document in the document group has a highest number of characters, then at block 2512 the processor identifies the document with the highest number of characters as the representative document. On the other hand, if multiple documents have a first number of characters that is equal to the highest number of characters in at least one other document, then at block 2514 the processor selects a document based on a predetermined criteria for comparing the respective document identifiers of the one or more documents. For example, continuing with the example described in block 2504, if the character count does not deconflict the tie, multiple other criteria may be used that cannot result in another tie. For example, the document with a numerical or lexicographical lower value can be selected as the representative document. In another example, the document that was uploaded first (e.g., according to a timestamp associated with a file or upload action) can be selected as the representative document. Other criteria may likewise be used in addition to, in lieu of, or in combination with these techniques.

Following the execution of the blocks 2502-2514 for a document group of the document groups (e.g., the document groups identified in block 2310), the process can return to block 2502 for a next document group of the document groups. Execution of the blocks 2502-2514 can repeat until each document group of the document groups has been processed.

FIG. 26 shows a flowchart of an example of a process for identifying and removing sets of exact duplicates from a set of documents according to some aspects of the present disclosure. The process can be implemented using any of the systems and processes described above. It will be appreciated that other examples may involve more operations, fewer operations, different operations, or a different sequence of operations than is shown in FIG. 26.

In block 2602, a processor identifies sets of exact duplicates among the sets of documents and the one or more new documents. Any suitable de-duplication technique can be used for the identification of exact duplicates, including hashing methods, byte-by-byte comparison, or checksum-based approaches. For example, a hashing method may involve computing a message digest or "hash" of each document using algorithms such as MD5 or SHA-256 to generate an identifier that uniquely corresponds an instance of a possible document. If two or more documents generate the same hash, then they can be identified as exact duplicates. Importantly, while there may be multiple instances of a possible document, each instance nevertheless retains a unique identity. For example, a document may have multiple exact duplicates identified. While they may be identical in every respect, including filename, metadata, etc., each duplicate can be mapped to a globally unique identifier.

For example, to identify exact duplicates using the hashing method, for each document of the sets of documents and the new documents, a hash can be generated based on the document that has an associated unique document identifier. The unique document identifier is chosen so that two otherwise identical documents nevertheless have different unique document identifiers. Next, the processor can determine groups of hashes that are identical and generate groups of exact duplicates by, for each group of identical hashes, associating a unique document identifier with each hash in the group of identical hashes. The collection of groups of exact duplicates and associated hashes can be ephemerally stored (e.g., in an in-memory cache or on a filesystem) to be used in block 2608 below.

In block 2604, the processor generates an updated set of documents including the one or more new documents and the sets of documents. For example, the one or more new documents and the sets of documents can be combined to generate the updated set of documents, including the identified exact duplicates. In some examples, generating the updated set of documents can be effected by accessing the sets of documents that were previously processed and then generating the updated set of documents by combining the new documents and the documents that were previously processed.

In block 2606, the processor removes, from the updated set of documents, the identified sets of exact duplicates except for one instance of each duplicate. For example, where exact duplicates are found in block 2602, all except one instance of each duplicate can be removed from the updated set of documents. In parallel, a record of the unique document identifiers that are removed in this block can be ephemerally persisted. The record can include unique document identifiers from both existing documents as well as new documents, or both. The updated set of documents, following duplicate removal, can include both existing and new documents with no duplicates among them.

Block 2608 can occur, for example, following block 2312 in the process described above with respect to FIG. 23. In block 2608, the processor, for each document group that includes a duplicate in the identified sets of exact duplicates, combines the identified sets of exact duplicates other than the one instance with the document group. In other words, the documents previously removed in block 2606 are re-added to the document groups. In this block, the exact duplicates removed in block 2606 to improve computational efficiency are re-added to the document groups. The record of the unique document identifiers for the removed duplicates can be used to determine which removed documents to re-add. For example, for each document in each document group, the hash of the document can be compared with the hashes in the record of unique document identifiers that were removed. If the hash is found in the record, then all of the removed documents associated with that hash can be re-added to the document group.

As described above, the processes described in FIGS. 14 and 22 can be used to automatically identify text documents that are duplicates, or near duplicates, of one another. As described therein, the processes described in FIGS. 14 and 22 can output a collection of document identifiers corresponding to documents with similarity scores relative to each other that meet or exceed a predefined similarity threshold.

In another example of a follow-on application, following identifications of duplicate and near-duplicate text documents, a "cleaned" version of input data sets with improved data quality and reduced noise can be generated. The collection of document identifiers output by the processes described in FIGS. 14 and 22 may require additional grouping or processing to be used in certain follow-on processes. Additionally, the grouped collections of document identifiers may be difficult to understand as a raw output, leading to a poor user experience.

Some techniques described herein can be used to address these challenges. For example, a computing system can receive sets of documents that may include pairs of documents previously determined to be similar to one another using a predefined similarity scoring technique such as the processes described in FIGS. 14 and 22. Using these sets of documents, the computing system can generate document groups by merging together one or more pairs of documents that share at least one document. For example, pairs can be merged into document groups based on the rule that if a document appears in two different pairs, those pairs are merged into a single document group in which each document in the document group has a unique identifier. Of the document groups thus formed, the computing system can identify a "representative document" for the document group by, for example, using a technique involving the similarity scores previously determined for the sets of documents. The computing system can then generate an output for display including a section for each document group, in which each section includes the representative document for the document group along with the other documents in the group and the similarity score relative to the representative document. The documents may thus be displayed using, for an example, a tabular format that enables faster and easier review of the documents in each document group, leading to an enhanced user experience. One example of this process is shown and described below with respect to FIG. 27. It will be appreciated that other examples may involve more operations, fewer operations, different operations, or a different sequence of operations than is shown in FIG. 27.

In block 2702, a processor receives sets of documents, wherein each set of documents includes at least one pair of documents determined to be similar to one another based on similarity scores generated using a predefined similarity scoring technique. For example, the similarity scoring technique based on the processes described in FIGS. 14 and 22 can be used to process a set of documents to determine pairs of documents in each of multiple document clusters that have similarity scores that meet or exceed a predefined similarity threshold. The processes can output collections of unique identifiers of the documents for each selected pair of text documents. However, as described above, outputting a collection of document identifiers by itself can lead to a poor user experience.

In block 2704, the processor generates document groups by merging together one or more pairs of documents that share at least one document. The one or more pairs of documents can be merged into document groups such that at most a single copy of any given identical set of documents is included in each document group. As a result, each document group will include at least one document and one or more other distinct documents determined to be similar, but not identical, to the document using the predefined similarity scoring technique.

For example, pairs can be merged into document groups if the same document (e.g., identical documents with having different unique identifiers) appears in two different pairs. In that case, those pairs are merged into a single group in which each document in the document group has a unique identifier. In other words, each document group may include at most one copy of a given document. Documents among the sets of documents that do not belong to any document group using this grouping approach can be classified as a unique document. This process can be repeated for pairs received in block 2702. For instance, consider example sets of documents including 6 documents identified using the unique document identifiers 1, 2, 3, 4, 5, and 6. Given the identified pairs of similar documents (1, 2), (2, 3), and (4, 5), two document groups can be formed: (1, 2, 3) and (4, 5). The last document, 6, is unique among this set of documents.

In block 2706, the processor, for each of the document groups, identifies a representative document for the document group. The representative document can be selected as one that is emblematic of the documents in the document group. For example, the representative document may be shown alongside multiple similar documents including a quantitative representation of the similarity (e.g., a similarity score). A user can use the representative document to quickly and easily establish a baseline for comparison among the other documents in the group. The user is thus unburdened from combing through the documents in the document group to determine the unifying characteristics of the document group; the user need only view the representative document and, during subsequent reviews, the similarity scores relative to the known representative document. Identification of the representative document may be similar in some respects to process described above in block 2312 with respect to FIG. 23.

The representative document can be chosen using a variety of techniques. The representative document may be characterized by determining a highest measure of similarity among the documents in the document group. For example, the representative document may be selected as the one that has a highest mean similarity score relative to the other documents in the document group. In this approach, the representative document is the most similar to the greatest number of documents in the document group. An example implementation of the operations described with respect to this block are shown below in FIG. 29.

In block 2708, the processor generates an output for display including a section for each document group, each section including the representative document for the document group and, for each document in the document group, the similarity score relative to the representative document for the document group. The output can be configured to improve the user experience while viewing or utilizing the set of documents including one or more pairs of similar documents. The output generated in this block can be displayed, for example, in a tabular form, as a suitable data structure (e.g., a JSON object), or as a suitable graphical user interface configured to display the output, among other examples. The output generated in this block may be similar in some respects to the output generated in block 2314 with respect to FIG. 23 above.

FIGS. 28A-B show examples of the output shown in a tabular format according to some examples of the present disclosure. Table 2800 depicts an output with three document groups, 2802, 2804, 2806, labeled as shown using the numbers in the group id column 2816. The unique identifiers column 2810 shows the unique identifiers of each document. Preview column 2812 shows a preview of the document, which is a truncated portion of the document to enable the data to fit in the example table (or other display). Similarity score column 2814 shows the similarity scores of each document in each document group relative to the representative document determined for the document group. In this example, the representative document is shown with a similarity score of –1. This example label is selected because it is an invalid output for some scoring algorithms (and must therefore programmatically mean something other than a valid score) but could be any suitable label such as the strings "REP. DOC" or "RD," among other possibilities. The similarity score column 2814 can be further augmented using colors or shading to improve the user experience. The representative documents in similarity score column 2814 are shown using shaded cells in this example. The similarity scores of the other documents for each document group are shown relative to the representative document, as described above.

Table 2820 depicts an output with for six unique documents 2822. Like table 2800, table 2800 includes a unique identifiers column 2830, preview column 2832, similarity score column 2834, and group id column 2836. The similarity score column 2834 shows each document having the identifier of the representative document, –1, since each unique document is representative of itself. The group id column 2836 likewise shows a group identifier of –1, corresponding to the collection of unique documents without any similar documents identified.

FIG. 29 shows a flowchart of an example of a process implementing the operation including identifying a representative document for the document group according to some aspects of the present disclosure. The process can be implemented using any of the systems and processes described above. It will be appreciated that other examples may involve more operations, fewer operations, different operations, or a different sequence of operations than is shown in FIG. 29.

In block 2902, a processor accesses the similarity scores, for at least a subset of the at least one pair of documents, previously generated using the predefined similarity scoring technique. For example, consider a document group including multiple documents generating by merging together pairs of documents that share at least one document as described above with respect to block 2704. To present the documents using an output (e.g., a graphical user interface or table) in such a way that a user can immediately see the relationships among the documents in the group, a quantification of the relationships among the documents can be used. However, quantifying the relationship between each document and every other document in the document group may be insufficient since such a scheme provides no common point of comparison among the documents and requiring a geometrically scaling number of comparisons. Accordingly, a representative document can be used. In some examples, a similarity score can be the quantification used, using the score previously computed using the processes described in FIGS. 14 and 22. The similarity scores may be accessed by, for example, querying a database, obtaining the scores from a file in a filesystem or memory location, and so on.

In block 2904, the processor determines whether the similarity scores include a similarity score for every pair of documents in the document group. Because the pairs of documents included in the set of documents may have been derived from different clusters, as described in the clustering approach to computing the similarity scores in FIG. 22, it is possible that similarity scores between each pair of documents in the document group may not yet have been computed. In this operation, the documents in the document group are assessed to determine if a similarity score can be accessed as between every pair of documents in the document group. The similarity scores may be, for example, included in metadata associated with each document or in a separate, standalone data structure or file that includes similarity score information (e.g., unique identifiers of a pair of documents and the corresponding similarity score).

If the similarity scores include a similarity score for every pair of documents in the document group, then at block 2906 the representative document is determined for each document group based on the already-computed similarity scores. Multiple criteria can be used to determine the representative document. For instance, it may be desirable to maximize the usefulness of the representative document by selecting a document that has the highest similarity score relative to the other documents in the document group. Other approaches may be used in accordance with the constraints of particular applications.

In block 2908, the processor, in response to determining that at least one similarity score for at least one pair of documents in the document group is not present in the similarity scores, generates new similarity scores for each pair of documents in the document group using the predefined similarity scoring technique. For example, the processes of FIGS. 14 and 22 can be used to determine similarity scores between pairs of documents without a precomputed similarity score. Following this operation, a similarity score as between each pair of documents in each document group can be accessed.

In block 2910, the processor determines the representative document for each document group based on the new similarity scores. As above in block 2906, multiple criteria can be used to determine the representative document. An example implementation of the operations described with respect to blocks 2906 and 2910 are shown below in FIG. 30.

FIG. 30 shows a flowchart of an example of a process implementing the operation including determining the representative document for each document group based on similarity scores according to some aspects of the present disclosure. The process can be implemented using any of the systems and processes described above. It will be appreciated that other examples may involve more operations, fewer operations, different operations, or a different sequence of operations than is shown in FIG. 30.

In block 3002, a processor identifies one or more documents in the document group with the highest similarity score, among the new similarity scores, relative to the other documents in the document group. In some examples, the operations in this block can proceed similarly to the operations described above in block 2502 with respect to FIG. 25. For example, consider a document group including multiple documents for which a similarity score has been computed relative to every other document in the document group, as described in block 2906 above or a document group including documents for which new similarity scores have been computed relative to every other document in the document group, as described in block 2908 above. In the simplest case, the representative document can be selected by determining that a single document in the document group has the highest similarity score relative to each of the other documents in the document group. In this case, the single document is identified as the representative document. The representative document is the one that is most similar to the most documents. In some examples, the highest mean similarity score relative to other documents in the document group can be used.

In block 3004, the processor determines that the one or more documents includes multiple documents having the same highest similarity score relative to the other documents in the document group. In some cases, one or more documents may have the same similarity score relative to one another. For example, two documents that are not identical may nevertheless have the same similarity score relative to all the other documents in the document group. In this case, the similarity score alone is not enough information to select the representative document. In some examples, the operations in this block can proceed similarly to the determination made above in block 2504 with respect to FIG. 25.

In block 3006, the processor, in response to determining that the one or more documents includes multiple documents, selects a document having the highest number of characters from among the multiple documents for use as the representative document. As described above, the similarity score alone may not be enough information to select a representative document. In this case, other methods for distinguishing documents can be used. In this operation, a character count can be determined for the documents sharing the same similarity score relative to the other documents in the document group. The document having the higher character count can be selected as the representative document. In some examples, the operations in this block can proceed similarly to the operations described above in blocks 2508, 2510, and 2512 with respect to FIG. 25.

In some examples, the character count may be the same as between two or more documents that also have the same similarity score relative to the other documents in the document group. Once again, other methods for distinguishing documents can be used. In this example, an ordering as between the two or more documents can be determined using, for example, a numerical document identifier, a message digest such as an MD5 or SHA256 hash, or a timestamp corresponding to events from the document lifecycle such as upload date and time. The ordinally first document can then be used as the representative document. For instance, for a SHA256 hash, the lexicographical ordering of the unique hashes can be used to determine the first, representative document. Other methods besides the examples of similarity scores, character counts, and numerical/lexicographical ordering can be used to determine the representative document. In some examples, the operations in this block can proceed similarly to the operations described above in block 2514 with respect to FIG. 25.

FIG. 31 shows a flowchart of an example of a process for comparing text strings identified using automated near-duplicate detection for text documents according to some aspects of the present disclosure. The process can be implemented using any of the systems and processes described above. It will be appreciated that other examples may involve more operations, fewer operations, different operations, or a different sequence of operations than is shown in FIG. 31.

As described above, the processes described in FIGS. 14 and 22 can be used to automatically identify text documents that are duplicates, or near duplicates, of one another. As described therein, the processes described in FIGS. 14 and 22 can output a collection of document identifiers corresponding to documents with similarity scores relative to each other that meet or exceed a predefined similarity threshold.

In FIG. 27 above, an example process for generating a user friendly output for viewing duplicate or near-duplicate text documents is described. However, even given an effective output strategy, it may still be desirable to further view the differences and similarities between these the duplicate and near-duplicate documents with higher granularity, resolution, or precise means for comparison. For example, it may be desirable to examine, visually, how certain text segments in the duplicate and near-duplicate documents overlap or relate to one another.

Existing approaches involve displaying differences between text segments alongside each other, using techniques such as comparing documents line-by-line or matching sentences. In some cases, a line-by-line display strategy can be effective for text with only minor differences. However, if the similar texts have, for example, varying formatting or if similar content is not aligned line-by-line, users must manually determine which lines correspond to each other. This process can be tedious and error-prone, particularly for longer or more complex documents.

Another existing approach involves comparing similar documents at the sentence level. In this paradigm, sentences in similar documents are first paired. Then, sentences are displayed or compared only for sentence pairs with a similarity score above a predefined threshold. While this method can effectively identify and illustrate similar sentences, it can result in additional complexities such as sentences appearing in multiple pairs, which can complicate the tracking of the sentences locations within the original documents. Additionally, this method requires the added computational burden of computing similarity scores at the sentence level for entire documents.

Similar document comparison can also be negatively affected by varying formats between similar documents (e.g., text files, word processing files, PDF files, etc.). These varying document formats can contain various formatted elements such as pages, titles, subtitles, and sections, which can affect the semantic relationship among document content and structure. Some existing approaches compare documents using systems that recognize both text and text positions. However, existing tools that use this method have several limitations. Many are overly sensitive to minor formatting changes, such as spacing, case, and line breaks, even given the same or similar set of words. Some tools may employ a page-by-page comparison strategy, which can lead to a poor results if the files are formatted such that certain words are in different pages. These approaches can also result in cluttered reports that effectively capture inserted, deleted, or replaced content while failing to capture important semantic similarities such as similar sentences or phrases. Such inaccurate approaches can overwhelm users with a flood of irrelevant differences, resulting in a poor user experience.

To address these challenges, some examples of the present disclosure can employ a text-string comparison technique. With this technique, a computing system can extract a set of text strings from each document. The text strings can be "normalized" by preprocessing the text strings and categorizing the text strings into types that can be used by downstream processes. The computing system can then identify and remove "boilerplate" text segments in the normalized text strings such as headers or page numbering that may not be useful when visually comparing documents. The filtered text strings can be divided into sections using indicia of section breaks. This sectioning can ensure that comparisons are performed by section rather than by page which may vary arbitrarily between similar documents. For each section, text strings can be grouped together according to various criteria to ensure that the two documents are compared using corresponding units of text. A similarity scoring technique, such as one used in the processes described in FIGS. 14 and 22, can be used to identify similar groupings of text strings. The computing system can generate an output, such as a table or graphical user interface, that shows the sectioned text of both documents along with visual indications of the matching groupings of text strings determined using the similarity scoring technique. This process is further described below with respect to FIG. 31. It will be appreciated that other examples may involve more operations, fewer operations, different operations, or a different sequence of operations than is shown in FIG. 31.

Turning now to FIG. 31, at block 3102, a processor receives a first document and a second document, the first document including first textual content and the second document including second textual content. The documents may be any two documents including some textual content for which a visual comparison is desired. For example, two PDF documents, two text documents (e.g., word processing files), or a text document and a PDF can be compared.

At block 3104, the processor extracts a first set of text strings from the first textual content and a second set of text strings from the second textual content. Because the first and second documents may be stored in a variety of formats or filetypes, the first and second documents can be converted to formats for which certain methods for text and position extraction can be applied. For example, text files (e.g., word processing files, raw text files, HTML documents, etc.) can be converted to PDF files, which enables the use of commonly available PDF extraction tools. In another example, text files can be converted to images, which enables the use of optical character recognition ("OCR") technologies to extract text from the converted images. OCR can likewise be used with the PDF format. Conversion of the input documents to the PDF format can preserve document layout and formatting and may be preferred for this reason. In addition to these examples, other filetypes may be used (e.g., ePub, PS, XPS, DVI, etc.). Extraction of text strings and coordinates can be effected using commercially available or open source text extraction tools.

In some examples, extraction may include both identification of the text strings and their corresponding coordinates. FIG. 32 shows an example of an extracted text string and corresponding set of coordinates according to some aspects of the present disclosure. Text string 3202 is represented as a rectangle disposed within page 3220. Extraction of the text string 3202 may involve identifying the bounds of the text string 3202 using a suitable abstraction (e.g., a bounding rectangle) and then copying the textual contents of the text string 3202 to a suitable data structure (e.g., a string-type variable provided by a programming language). In addition to extracting the text string, the coordinates of the text string within the page 3220 can be identified. In this example, the page 3220 acts as a two-dimensional plane with origin in the upper left and x- and y-coordinate values increasing in the downwards direction. The rectangular text string 3202 is identified using coordinates 3204, 3206, 3208, and 3210. Other coordinate systems such as ones with the origin differently located, differing orientation, polar coordinates, and so on can be similarly used.

In some examples, the text string 3202 can be multiple lines on a page. Lines, in this respect, can refer to individual rows of text identified within documents. In some examples, the text string 3202 may be a "block" which can include larger segments of text within a document that may contain multiple lines grouped together. For instance, blocks can represent a complete unit of meaning or a related set of information.

At block 3106, the processor normalizes the first set of text strings and the second set of text strings using a predefined normalization scheme to generate a first normalized set of text strings and a second normalized set of text strings, respectively. For example, normalization may involve performing certain preprocessing steps on the extracted text strings (e.g., removing whitespace, standardizing case, removing punctuation or digits, etc.). Additionally, the normalized text strings can be used to classify similar pairs of text strings to highlight varying levels of similarity or difference to add richness and context to the output. For example, the classifications can be used, when generating the output below, to identify corresponding text strings for which lines or sections differ only in punctuation or have identical alphabetic characters that differ only in digits.

In some examples, the predefined normalization scheme can involve, for each line of the extracted text strings, performing a specified sequence of normalizing steps. The normalized text string can be ephemerally persisted (e.g., in memory or temporary disk space) after each normalizing step. Later, following identification of matching groupings of text strings, predefined labels can be assigned to the identified matching groupings of text strings based on the number of normalizing steps performed. For example, if two normalizing steps are performed, then the two text strings or groupings of text strings can be classified using a particular label if the pair are identical following the second step.

For instance, in one example implementation, the first normalizing step, may include removing excess whitespace. The text string "IS THIS QUESTIONNAIRE BEING COMPLETED IN CONJUNCTION WITH A VA21-2507, C&P EXAMINATION REQUEST?" may be normalized to "IS THIS QUESTIONNAIRE BEING COMPLETED IN CONJUNCTION WITH A VA21-2507, C&P EXAMINATION REQUEST?" Corresponding text strings that are identical following only this normalization step may be classified as "exact" matches in the generated output. A second normalizing step, in this example, may include converting all characters to a predetermined case (e.g., uppercase or lowercase). Continuing with the example above, the text string "IS THIS QUESTIONNAIRE BEING COMPLETED IN CONJUNCTION WITH A VA21-2507, C&P EXAMINATION REQUEST?" may be normalized to "is this questionnaire being completed in conjunction with a va21-2507, c&p examination request?" in which the predetermined case is lowercase. A third normalizing step may include removing punctuation. Continuing with the example above, the text string "is this questionnaire being completed in conjunction with a va21-2507, c&p examination request?" may be normalized to "is this questionnaire being completed in conjunction with a va21 2507 c p examination request". Corresponding text strings that are identical following normalization steps one, two, and three may be classified as "same" matches in the generated output. The fourth normalizing step can involve removing numbers. For example, the text string "is this questionnaire being completed in conjunction with a va21 2507 c p examination request" may be normalized to "is this questionnaire being completed in conjunction with a va c p examination request". Corresponding text strings that are identical following normalization steps one, two, three, and four may be classified as "minor" matches in the generated output.

At block 3108, the processor identifies boilerplate text segments in the first normalized set of text strings and the second normalized set of text strings. For example, this operation can be implemented to detect and exclude boilerplate content that appears multiple times in similar positions across the pages of the input documents. Such content typically includes page numbers or elements that consistently appear at the top or bottom of multiple pages. Boilerplate content can be identified by characteristics such as relatively stable coordinates, with minimal variation as indicated by statistical measures such as standard deviation. An example implementation of this block is described below in FIG. 33 and illustrated in FIG. 34.

At block 3110, the processor removes the boilerplate text segments from the first normalized set of text strings and the second normalized set of text strings to generate a first filtered set of text strings and a second filtered set of text strings, respectively. For example, the repetitive boilerplate content identified in block 3108 can be excluded from the generated output as it may detract from the user experience by cluttering the output with non-relevant, minor, or obvious differences.

At block 3112, the processor divides the first filtered set of text strings and the second filtered set of text strings by identifying section indicators to generate first sectioned text strings and second sectioned text strings, respectively, the first sectioned text strings and the second sectioned text strings each including one or more sections. Line-by-line or page-by-page comparisons may be inefficient. Identifying the first- and second-sectioned text strings enables, for example, comparisons when related content spans multiple pages or when related content progresses at varying rates between the pair of input documents. Relying solely on page comparisons may risk, for example, mistakenly classifying, as distinct, identical content that appears in the same sections but is located on different pages (i.e., minimizing false negatives). Additionally, comparing groupings of text by section can reduce the number of calculations needed to compare each line of text against another for text similarity, making it more efficient than comparing entire documents.

Accordingly, sections can be identified by determining which text strings are section indicators according to various criteria and methods. For example, section identifiers, in various examples, can be unique, appear only once in each file, meet specific positional criteria, and so on. Following identification of section identifiers and partitioning of the input documents into first- and second-sectioned text strings, each document can include an associated list of section identifier text strings and its corresponding section identifier text string in the other document. In other words, a pair of section identifier text strings found in each document can mark the beginning of a new section and the end of the previous section. An example implementation of this block is described below in FIG. 35 and illustrated in FIG. 36.

At block 3114, the processor identifies matching groupings of text strings between the first sectioned text strings and the second sectioned text strings. This operation may include one or more sub-operations. For example, sectioned text strings that contain interrupted content within the same sentence, paragraph, or adjacent lines can be combined such that their combined content the first document corresponds to a combined content the second document. In another example, various combinations of adjacent sectioned text strings can be combined and compared using a similarity scoring technique to identify combinations that yield an optimized similarity score. Using these examples or other sub-operations, individually or in combination, to identify comparable groupings of text strings between the two, the corresponding groupings of text strings can be compared by section using a technique such as similarity scoring. An example implementation of this block is described below in FIG. 36 and illustrated in FIGS. 37 and 38.

At block 3116, the processor generates an output for display showing the first sectioned text strings and the second sectioned text strings, with visual indications of the matching groupings of text strings. The first sectioned text strings may be positioned adjacent to the second sectioned text strings in the display. For example, the output may be a graphical user interface that includes a subdivision for each section of the first sectioned text strings and the second sectioned text strings, in which each subdivision shows one or more groups of matching groupings of text strings and, for each matching grouping of text in each respective group of matching groupings of text strings, the similarity score relative to the other similar groupings of text strings in the group. The graphical user interface may include visual indications of the matching groupings of text strings, such as an indication that the respective matching groupings of text strings are similar or an exact match, according to the classifications developed in block 3106 above. An example graphical user interface, according to some examples, is shown in FIG. 39.

In some examples, similar groupings of text strings can be filtered by similarity score. For example, corresponding groupings of text strings between the first and second document have an associated relative similarity score ranging from 0 to 100. A filter can be configured such that only groupings of text strings above a certain specified similarity score are shown or displayed to improve the efficiency of review. Similarly, in some examples, the output can be grouped or partitioned using a configurable score threshold or collection of score thresholds. For example, a sequence of similarity thresholds (e.g., 0.9, 0.8, 0.7, 0.6, 0.5, 0.4, 0.3) can be configured to group the similar groupings of text strings into groups that incrementally satisfy the threshold. The similarity threshold can be used, when viewing or otherwise utilizing the output, to begin analysis by initially including groups that exhibit a higher similarity, and subsequently broadening the analysis to show or include groups that may have a more ambiguous relationship by lowering the threshold.

FIG. 33 shows a flowchart of an example of a process for identifying boilerplate text segments in the first normalized set of text strings and the second normalized set of text strings according to some aspects of the present disclosure. The process can be implemented using any of the systems and processes described above. It will be appreciated that other examples may involve more operations, fewer operations, different operations, or a different sequence of operations than is shown in FIG. 33.

Identification of boilerplate content has several advantages that can improve the user experience when generating an output showing text string comparisons of duplicate or near-duplicate text documents. For example, repeated text strings such as page numbers, headers, footers, signature lines, etc. may have little semantic value and may be less useful when viewing the output. Moreover, particularly when using a sectioned approach to comparison (see, e.g., block 3112 above), repeated text strings may not appear in the same section across both files especially when document content is not aligned from page to page. For example, a first section in a first document written in a large font may straddle numerous pages and include multiple page numbering footers. The same section in a second document in a much smaller font may fit on a single page and lack any or include only one page numbering footer. Removing such boilerplate content eliminates it from the comparison shown in the generated output. Additionally, removal of boilerplate content can reduce conflicts that may occur when merging text strings based on similarity in subsequent operations, such as is described in block 3114 above.

At block 3302, a processor, for the first document and the second document, determines a corresponding set of coordinates for each extracted text string. As described above, commercial or open source software packages can be used to extract text from documents in various formats. In example formats such as images or PDFs, in addition to extracting text, the coordinates of the extracted text can be measured and stored alongside or with the extracted text. The coordinates may be conveyed using a suitable coordinate system (e.g., Cartesian coordinates) and may, in some cases, include units such as picas or inches.

At block 3304, the processor, for a page of the first document and a corresponding page of the second document, identifies a first text block and a corresponding second text block that both have (i) a predefined property and (ii) a set of coordinates that are within a same predefined area of the page. For example, the predefined property may be that the text block consists solely of digits that form a sequence of advancing numbers with no duplicates. For instance, the first text block may include 12345 while the second text block may include 12346. Such a construction may indicate page numbers or other boilerplate content. Another example predefined property is that first and second text blocks differs only in digits. Another example predefined property is that the first and second text blocks are identical and appear on more than half of the total pages (or a specified number of pages).

Boilerplate content may additionally be identified using the location of the content with the various pages it appears on. For example, consider multiple sets of coordinates extracted in block 3302 for multiple candidate text blocks identified as potential boilerplate using the criteria specified above. A statistical measure of the variation of the coordinates among the number of candidate text blocks can be used to determine if the number of candidate text blocks are in approximately the same place on each page. For example, the standard deviation of the text block coordinates can be computed for a collection of comparable coordinates (e.g., one or both of the x- and y-coordinates of the upper left corner).

At block 3306, the processor, for the page of the first document and a corresponding page of the second document, determines that the first text block and the second text block correspond to the boilerplate text segment based on the first text block and the second text block having the predefined property and the set of coordinates. For example, for a given first and second text block, if the first and second text block both include the text "Page. No" and then different only in including the following text "12345" and "12346," then both text blocks can said to have the predefined property. Then, the standard deviation among the coordinates of the given first and second text block can be determined. If it is less than a predefined criteria (e.g., 5% of the value of a coordinate of the first block), then the given first and second text block can be identified as boilerplate content and removed in block 3110, as described above. In some examples, the standard deviation (or other suitable statistical or mathematical measure) can be computed among numerous candidate text blocks, which may yield more accurate results given a large statistical sample.

FIG. 34 shows an example of identified boilerplate content according to some aspects of the present disclosure. In particular, an example graphical user interface is shown with portions of pages of two documents 3402 and 3412. Document 3402 is associated with section indicator 3406 while document 3412 is associated with section indicator 3416. Section indicators 3406 and 3416 ("7" and "8," respectively) illustrate that the two documents 3402 and 3412 have different section demarcations. Candidate boilerplate content 3404 and 3414 been identified. Candidate boilerplate content 3404 and 3414 include elements that are identical or are nearly identical (e.g., identical except for certain digits). However, it is apparent that candidate boilerplate content 3404 and 3414 do not appear in the exact same place on the respective pages for documents 3402 and 3412. The standard deviation of one or more coordinates of the bounding boxes of the candidate boilerplate content 3404 and 3414 (or individual elements therein) can be computed to determine whether the candidate boilerplate content 3404 and 3414 will be identified as boilerplate content and removed. The predefined criteria for boilerplate content can be adjusted using a suitable configuration procedure as needed for the particular application.

FIG. 35 shows a flowchart of an example of a process for identifying section indicators to generate first sectioned text strings and second sectioned text strings according to some aspects of the present disclosure. The process can be implemented using any of the systems and processes described above. It will be appreciated that other examples may involve more operations, fewer operations, different operations, or a different sequence of operations than is shown in FIG. 35.

As described above, generating an output that shows comparisons between documents by section rather than by page or other grouping can improve the efficiency while generating the output and improve the user experience. In particular, comparing sections minimizes false negatives that may occur due to misaligned pages. Comparing by section can also reduce the number of calculations needed to compare text strings and may be more efficient than comparing entire documents. Comparing sections rather than pages may also contribute to a more logically ordered and organized output.

Generating sectioned text strings can be effected by identifying section headers in the filtered text strings with boilerplate content removed. In one example, identifying section headers can involve categorizing text strings according to multiple criteria to determine if they are section headers or not. The method for categorizing text strings can be implemented to minimize the risk of mis-identification of text strings as section headers. The following operations describe an example implementation involving several criteria applied in sequence or in parallel.

At block 3502, a processor determines a first satisfaction of a first criteria, which can involve determining whether a first filtered text string and a second filtered text string only appears once in each of the first filtered set of text strings and the second filtered set of text strings. This criteria can be used to, for example, require that the filtered text string under examination in the first and second documents appears only once in each document and is identical in each document. This criteria can contribute to the identification of example section headers such as "Section 1—Introduction" that are likely to only appear once in a given document.

At block 3504, the processor determines a second satisfaction of a second criteria, which can involve the first filtered text string and the second filtered text string each consisting of only one line and being the only text on the line. For example, the second criteria can require that that the filtered text string under examination occupy an entire line on a page, such that no other content is present on the line. In this context, a "line" can mean a filtered text string in which each character has the same y-coordinate.

Implementations of this second criteria may include methods for distinguishing vertically adjacent text strings to determine whether a given pair of text strings lie on the same line or not. For example, the processor can identify a first bounding box around a first text string and a second bounding box around a second text string, where the first text string and the second text string are proximate to each other in a text document. If the first bounding box and the second bounding box overlap, the processor can determine an amount (e.g., area) of the overlap. If the amount of overlap is less than a predefined threshold, then the pair of text strings can be distinguished as lying on separate lines.

FIG. 36A shows an illustration of a method for distinguishing vertically adjacent text strings according to some aspects of the present disclosure. Text string 3602 and text string 3604 are shown with overlapping bounding boxes. The overlapping portion 3606 can be quantified using a suitable overlap measurement technique. For instance, the overlapping height of the respective bounding boxes for text strings 3602 and 3604 can be determined using units of pixels, picas, millimeters, etc. The overlap can then be computed by determining the fraction of the height of the bounding boxes occupied by the measured height. For example, if bounding box for text string 3602 is 20 pixels high and the height of the overlap 3606 is 5 pixels high, then the overlap can be computed as 5 divided by 20 or 0.25. If the computed overlap is less than a predetermined threshold (e.g., 0.35 or 35%), then the text strings 3602 and 3604 may be considered as lying on separate lines. On the other hand, if the computed overlap is greater than the predetermined threshold, then the text strings 3602 and 3604 may be considered as lying on the same line.

Continuing with FIG. 35, at block 3506, the processor determines a third satisfaction of a third criteria, comprising, for the first filtered text string or the second filtered text string that is provisionally identified as a section header based on the first criteria and the second criteria, determining that a sequencing of the provisionally identified section header is valid using a section header index. For example, the third criteria can be implemented by requiring that an identified section header line (e.g., identified using the first and/or second criteria) must be indexed after all preceding identified section headers. Sequencing may be identified using any suitable ordinal value such as numbers, letters, visual indicators (e.g., multiple shapes), and so on. This process is described further with respect to FIG. 36B.

FIG. 36B shows an illustration of out-of-sequence section identifiers according to some aspects of the present disclosure. Candidate section identifiers 3612 for a first document and candidate section identifiers 3614 for a second document are shown. Section identifiers 3612 and 3614 include the text strings of the form "Section {Letter}" where "{Letter}" indicates an ordinal, capital letter. Section identifiers 3612 include the ordinals "ABCD" where section identifiers 3614 include the ordinals "ACBD." The out-of-sequence section identifiers are shown a 3616. The out-of-sequence section identifiers 3616 may consequently not be identified as section identifiers. For instance, in this example, the section identifier pairs at 3618 and 3620 may be identified as section identifiers while the out-of-sequence section identifiers 3616 are not, resulting a section beginning with section identifier 3618 and a second section beginning with section identifier 3620.

This simple illustration shows two out-of-sequence sections, but the technique is applicable to any number of out-of-sequence sections. For instance, if the identified candidate section headers are ordered with numbers [1, 2, 3, 4] and [3, 2, 1, 4], respectively, only the section identifiers numbered as [4] and [4] are retained, corresponding to one identified section. This ensures that identified sections are comparable and that sections whose ordering differs between the first document and the second document are not compared, which may result in an inflated number of false negatives and/or positives.

At block 3508, the processor identifies a section header by determining that the first criteria, the second criteria, and the third criteria have been satisfied. For example, the operations described in blocks 3502, 3504, and 3506 may result in a Boolean output for each criteria evaluation. A positive evaluation for each criteria, for a given filtered text string appearing in the first and second documents, can result in identification of a section header. In some examples, only a subset of the criteria may be required for identification of a section header.

Identified sections may be numbered or otherwise associated with an identifier to use to illustrate the demarcation between and among sections in the generated output. For example, a first identified section in the first and second document may be characterized with the section identifier "1" and so on. The section identifier may be shown at the beginning or end of the section, as well as throughout the body of the section in a generated output such as a graphical user interface.

FIG. 37 shows a flowchart of an example of a process for identifying matching groupings of text strings between the first sectioned text strings and the second sectioned text strings according to some aspects of the present disclosure. The process can be implemented using any of the systems and processes described above. It will be appreciated that other examples may involve more operations, fewer operations, different operations, or a different sequence of operations than is shown in FIG. 37.

The operations in this process can be used to generate groupings of text strings when, for example, comparable content spans text strings, which themselves can span multiple lines. For example, a particular text string may belong to one or more paragraphs or one or more sentences. Because a particular text string may vary cosmetically (e.g., newlines or page breaks may be added for visual appeal) or typographically (e.g., different fonts or font sizes), the generated output can be enhanced by comparing semantically related groupings of text strings rather than text strings. This process includes operations for merging text strings to generate coherent, comparable groupings.

At block 3702, a processor generates groupings of text strings by grouping text strings that satisfy one or more merging criteria, such that each grouping of text strings in the first sectioned text strings has a corresponding grouping of text strings in the second sectioned text strings. For example, the merging criteria may involve first, for a first sectioned text string and a second sectioned text string, determining if the identical sectioned text string is found in both the first document and the second document. In this case, the pair of sectioned text strings are identical and easily comparable. The merging criteria may further involve a check to determine whether the first sectioned text string and the second sectioned text string are adjacent, indicating that they may be a part of the same paragraph or other semantic grouping. The merging criteria can further involve determinations relating to spacing, horizontal or vertical coordinates, sentence and paragraph breaks, alignment, and so on. For instance, vertical or horizontal spacing can be determined to be less than a predetermined threshold. Merging of the first sectioned text string and the second sectioned text string can proceed if a threshold fraction of the one or more merging criteria are satisfied. Following this block, the groupings of text strings may thus include text strings as well as a plurality of grouped or "merged" text strings that can be acted on and compared collectively.

FIG. 38A shows an example application of one or more merging criteria according to some aspects of the present disclosure. FIG. 38A shows first sectioned text strings 3802 for a first document and second sectioned text strings 3804 for a second document. In this example, the first two lines of the first sectioned text strings 3802 are not identical to the corresponding first two lines of the second sectioned text strings 3804. However, the first two lines of the first sectioned text strings 3802 are adjacent and have the same horizontal alignment and have minimal vertical spacing. Therefore, they are merged into the first grouping of text strings 3812. Likewise, the first two lines of the second sectioned text strings 3804 are merged into the second grouping of text strings 3814.

Continuing with FIG. 37, at block 3704, the processor determines a similarity score between each pair of corresponding groupings of text strings between the first sectioned text strings and the second sectioned text strings in the section using a predefined similarity scoring technique. The operations described in this block can be performed on the first sectioned text strings and the second sectioned text strings before or after the grouping described with respect to block 3702. In this block, the challenges described above are further addressed by merging corresponding groupings of text strings included in each section of the first and second documents that are sufficiently similar according to a quantitative measure.

In some examples, the identified groupings of text strings in each section can be indexed (e.g., numbered). Candidate combinations of groupings can be identified by determining all possible ordered, adjacent combinations of the indexed groupings of text strings. Then, each candidate combination in the section from the first document can be compared with each candidate combination in the second document. The combination pair with the highest similarity score or a similarity score exceeding a predefined threshold can be selected, and the respective combinations can be merged.

For instance, consider a first document having a section with identified groupings of text strings indexed as [1, 2]. Then all combinations of adjacent indexes for the first document include [[1], [2], [1, 2]]. A second document, having the same corresponding section, may have identified groupings [1, 2, 3, 4, 5]. Then all combinations of adjacent indexes for the second document include [[1], [1, 2], [1, 2, 3], [1, 2, 3, 4], [1, 2, 3, 4, 5], [2], [2, 3], [2, 3, 4], [2, 3, 4, 5], [3], [3, 4], [3, 4, 5], [4], [4, 5], [5]]. Each pair of candidate combinations from each document can be successively checked for similarity using a technique such as the Levenshtein Distance. In addition to the example of the Levenshtein Distance, other algorithms can be used for string similarity and comparison, such as the Jaro-Winkler Distance, the Smith-Waterman algorithm, the Damerau-Levenshtein Distance, as well as the processes described in FIGS. 14 and 22, or a portion thereof.

At block 3706, the processor identifies matching groupings of text strings among the corresponding groupings of text strings between the first sectioned text strings and the second sectioned text strings based on the similarity scores. Continuing the example above, if the candidate combination [1, 2] from the first document and the candidate combination [1, 2, 3, 4, 5] from the second document are determined the have the highest similarity score among all the candidate combination pairs, the groupings indexed as [1, 2] can be merged in the first document and the groupings indexed as [1, 2, 3, 4, 5] in the second document can be merged.

FIG. 38B shows an illustration of merging groupings of text strings using similarity scores according to some aspects of the present disclosure. FIG. 38B depicts a first document and a second document. One candidate combination 3820 is identified for the first document for a first grouping of text strings. Candidate combinations 3830 are identified for the second document including seven groupings of text strings. Following the iterative process described above, the combination of all seven groupings of text strings for the candidate combinations 3830 are determined to be most similar to the candidate combination 3820. Merged grouping of text strings 3822 (which is the same as the single candidate combination 3820) is shown along with merged grouping of text strings 3832.

FIG. 39 shows an example of a graphical user interface generated for display showing the first sectioned text strings adjacent to the second sectioned text strings, with visual indications of the matching groupings of text strings, according to some aspects of the present disclosure. The example graphical user interface shows a first document 3902 and a second document 3912. As described above, comparisons at the section level can result in a higher degree of accuracy, more efficient document processing, and a better user experience. In this example, section identifiers 3904 and 3914 are shown labeled as "25" and horizontally aligned. An example of compared content, including bounding boxes around groupings of text strings are shown at 3906 and 3916, respectively. The compared content includes corresponding identical groupings of text strings classified using the scheme described above in block 3106 such as text strings 3908 and 3918. The compared content also includes corresponding groupings of text strings that are identified as similar, as described above, along with their computed similarity scores, such as text strings 3910 and 3920. In the graphical user interface, identical text strings may be distinguished from similar text strings using different colors, fonts, text styles, or other visual queues. In this example, the identical text strings are displayed in a first color and the similar text strings are displayed in a second color, to readily distinguish between the two for the user.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

What is claimed is:

1. A system comprising:
one or more processors; and
one or more memories including program code that is executable by the one or more processors for causing the one or more processors to:
receive a first document and a second document, the first document including first textual content and the second document including second textual content;
extract a first set of text strings from the first textual content and a second set of text strings from the second textual content;
normalize the first set of text strings and the second set of text strings using a predefined normalization scheme to generate a first normalized set of text strings and a second normalized set of text strings, respectively;
identify boilerplate text segments in the first normalized set of text strings and the second normalized set of text strings;
remove the boilerplate text segments from the first normalized set of text strings and the second normalized set of text strings to generate a first filtered set of text strings and a second filtered set of text strings, respectively;
divide the first filtered set of text strings and the second filtered set of text strings by identifying section indicators to generate first sectioned text strings and second sectioned text strings, respectively, the first sectioned text strings and the second sectioned text strings each including one or more sections;
for each section of the first sectioned text strings and the second sectioned text strings, respectively:
generate groupings of text strings by grouping text strings that satisfy one or more merging criteria, such that each grouping of text strings in the first sectioned text strings has a corresponding grouping of text strings in the second sectioned text strings;
determine a similarity score between each pair of corresponding groupings of text strings between the first sectioned text strings and the second sectioned text strings in the section using a predefined similarity scoring technique; and
identify matching groupings of text strings among the corresponding groupings of text strings between the first sectioned text strings and the second sectioned text strings based on the similarity scores; and
generate a graphical user interface ("GUI") for display showing the first sectioned text strings adjacent to the second sectioned text strings with visual indications of the matching groupings of text strings, wherein:
the GUI includes a first document identifier for the first document and a second document identifier for the second document;
the GUI includes a subdivision for each section of the first sectioned text strings and the second sectioned text strings, each subdivision showing one or more groups of matching groupings of text strings and, for each matching grouping of text in each respective group of matching groupings of text strings, the similarity score relative to the other similar groupings of text strings in the group; and
the visual indications of the matching groupings of text strings include a first indication that the respective matching groupings of text strings are similar or a second indication that the respective matching groupings of text strings are an exact match.

2. The system of claim 1, wherein the one or more memories including program code that is executable by the one or more processors for causing the one or more processors to:
for the first document and the second document, determine a corresponding set of coordinates for each extracted text string; and identify the boilerplate text segments and the section indicators based on the corresponding set of coordinates for each extracted text string.

3. The system of claim 2, wherein the one or more memories further include program code that is executable by the one or more processors for causing the one or more processors to:

identify a boilerplate text segment in the first normalized set of text strings and the second normalized set of text strings by, for a page of the first document and a corresponding page of the second document:

identifying a first text block and a corresponding second text block that both have (i) a predefined property and (ii) a set of coordinates that are within a same predefined area of the page; and determining that the first text block and the second text block correspond to the boilerplate text segment based on the first text block and the second text block having the predefined property and the set of coordinates.

4. The system of claim 3, wherein the first text block and the corresponding second text block include numerical data, and wherein the predefined property is that the numerical data sequentially increases in value on each subsequent page.

5. The system of claim 3, wherein the predefined property is at least one of:

at least half of the first text block and the corresponding second text block are identical to one another; or at least half of the first text block and the corresponding second text block differ only in that they include different numbers in one or more corresponding locations.

6. The system of claim 2, wherein the one or more memories further include program code that is executable by the one or more processors for causing the one or more processors to:

identify the section indicators to generate the first sectioned text strings and the second sectioned text strings by:

for each first text string of the first filtered set of text strings and the corresponding second text string of the second filtered set of text strings:

determining a first satisfaction of a first criteria, comprising determining whether the first text string and the second text string only appears once in each of the first filtered set of text strings and the second filtered set of text strings;

determining a second satisfaction of a second criteria, wherein the first text string and the second text string each include one line and comprising determining that the first text string and the second text string are the only text on the line for both of the first filtered set of text strings and the second filtered set of text strings;

in response to satisfaction of the first criteria and the second criteria, provisionally identifying the first text string and the second text string as a section header;

determining a third satisfaction of a third criteria, comprising, for the first text string or the second text string, determining that a sequencing of the provisionally identified section header is valid using a section header index; and identifying a section header by determining that the first criteria, the second criteria, and the third criteria have been satisfied.

7. The system of claim 2, wherein the corresponding set of coordinates for each extracted text string are represented using two-dimensional Cartesian coordinates relative an origin in the top-left corner of the respective first and second documents.

8. The system of claim 1, wherein the predefined normalization scheme comprises:

for each line of the first set of text strings and the second set of text strings, performing a sequence of normalizing steps, comprising:

a first normalizing step, comprising removing excess whitespace;

a second normalizing step, comprising converting all characters to a predetermined case and removing punctuation; and a third normalizing step, comprising removing numbers.

9. The system of claim 8, wherein the one or more memories further include program code that is executable by the one or more processors for causing the one or more processors to:

normalize the first set of text strings and the second set of text strings using the predefined normalization scheme by, for each text string of the first set of text strings and the second set of text strings, after each normalizing step of the sequence of normalizing steps, assigning a predefined label to a first text string of the first set of text strings and a second text string of the second set of text strings based on the number of normalizing steps performed if the first text string and the second text string are identical following the normalizing step.

10. The system of claim 1, wherein the predefined similarity scoring technique is a first predefined similarity scoring technique, and wherein the one or more merging criteria comprise, for a first subset of the first sectioned text strings and a second subset of the second sectioned text strings:

a first merging criteria, comprising:

determining that the first subset and the second subset include identical content;

generating first groupings of text by merging the text strings of the first subset; and generating second grouping of text by merging the text strings of the second subset; or a second merging criteria, comprising:

determining that the first subset and the second subset include similar content using a second predefined similarity scoring technique;

generating a third grouping of text by merging the text strings of the first subset; and generating a second grouping of text by merging the text strings of the second subset.

11. A method comprising:

receiving a first document and a second document, the first document including first textual content and the second document including second textual content;

extracting a first set of text strings from the first textual content and a second set of text strings from the second textual content;

normalizing the first set of text strings and the second set of text strings using a predefined normalization scheme to generate a first normalized set of text strings and a second normalized set of text strings, respectively;

identifying boilerplate text segments in the first normalized set of text strings and the second normalized set of text strings;

removing the boilerplate text segments from the first normalized set of text strings and the second normalized set of text strings to generate a first filtered set of text strings and a second filtered set of text strings, respectively;

dividing the first filtered set of text strings and the second filtered set of text strings by identifying section indicators to generate first sectioned text strings and second sectioned text strings, respectively, the first sectioned text strings and the second sectioned text strings each including one or more sections;

for each section of the first sectioned text strings and the second sectioned text strings, respectively:

generating groupings of text strings by grouping text strings that satisfy one or more merging criteria, such that each grouping of text strings in the first sectioned text strings has a corresponding grouping of text strings in the second sectioned text strings;

determining a similarity score between each pair of corresponding groupings of text strings between the first sectioned text strings and the second sectioned text strings in the section using a predefined similarity scoring technique; and identifying matching groupings of text strings among the corresponding groupings of text strings between the first sectioned text strings and the second sectioned text strings based on the similarity scores; and generating a graphical user interface ("GUI") for display showing the first sectioned text strings adjacent to the second sectioned text strings with visual indications of the matching groupings of text strings, wherein:

the GUI includes a first document identifier for the first document and a second document identifier for the second document;

the GUI includes a subdivision for each section of the first sectioned text strings and the second sectioned text strings, each subdivision showing one or more groups of matching groupings of text strings and, for each matching grouping of text in each respective group of matching groupings of text strings, the similarity score relative to the other similar groupings of text strings in the group; and the visual indications of the matching groupings of text strings include a first indication that the respective matching groupings of text strings are similar or a second indication that the respective matching groupings of text strings are an exact match.

12. The method of claim 11, further comprising:

for the first document and the second document, determining a corresponding set of coordinates for each extracted text string; and identifying the boilerplate text segments and the section indicators based on the corresponding set of coordinates for each extracted text string.

13. The method of claim 12, further comprising:

identifying a boilerplate text segment in the first normalized set of text strings and the second normalized set of text strings by, for a page of the first document and a corresponding page of the second document:

identifying a first text block and a corresponding second text block that both have (i) a predefined property and (ii) a set of coordinates that are within a same predefined area of the page; and determining that the first text block and the second text block correspond to the boilerplate text segment based on the first text block and the second text block having the predefined property and the set of coordinates.

14. The method of claim 13, wherein the first text block and the corresponding second text block include numerical data, and wherein the predefined property is that the numerical data sequentially increases in value on each subsequent page.

15. The method of claim 13, wherein the predefined property is at least one of:

at least half of the first text block and the corresponding second text block are identical to one another; or at least half of the first text block and the corresponding second text block differ only in that they include different numbers in one or more corresponding locations.

16. The method of claim 12, further comprising:

identifying the section indicators to generate the first sectioned text strings and the second sectioned text strings by:

for each first text string of the first filtered set of text strings and the corresponding second text string of the second filtered set of text strings:

determining a first satisfaction of a first criteria, comprising determining whether the first text string and the second text string only appears once in each of the first filtered set of text strings and the second filtered set of text strings;

determining a second satisfaction of a second criteria, wherein the first text string and the second text string each include one line and comprising determining that the first text string and the second text string are the only text on the line for both of the first filtered set of text strings and the second filtered set of text strings;

in response to satisfaction of the first criteria and the second criteria, provisionally identifying the first text string and the second text string as a section header;

determining a third satisfaction of a third criteria, comprising, for the first text string or the second text string, determining that a sequencing of the provisionally identified section header is valid using a section header index; and identifying a section header by determining that the first criteria, the second criteria, and the third criteria have been satisfied.

17. The method of claim 12, wherein the corresponding set of coordinates for each extracted text string are represented using two-dimensional Cartesian coordinates relative an origin in the top-left corner of the respective first and second documents.

18. The method of claim 11, wherein the predefined normalization scheme comprises:

for each line of the first set of text strings and the second set of text strings, performing a sequence of normalizing steps, comprising:

a first normalizing step, comprising removing excess whitespace;

a second normalizing step, comprising converting all characters to a predetermined case and removing punctuation; and a third normalizing step, comprising removing numbers.

19. The method of claim 18, further comprising:

normalizing the first set of text strings and the second set of text strings using the predefined normalization scheme by, for each text string of the first set of text strings and the second set of text strings, after each normalizing step of the sequence of normalizing steps, assigning a predefined label to a first text string of the first set of text strings and a second text string of the second set of text strings based on the number of normalizing steps performed if the first text string and the second text string are identical following the normalizing step.

20. The method of claim 11, wherein the predefined similarity scoring technique is a first predefined similarity scoring technique, and wherein the one or more merging criteria comprise, for a first subset of the first sectioned text strings and a second subset of the second sectioned text strings:

a first merging criteria, comprising:
determining that the first subset and the second subset include identical content;
generating first groupings of text by merging the text strings of the first subset; and
generating second grouping of text by merging the text strings of the second subset; or
a second merging criteria, comprising:
determining that the first subset and the second subset include similar content using a second predefined similarity scoring technique;
generating a third grouping of text by merging the text strings of the first subset; and
generating a second grouping of text by merging the text strings of the second subset.

21. A non-transitory computer-readable medium comprising program code that is executable by one or more processors for causing the one or more processors to:
receive a first document and a second document, the first document including first textual content and the second document including second textual content;
extract a first set of text strings from the first textual content and a second set of text strings from the second textual content;
normalize the first set of text strings and the second set of text strings using a predefined normalization scheme to generate a first normalized set of text strings and a second normalized set of text strings, respectively;
identify boilerplate text segments in the first normalized set of text strings and the second normalized set of text strings;
remove the boilerplate text segments from the first normalized set of text strings and the second normalized set of text strings to generate a first filtered set of text strings and a second filtered set of text strings, respectively;
divide the first filtered set of text strings and the second filtered set of text strings by identifying section indicators to generate first sectioned text strings and second sectioned text strings, respectively, the first sectioned text strings and the second sectioned text strings each including one or more sections;
for each section of the first sectioned text strings and the second sectioned text strings, respectively:
generate groupings of text strings by grouping text strings that satisfy one or more merging criteria, such that each grouping of text strings in the first sectioned text strings has a corresponding grouping of text strings in the second sectioned text strings;
determine a similarity score between each pair of corresponding groupings of text strings between the first sectioned text strings and the second sectioned text strings in the section using a predefined similarity scoring technique; and identify matching groupings of text strings among the corresponding groupings of text strings between the first sectioned text strings and the second sectioned text strings based on the similarity scores; and
generate a graphical user interface ("GUI") for display showing the first sectioned text strings adjacent to the second sectioned text strings with visual indications of the matching groupings of text strings, wherein:
the GUI includes a first document identifier for the first document and a second document identifier for the second document;
the GUI includes a subdivision for each section of the first sectioned text strings and the second sectioned text strings, each subdivision showing one or more groups of matching groupings of text strings and, for each matching grouping of text in each respective group of matching groupings of text strings, the similarity score relative to the other similar groupings of text strings in the group; and
the visual indications of the matching groupings of text strings include a first indication that the respective matching groupings of text strings are similar or a second indication that the respective matching groupings of text strings are an exact match.

22. The non-transitory computer-readable medium of claim 21, wherein the non-transitory computer-readable medium further comprises program code that is executable by the one or more processors for causing the one or more processors to:
for the first document and the second document, determine a corresponding set of coordinates for each extracted text string; and
identify the boilerplate text segments and the section indicators based on the corresponding set of coordinates for each extracted text string.

23. The non-transitory computer-readable medium of claim 22, wherein the non-transitory computer-readable medium further comprises program code that is executable by the one or more processors for causing the one or more processors to:
identify a boilerplate text segment in the first normalized set of text strings and the second normalized set of text strings by, for a page of the first document and a corresponding page of the second document:
identifying a first text block and a corresponding second text block that both have (i) a predefined property and (ii) a set of coordinates that are within a same predefined area of the page; and
determining that the first text block and the second text block correspond to the boilerplate text segment based on the first text block and the second text block having the predefined property and the set of coordinates.

24. The non-transitory computer-readable medium of claim 23, wherein the first text block and the corresponding second text block include numerical data, and wherein the predefined property is that the numerical data sequentially increases in value on each subsequent page.

25. The non-transitory computer-readable medium of claim 23, wherein the predefined property is at least one of:
at least half of the first text block and the corresponding second text block are identical to one another; or
at least half of the first text block and the corresponding second text block differ only in that they include different numbers in one or more corresponding locations.

26. The non-transitory computer-readable medium of claim 22, wherein the non-transitory computer-readable medium further comprises program code that is executable by the one or more processors for causing the one or more processors to:

identify the section indicators to generate the first sectioned text strings and the second sectioned text strings by:

for each first text string of the first filtered set of text strings and the corresponding second text string of the second filtered set of text strings:

determining a first satisfaction of a first criteria, comprising determining whether the first text string and the second text string only appears once in each of the first filtered set of text strings and the second filtered set of text strings;

determining a second satisfaction of a second criteria, wherein the first text string and the second text string each include one line and comprising determining that the first text string and the second text string are the only text on the line for both of the first filtered set of text strings and the second filtered set of text strings;

in response to satisfaction of the first criteria and the second criteria, provisionally identifying the first text string and the second text string as a section header;

determining a third satisfaction of a third criteria, comprising, for the first text string or the second text string, determining that a sequencing of the provisionally identified section header is valid using a section header index; and identifying a section header by determining that the first criteria, the second criteria, and the third criteria have been satisfied.

27. The non-transitory computer-readable medium of claim 22, wherein the corresponding set of coordinates for each extracted text string are represented using two-dimensional Cartesian coordinates relative an origin in the top-left corner of the respective first and second documents.

28. The non-transitory computer-readable medium of claim 21, wherein the predefined normalization scheme comprises:

for each line of the first set of text strings and the second set of text strings, performing a sequence of normalizing steps, comprising:

a first normalizing step, comprising removing excess whitespace;

a second normalizing step, comprising converting all characters to a predetermined case and removing punctuation; and a third normalizing step, comprising removing numbers.

29. The non-transitory computer-readable medium of claim 28, wherein the non-transitory computer-readable medium further comprises program code that is executable by the one or more processors for causing the one or more processors to:

normalize the first set of text strings and the second set of text strings using the predefined normalization scheme by, for each text string of the first set of text strings and the second set of text strings, after each normalizing step of the sequence of normalizing steps, assigning a predefined label to a first text string of the first set of text strings and a second text string of the second set of text strings based on the number of normalizing steps performed if the first text string and the second text string are identical following the normalizing step.

30. The non-transitory computer-readable medium of claim 21, wherein the predefined similarity scoring technique is a first predefined similarity scoring technique, and wherein the one or more merging criteria comprise, for a first subset of the first sectioned text strings and a second subset of the second sectioned text strings:

a first merging criteria, comprising:

determining that the first subset and the second subset include identical content;

generating first groupings of text by merging the text strings of the first subset; and generating second grouping of text by merging the text strings of the second subset; or a second merging criteria, comprising:

determining that the first subset and the second subset include similar content using a second predefined similarity scoring technique;

generating a third grouping of text by merging the text strings of the first subset; and generating a second grouping of text by merging the text strings of the second subset.

\* \* \* \* \*